United States Patent
Lomet et al.

(10) Patent No.: US 9,928,264 B2
(45) Date of Patent: Mar. 27, 2018

(54) HIGH PERFORMANCE TRANSACTIONS IN DATABASE MANAGEMENT SYSTEMS

(71) Applicant: Microsoft Technology Licensing, LLC, Redmond, WA (US)

(72) Inventors: David Bruce Lomet, Redmond, WA (US); Justin Jon Levandoski, Seattle, WA (US); Sudipta Sengupta, Redmond, WA (US); Ryan Stutsman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 14/588,390

(22) Filed: Dec. 31, 2014

(65) Prior Publication Data

US 2016/0110403 A1 Apr. 21, 2016

Related U.S. Application Data

(60) Provisional application No. 62/065,754, filed on Oct. 19, 2014.

(51) Int. Cl.
G06F 7/00 (2006.01)
G06F 17/00 (2006.01)
G06F 17/30 (2006.01)

(52) U.S. Cl.
CPC .... *G06F 17/30356* (2013.01); *G06F 17/3033* (2013.01); *G06F 17/30353* (2013.01)

(58) Field of Classification Search
None
See application file for complete search history.

(56) References Cited

U.S. PATENT DOCUMENTS

| 7,039,773 | B2 | 5/2006 | Hu et al. |
| 8,170,997 | B2 | 5/2012 | Lomet et al. |
| 8,868,506 | B1 * | 10/2014 | Bhargava .......... G06F 17/30011 707/648 |
| 2003/0061537 | A1 | 3/2003 | Cha et al. |
| 2003/0204698 | A1 * | 10/2003 | Sachedina .......... G06F 12/0806 711/170 |

(Continued)

FOREIGN PATENT DOCUMENTS

WO 2016064575 A1 4/2016

OTHER PUBLICATIONS

"Second Written Opinion Issued in counterpart PCT Application No. PCT/US2015/054350", dated Sep. 16, 2016, 5 Pages.

(Continued)

*Primary Examiner* — Tuan A Pham
(74) *Attorney, Agent, or Firm* — Rainier Patents, P.S.

(57) ABSTRACT

A transaction engine includes a multi-version concurrency control (MVCC) module that accesses a latch-free hash table that includes respective hash table entries that include respective buckets of respective bucket items. The bucket items represent respective records, the respective bucket items each including a value indicating a temporal most recent read time of the item and a version list of descriptions that describe respective versions of the respective records, the MVCC module performing timestamp order concurrency control, using the latch-free hash table. Recovery log buffers may be used as cache storage for the transaction engine.

18 Claims, 22 Drawing Sheets

(56) References Cited

U.S. PATENT DOCUMENTS

| | | | |
|---|---|---|---|
| 2008/0065670 A1* | 3/2008 | Cha | G06F 17/30356 |
| 2009/0070330 A1* | 3/2009 | Hwang | G06F 17/30551 |
| 2009/0132535 A1* | 5/2009 | Surtani | G06F 17/30356 |
| 2011/0145312 A1* | 6/2011 | Gokulakannan | G06F 9/5033 709/201 |
| 2011/0252000 A1 | 10/2011 | Diaconu et al. | |
| 2012/0005168 A1 | 1/2012 | Lomet et al. | |
| 2012/0117075 A1* | 5/2012 | Gokulakannan | G06F 17/30445 707/741 |
| 2012/0240126 A1* | 9/2012 | Dice | G06F 9/526 718/104 |
| 2012/0310991 A1* | 12/2012 | Frantz | G06F 17/30306 707/799 |
| 2013/0036105 A1* | 2/2013 | Lucas | G06F 17/30283 707/703 |
| 2013/0110767 A1 | 5/2013 | Tatemura et al. | |
| 2013/0339312 A1 | 12/2013 | Schreter | |
| 2013/0346725 A1 | 12/2013 | Lomet et al. | |
| 2014/0149527 A1 | 5/2014 | Lee et al. | |
| 2014/0379991 A1 | 12/2014 | Lomet et al. | |
| 2016/0357791 A1 | 12/2016 | Levandoski et al. | |
| 2017/0199818 A1 | 7/2017 | Lomet et al. | |

OTHER PUBLICATIONS

"MemSQL Architecture—The Fast (MVCC, InMem, LockFree, CodeGen) and Familiar (SQL)", Published on: Aug. 14, 2012, 14 pages, Available at: http://highscalability.com/blog/2012/8/14/memsql-architecture-the-fast-mvcc-inmem-lockfree-codegen-and.html.

Delaney, Kalen, "SQL Server In-Memory OLTP Internals Overview", In White Paper of SQL Server, Mar. 2014, 50 pages.

Rastogi, et al., "Versioning Algorithms for Improving Transaction Predictability in Real-time Main-Memory Databases", in Real-Time Systems, vol. 19, Issue 3 (2000), pp. 283-302 (2000), Retrieved on: Sep. 10, 2014, Available at: http:/Www.Cse.litb.Ac.In/~Sudarsha/Pubs-Dir/Datablitz-Rtss-Final.Pdf.

"Redo Processing", Published on: Oct. 7, 2011, 5 pages, Available at: http://www.datadisk.co.uk/html_docs/oracle_dg/redo.htm.

Pollett, Chris, "Checkpointing, Redo, Undo/Redo Logging", Published on: Apr. 20, 2005, 10 pages, Available at: http://www.cs.sjsu.edu/faculty/pollett/157b.12.05s/Lec20042005.pdf.

Zaitsev, Peter, "MVCC: Transaction IDs, Log Sequence Numbers and Snapshots", Published on: Dec. 19, 2007, 6 pages, Available at: http://www.percona.com/blog/2007/12/19/mvcc-transaction-ids-log-sequence-numbers-and-snapshots/.

Graefe, et al., "Transaction Support for Indexed Summary Views", In Proceedings of the ACM SIGMOD International Conference on Management of Data, Jun. 13, 2004, pp. 323-334.

Bardala, Venkata Ramana, "Concurrency Control Techniques", Lecture slides, Jan. 2012, 44 pages, Retrieved on: Sep. 10, 2014, 44 pages, Available at: http://home.iitj.ac.int/~ramana/ch12-concurrency-control.pdf.

Diaconu, et al., "Hekaton: SQL Server's Memory-Optimized OLTP Engine", In Proceedings of ACM SIGMOD International Conference on Management of Data, Jun. 22, 2013, pp. 1243-1254.

Larson, et al., "High-Performance Concurrency Control Mechanisms for Main-Memory Databases", In Proceedings of the VLDB Endowment, vol. 5, Issue 4, Dec. 2011, pp. 298-309.

Levandoski, et al., "Deuteronomy: Transaction Support for Cloud Data", In Proceedings of Fifth Biennial Conference on Innovative Data Systems Research, Jan. 9, 2011, pp. 123-133.

Levandoski, et al., "LLAMA: A Cache/Storage Subsystem for Modern Hardware", In Proceedings of the VLDB Endowment, vol. 6, Issue 10, Aug. 2013, pp. 877-888.

Levandoski, et al., "The Bw-Tree: A B-Tree for New Hardware Platforms" In Proceedings of IEEE 29th International Conference on Data Engineering Apr. 8, 2013, 12 pages.

Lomet, et al., "Multi-Version Concurrency via Timestamp Range Conflict Management", In Proceedings of IEEE 28th International Conference on Data Engineering, Apr. 1, 2012, 12 pages.

Lomet, et al., "Unbundling Transaction Services in the Cloud", In Proceedings of Fourth Biennial Conference on Innovative Data Systems Research, Jan. 4, 2009, 10 pages.

Reed, David Patrick, "Naming and Synchronization in a Decentralized Computer System", In Thesis of Massachusetts Institute of Technology. Dept. of Electrical Engineering and Computer Science, Sep. 1978, 187 pages.

Rosenblum, et al., "The Design and Implementation of a Log-Structured File System", In ACM Transactions on Computer Systems, vol. 10, Issue 1, Feb. 1992, pp. 26-52.

Sengupta, et al., "High Throughput Index Insertions using Blind Incremental Updates", U.S. Appl. No. 14/335,927, filed Jul. 20, 2014.

Levandoski, et al., "Indexing on Modern Hardware: Hekaton and Beyond", In Proceedings of ACM SIGMOD International Conference on Management of Data, Jun. 22, 2014, pp. 717-720.

"International Search Report and Written Opinion Issued in PCT Application No. PCT/US2015/054350", dated Feb. 5, 2016, 9 Pages.

March, et al., "A Read-Only Distributed Hash Table", In pJournal of Grid Computing, vol. 9, Issue 4, Apr. 27, 2011, pp. 501-529.

International Preliminary Report on Patentability dated Jan. 20, 2017 from PCT Patent Application No. PCT/US2015/054350, 6 pages.

Levandoski et al., "High Performance Transactions in Deuteronomy", Proceedings of CIDSR, Jan. 4-7, 2015, Asilomar, CA, 12 pages.

Dewitt et al., "Implementation Techniques for Main Memory Database Systems," SIGMOD, 1984, vol. 14, No. 2, pp. 1-8, 31 pages.

Gray et al., Granularity of Locks in a Shared Data Base, VLDB, 1975, pp. 428-451, 24 pages.

Fiellerstein et al., "Architecture of a Database System," Foundations and Trends in Databases, 2007, vol. 1, No. 2, pp. 141-259, 119 pages.

Kallman et al., "H-Store: A High-Performance, Distributed Main Memory Transaction Processing System," PVLDB, 2008, vol. 1, No. 2, pp. 1496-1499, 4 pages.

Kemper et al., "HyPer: A Hybrid OLTP & OLAP Main Memory Database System based on Virtual Memory Snapshots," ICDE, 2011, pp. 195-206, 12 pages.

Lahiri et al., Oracle TimesTen: An In-Memory Database for Enterprise Applications, IEEE Data Eng. Bulletin, 2013, vol. 36, No. 2, pp. 6-13, 8 pages.

Lee et al., "High-Performance Transaction Processing in SAP," HANA Data Eng. Bulletin, 2013, vol. 36, No. 2, pp. 28-33, 6 pages.

Leis et al., Exploiting Hardware Transactional Memory in Main-Memory Databases, ICDE, 2014, pp. 580-591, 12 pages.

Lim et al. MICA: A Holistic Approach to Fast In-Memory Key-Value Storage, NSDI, 2014, pp. 429-4-44, 18 pages.

Lindstrom et al., "IBM solidDB: In-Memory Database Optimized for Extreme Speed and Availability," IEEE Data Eng. Bulletin, 2013, vol. 36, No. 2, pp. 14-20, 8 pages.

Malviya et al., Rethinking Main Memory OLTP Recovery, ICDE, 2014, pp. 604-615, 12 pages.

Mao e al., "Cache Craftiness for Fast Multicore Key-Value Storage," EuroSys., 2012, pp. 183-196, 15 pages.

Michael, Maged M., "Scalable Lock-Free Dynamic Memory Allocation," PLDI, 2004, pp. 1-12, 12 pages.

Microsoft Azure Document DB, accessed via the internet archive at «http://documentdb.com», retrieved on Dec. 17, 2014, 2 pages.

Mohan et al., "ARIES: A Transaction Recovery Method Supporting Fine-Granularity Locking and Partial Rollbacks Using Write-Ahead Logging," ACM TODS, 1992, vol. 17, No. 1, pp. 94-162, 69 pages.

Rumble et al., "Log-structured Memory for Dram-based Storage, Fast," 2014, pp. 1-16, 17 pages.

Stonebraker et al., "The VoltDB Main Memory DBMS," IEEE Data Eng. Bulletin, 2013, vol. 36, No. 2, pp. 21-27, 7 pages.

Tu et al., "Speedy Transactions in Multicore In-Memory Databases," SOSP, 2013, pp. 18-32, 15 pages.

(56) References Cited

OTHER PUBLICATIONS

Wolf et al., "An Evaluation of Strict Timestamp Ordering Concurrency Control for Main-Memory Database Systems," IMDM Workshop, 2013, pp. 74-85, 12 pages.

Zheng et al., "Fast Databases with Fast Durability and Recovery through Multicore Parallelism," OSDI, 2014, p. 465-478, 14 pages.

* cited by examiner

400

HIGH PERFORMANCE TRANSACTIONS IN DATABASE MANAGEMENT SYSTEMS

CROSS-REFERENCE TO RELATED APPLICATION

This application claims priority to commonly owned U.S. Provisional Application No. 62/065,754, filed Oct. 19, 2014, with inventors Lomet et al., entitled "High Performance Transactions in Database Management Systems," which is hereby incorporated by reference herein, in its entirety.

BACKGROUND

Users of electronic devices frequently need to access database systems to obtain various types of information and/or perform various operations. Many different techniques have been devised for controlling storage and retrieval of data items. For example, some recent hardware platforms have exploited recent hardware developments such as multi-core processors, multi-tiered memory hierarchies, and secondary storage devices such as flash, in an effort to provide higher performance for electronic devices.

SUMMARY

According to one general aspect, a system may include an apparatus that includes a processor and a transaction component that includes a computer-readable storage medium that stores executable instructions that are executable by the processor. The executable instructions include a transaction engine that includes a multi-version concurrency control (MVCC) module that accesses a latch-free hash table that stores respective hash table entries that include respective buckets of respective bucket items that represent respective records. The respective bucket items each include a value indicating a temporal most recent read time of the item and a version list of descriptions that describe respective versions of the respective records. The MVCC module performs timestamp order concurrency control, using the latch-free hash table.

According to another aspect, a latch-free hash table is accessed. The latch-free hash table includes respective hash table entries that include respective buckets of respective bucket items that represent respective records, the respective bucket items each including a value indicating a temporal most recent read time of the each item and a version list of one or more descriptions that describe one or more respective versions of the respective records. A recovery log is used as a source of the one or more respective versions of the respective records. Timestamp order concurrency control is performed for a key-value store, using the latch-free hash table.

According to another aspect, a storage entity structured as a plurality of storage buffers is accessed using dynamic allocation of storage for newly arriving storage entity entries. An offset variable value indicating a next available location for newly requested storage allocation within a particular storage buffer is maintained, the offset variable value updated via an atomic fetch and increment (FAI) operation to add the size of a requested allocation to the offset variable value, the offset variable value further indicating a current number of active users of the particular storage buffer. Storage of an entry in the storage entity is initiated using dynamic allocation of storage in one of the storage buffers, and the offset variable value is updated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

I. Introduction

Figure 1:
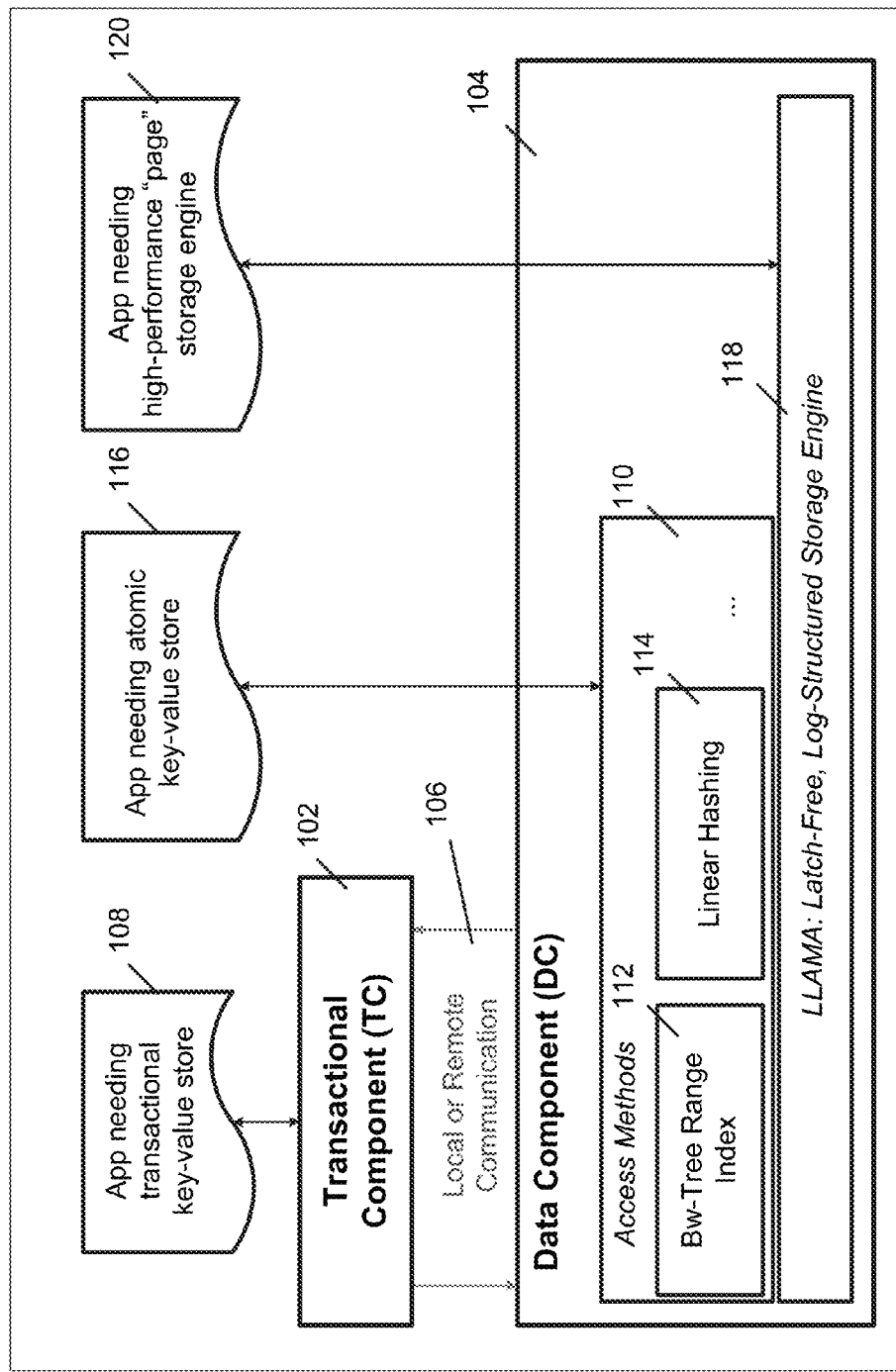
FIG. 1 depicts an example storage engine architecture.

Recent developments in hardware platforms have exploited multi-core processors, multi-tiered memory hierarchies, and secondary storage devices such as flash, in efforts to provide higher performance (e.g., speed, efficiency). For example, central processing unit (CPU) changes have included multi-core processors and main memory access that involves multiple levels of caching. For example, flash storage, and hard disk vendor recognition that update-in-place compromises capacity, has led to increased use of log structuring. For example, cloud data centers increase system scale, and the use of commodity hardware puts increased emphasis on high availability techniques.

Some example database management system (DBMS) architectures (e.g., the MICROSOFT DEUTERONOMY architecture) separate transaction functionality in a transaction component (TC) from data management functionality in a data component (DC). For example, a DC based on a BW-TREE architecture has achieved high performance via latch-free and log structuring techniques (e.g., executing operations more than a factor of 100 faster than the highest performance previously achieved in TCs used with example DEUTERONOMY DCs). In accordance with example techniques discussed herein, at least two orders of magnitude improved TC performance may be achieved. For example, multi-version concurrency control may be used to advantageously improve both concurrency and performance.

For example, and as discussed further below, recovery logs may be indexed for a version store (e.g., versions of records, as they are processed). For example, and as discussed further below, redo only logging may be implemented, e.g., to reduce recovery log versions (e.g., improving processing time and usage of hardware resources).

For example, and as discussed further below, bulk moves of recovery buffers may be applied at the data component (DC). For example, and as discussed further below, timestamp order multi-version concurrency control may be achieved using recovery log versions. For example, and as discussed further below, latch-free architectures (e.g., via latch-free techniques) may be implemented throughout.

As an example, the DEUTERONOMY architecture provides a clean separation of transaction functionality (performed in a transaction component (TC)) from data management functionality (performed in a data component (DC)). For example, a high performance DC (e.g., a BW-TREE key value store) may achieve high performance on modern hardware via latch-free and log structuring techniques, and may be used, e.g., as an indexing and storage layer in example systems. For example, such a DC may execute operations more than 100 times faster than example highest performing TCs implemented previously for such systems.

Using example techniques discussed herein, at least two orders of magnitude speedup in TC performance may be achieved (e.g., in comparison with previous example TCs used with the example DEUTERONOMY architecture). As an example, a full Deuteronomy stack may achieve very high performance overall.

For example, a TC may be constructed using (at least) latch-free data structures, log-structuring (e.g., BW-TREE types of techniques). As discussed further below, the TC may include multi-version concurrency control (MVCC) to improve concurrency and performance.

Further, redo recovery may be used, where the recovery log also serves as a version store cache for example MVCC techniques to avoid excessive copying and communication with the DC. For example, updates are batched at log buffer granularity and applied at the DC (which may be remote); a process that doubles as a log-structured cleaning technique for the in-memory log buffers.

Experimental results of an example prototype TC has scaled to 32 cores on an example 4 socket non-uniform memory access (NUMA) machine and has committed more than a million transactions per second for a variety of workloads.

As an example, the DEUTERONOMY architecture decomposes database kernel functionality into two interacting components such that each one provides useful capability by itself. Thus, a clean, layered separation of duties may be enforced where a transaction component (TC) provides concurrency control and recovery that interacts with one or more data components (DC) providing data storage and management duties (e.g., access methods, cache, stability). The TC knows nothing about data storage details (e.g., is "agnostic" to the data storage details of the DC). Likewise, the DC knows nothing about transactional functionality (e.g., is "agnostic" to the transactional functionality of the TC)—it may be implemented as a key-value store. For example, DEUTERONOMY may be realized via implementing a TC with a number of local and cloud-based DCs.

In this context, a "transaction" refers to a single unit of transactional functionality, which includes one or more operations (instructions) to be performed on various objects (e.g., database objects, key-value store objects, etc.). For example, a single "transaction" may include many different operations, to be performed (executed) as a unit, such that all such operations are successfully completed, or none of them succeed, at the termination of the transaction's execution. For example, a transaction may be characterized as an atomic unit of consistency and recovery. For example, a transaction may include multiple data manipulation and definition statements constituting a single transaction.

For example, transactions may be characterized as ACID: Atomic (meaning all or nothing), Consistent (if a user writes his program correctly for his application when executed all by itself, then it will work correctly inside a transaction where there may be concurrent activity going on in the system outside of the transaction), Isolated (changes that the transaction makes cannot be seen until the transaction is finished (committed) or which disappear if the transaction is aborted) and Durable (i.e., even if the system crashes at an inopportune time, the results of a committed transaction are guaranteed to persist). For example, in "serializability theory," transactions may be considered serializable if they can be viewed as having the same effects as if they were executed in some serial order.

Computer systems using transaction processing may employ a commit protocol to insure that no permanent change is made in a data item, or no change visible to other nodes of the system, until a specified "commit" is executed. In this context, to "commit" a transaction generally may refer to installing the results of a transaction in a data base. The ability to commit implies that the database system is capable of not installing the results of a transaction if the transaction is aborted. Not all transactions that are started eventually commit. A transaction that does not commit is said to abort. Among the reasons a transaction might abort are that power might fail, a system might crash, a concurrency conflict with another transaction might arise, or a user (or his application program) might detect another error and explicitly abort.

For example, a number of processes may be executing on various nodes, with each able to provisionally perform the actions of a transaction in a way such that the actions can be "undone" if the transaction needs to be aborted.

For example, "conflicting transactions" may refer two or more transactions including at least one transaction which may, at least potentially, access data updated by another one of the transactions. Thus the results generated by at least one of the conflicting transactions will depend on the order in which the transactions are performed.

A commit protocol may have several properties. For example, it may involve atomicity of transactions. Once a transaction is committed, the commit either reaches a totally completed state, or not complete at all, with no partial completion, so if a site or any part of a distributed system crashes during a commit operation, the system recovers to a state where all partially-completed parts are removed. Further, the system may be able to "forget" the outcome of commit processing after a time, i.e., not continue to carry stale data, since the likelihood of needing the data decreases rapidly with time when no crash occurs. Additionally, it is advantageous to minimize the overhead of log writes and message sending, for performance reasons.

For systems that support "undo" operations, the system may abort a transaction by "undoing" its actions, if any, and "forgetting" the transaction.

For systems that support locks, a "data lock" is a mechanism for assigning exclusive rights to a datum or record in a data base. For such systems, a first transaction may lock a particular piece of data so as to ensure that no other transaction accesses that data until the first transaction commits or aborts.

A multiversion database refers to a database which can be queried (i.e., asked or interrogated) as to what the state of the database was at a specified time. In such multiversion databases, also called temporal databases, updated data is "stamped" with a time value, usually with a time value corresponding to the time at which the data was updated. With appropriate support, a query of the timestamped database can provide a transaction consistent view of the database as it existed at a specified time. Such temporal queries can be of use in many computing scenarios.

For example, a transaction is completely "read-only" if no process performs any writes to the database for it.

As used herein the context of the transaction component, a "cache" may refer to an entity that is used to store items for efficient retrieval, in lieu of storing the items in the data component.

More generally, in computing, a cache is a component that transparently stores data so that future requests for that data can be served faster. For example, the data that is stored within a cache may be values that have been computed earlier or duplicates of original values that are stored elsewhere. If requested data is stored in the cache (cache hit), the request can be served by simply reading the cache, which is comparatively faster. Otherwise (cache miss), the data has to be recomputed or fetched from its original storage location, which is comparatively slower. Hence, the greater the number of requests that can be served from the cache, the faster the overall system performance becomes.

The example DEUTERONOMY architecture may be implemented with high performance on modern hardware using the BW-TREE latch-free access method and LLAMA, a latch-free, log structured cache and storage manager, to achieve a key-value store that executes several million operations per second. Not only can such a DC implementation provide a high performance, but it may offer a further architectural decomposition that maintains a "hard" separation between access methods and a latch-free, log structured cache and storage engine.

For example, FIG. 1 depicts an example storage engine architecture 100 for an example database management system (DBMS). As shown in FIG. 1, an example TC 102 communicates with an example DC 104 via local or remote communication 106. For example, if the TC 102 and the DC 104 are located locally to each other, the communication 106 may be "local" communication, whereas if the TC 102 and the DC 104 are located remotely from each other, the communication 106 may be "remote" communication. For example, if portions of the components 102, 104 are local to each other, and other portions are remote, then the communication 106 may be a mix of "local" and "remote" communication.

The example of FIG. 1 illustrates an app (application) 108 needing a transactional key-value store in communication with the example TC 102. As shown in FIG. 1, the example DC 104 includes access methods 110 that include, at least, a BW-TREE range index 112 and linear hashing 114. The example of FIG. 1 illustrates an app (application) 116 needing an atomic key-value store in communication with the example access methods 110 of the DC 104. As shown in FIG. 1, the example DC 104 includes a latch-free, log-structured storage engine 118 (e.g., LLAMA). The example of FIG. 1 illustrates an app (application) 120 needing a high-performance "page" storage engine in communication with the example latch-free, log-structured storage engine 118 of the DC 104.

With a DC capable of millions of operations per second (ops/sec), a "slower" TC may become a bottleneck. For example, a TC architected in a "traditional" manner (e.g., undo/redo recovery, lock manager, etc.) may be still limited to a few tens of thousands of ops/sec.

Example techniques discussed herein may be used for design and implementation of a high performance transaction component. As an example, a TC architecture may be designed and utilized to achieve (at least) a two order of magnitude speedup to match DC performance (e.g., as with the example DC discussed above). As an example, lock management may be replaced with multi-version concurrency control (MVCC) managed by latch-free structures and techniques. As another example, undo/redo recovery may be replaced with pure redo recovery where the recovery log also serves as a version store for the example MVCC approach. As another example, undo/redo recovery may be used as well, for example, by storing undo versions in the recovery log In accordance with example techniques discussed herein, the communication between the TC and DC may be achieved by advantageously implementing TC caching and migrating committed record versions to the DC during the TC log buffer cleaning/recycling process (e.g., sending full log buffers from TC to DC if the two are remote). Further in accordance with example techniques discussed herein, the TC can interface with any number and flavor of DC key-value stores, whether local or remote.

Generally, a TC may be only part of a transactional key value store or database kernel; its function is to provide transactional concurrency control and recovery. In accordance with example techniques discussed herein, an example TC may exploit the characteristics of new hardware (e.g. multi-core, memory hierarchy, and flash storage) using a number of techniques such as latch-freedom, log structuring, and minimizing update-in-place via copy-on-write delta updating. Further, as components may be designed to permit (perhaps wide) separation, caching is introduced at the TC to minimize transaction latency. Additionally, example multi-version concurrency (MVCC) techniques may be utilized in the TC.

For example, efficient, high performance design considerations may include factors such as a desire to limit data traffic between the TC and DC to only that needed by DBMS kernel functional decomposition, a desire to minimize data movement and copying within the TC, and/or a desire to exploit batching to reduce overhead/operation. It may also include caching data at the TC.

Figure 2:
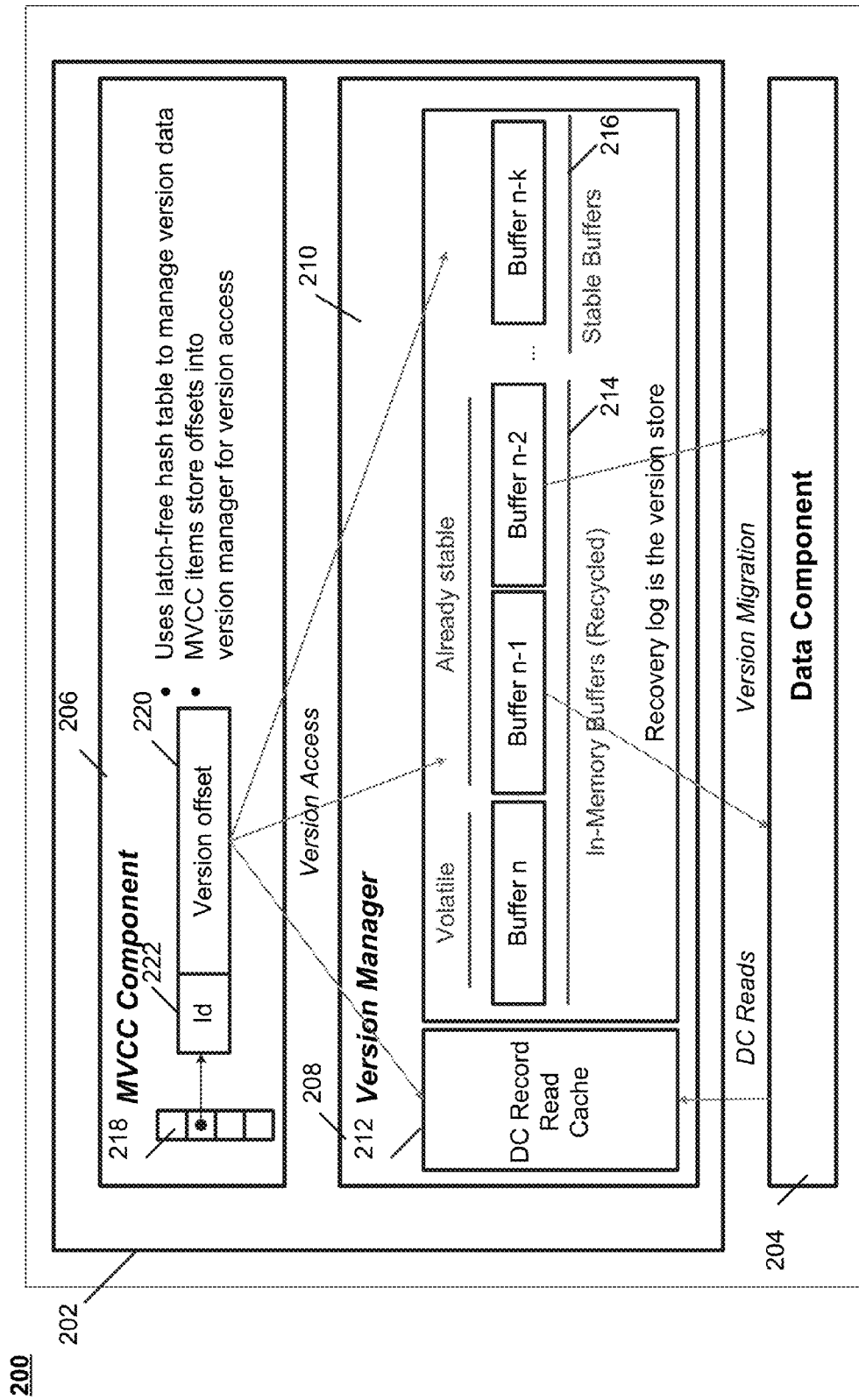
FIG. 2 illustrates example data flow through an example transactional component communicating with an example data component.

FIG. 2 depicts a block diagram 200 of an example high performance transaction component (TC) 202, illustrating the flow of data within the TC 202, and between the TC 202 and the DC 204, in accordance with the discussion herein. As shown in FIG. 2, the example TC 202 includes two main components: (a) an MVCC component 206 to manage the concurrency control logic and (b) a Version Manager 208 to manage a redo log (also used as a version store) 210 as well as cached records 212 read from the DC.

An example issue that may arise is how a user may be able to cache data at the TC. Since MVCC is used for this example, versions are cached somewhere for concurrency control purposes. In accordance with example techniques discussed herein, the redo log 210 may be used as the TC record version cache. For this example, the version manager 208 maintains the redo log 210 that (for this example) includes k in-memory buffers 214 (and a large number of stable buffers 216), where in-memory buffers 214 are sealed and made stable once full. In-memory buffers 214 are recycled and reused. Since versions resulting from updates are logged for redo recovery, they already have a home on the recovery log (redo log 210). The recovery log buffers 214, 216 may be used to hold versions while they are accessed via the MVCC component 206, which stores version offsets 218 as part of its record metadata and requests them through the Version Manager 208 interface.

Versions of data not yet updated may need to be acquired from the DC 204. To make them accessible to the MVCC component 206, the Version Manager 208 retains these versions in the read cache 212. Both read cache 212 and recovery log buffers 214, 216 are subject to different forms of log structured cleaning (garbage collection). Thus, an MVCC 206 request to the version manager 208 could hit (1) the read cache 212; (2) an in-memory log buffer 214; or (3) a stable log buffer 216 (if the in-memory buffer for the target offset was already recycled). Example details of efficient cache management are discussed further below.

To minimize data movement, updates are posted immediately in their "final resting place" on the recovery log. Because the recovery log buffers 214, 216 are used as part of the example cache, pure redo logging (i.e., without "undo" logging) may be utilized to avoid diluting the cache with undo versions as well as the redo versions. Immediately logging updates means that uncommitted updates are on the log without means of undoing them if their transaction was aborted. Thus, updates are not posted to the DC 204 until it is known that the containing transaction has committed. Updates from aborted transactions are thus not applied at the DC 204.

Figure 3:
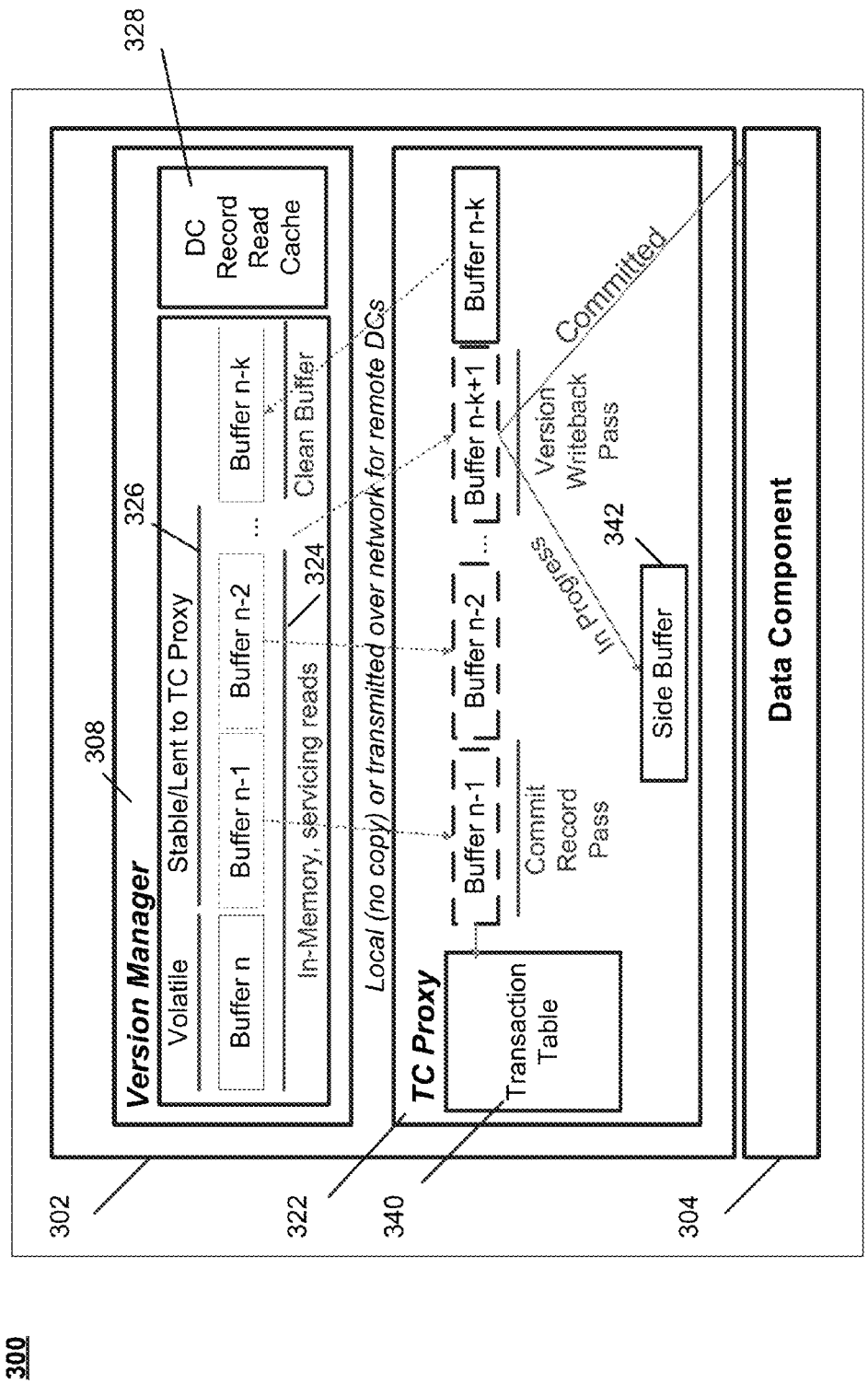
FIG. 3 illustrates an example transaction component proxy in communication with an example data component.

As shown in FIG. 3, an example TC 302 may include a TC Proxy 322: a piece that is intended to reside next to the DC 304. For example, the TC Proxy 322 may receive log buffers 324 from the version manager 308 sometime after the buffer is stable, and posts its updates to the DC 304 as appropriate. Posting may be done after the transaction responsible for the update is known to have committed. This posting is how the log buffer is garbage collected when the TC proxy 322 is local with the TC 302. Otherwise, cleaning occurs once the buffer has been sent to a remote TC proxy 322. As posting updates to the DC 304 is not part of the latency path of any operation, it may be done in the background. However, the posting of the updates to the DC 304 enables the garbage collection of MVCC entries.

Example transactional components discussed herein may be utilized as a piece separate from, but able to exploit, high performance BW-TREE key value stores, or any key value store used as a data component. For example, performance gains in TC design may be realized by using:

1. Multi-version concurrency control exploiting a variant of timestamp order concurrency control;
2. Fast transaction commit that avoids a read-only transaction issue in a highly efficient way;
3. Commit records in the recovery log as a queue for the deferred delivery of transaction outcome messages, once the recovery log buffer is durable;
4. Version management that exploits the recovery log buffers as a log structured store cache at the TC;
5. Batching updates in log buffers when sending them to the DC and posting them from a TC proxy;
6. Applying each update by the TC Proxy at the DC using a blind write operation that does not require reading a prior version; and/or
7. Example latch-free cache mechanisms in buffer management and epochs that remove performance bottlenecks, as discussed further below.

Timestamp order concurrency control involves assigning a timestamp TS1 to a transaction T1 such that all the transaction's writes are associated with TS1, and all reads are reads of versions that are visible at TS1. A correct timestamp order schedule of operations using the timestamps is then enforced. In particular, transactions are aborted when the timestamp ordering cannot be maintained.

It is possible to use multiple versions to support lower levels of transaction isolation. For example, snapshot isolation may avoid validating read/write conflicts. If a design focus is on enabling serializability, an advantage of timestamp order is that no validation step is required at the end of a transaction. Validation happens at access time.

In accordance with example techniques discussed herein, the TC may track transactions via a transaction table (TT). Each entry in the TT denotes a transaction, with a transaction id (TID), a timestamp issued when the transaction starts, and a linked list (via the MVCC versions) of the updates made by the transaction. Within the MVCC hash table, each version is marked with a TID. This permits an easy check of the transaction information for each version, including its timestamp. A flag in the TT indicates whether the transaction is active, committed, or aborted. Periodically, the oldest active transaction is computed (the one with the oldest timestamp), called the OAT, so that version garbage collection may be performed.

In accordance with example techniques discussed herein, the "fast commit" optimization may be utilized, such that the TC acts as if the transaction has committed once its commit record is written to the recovery log buffer, except for notifying users of the commit. For that, the notification may be delayed until the recovery log buffer containing the commit record is stable. This technique is acceptable for read/write transactions for which commit records are written, and for which their commit message is not returned to the user until commit is durable.

Read only transactions may typically not write such a commit record, rather returning once a commit operation is encountered. This may involve a logical bug if a version read by such a read-only transaction is not durable, as a system crash would abort the writer. To avoid this issue, a commit record may be written for read only transactions, hence delaying users of the commit until everything that they read is stable.

For example, when doing this, the writing of commit records for read-only transactions may become a performance bottleneck. In accordance with example techniques discussed herein, this situation may be optimized by tracking the newest version that a read transaction has read so far (the version whose transaction commit record has with the highest LSN). Then writing a commit record is avoided for such a reader if it can be determined that that version is already stable (meaning that all versions read by the transaction are committed, and there is no need to delay the read-only transaction's commit). Example techniques for handling transaction commit notification is discussed further below.

In accordance with example techniques discussed herein, a latch-free hash table may be maintained to manage MVCC data. For example, versions may be hashed to a bucket based on their key. Each bucket item represents a record and includes the following entries: (a) a fixed-sized hash of the record key; (b) a pointer to the full key (keys can be variable length); (c) the last read time of the item; and (d) a version list describing the version(s) for the record. Such an example fixed length layout may be used for performance reasons: it is both allocator friendly and guarantees items stay within cache line size (advantageous if threads are simply "passing by" looking for other items in the bucket chains). To perform record lookup, the fixed-sized hash is compared to the hash of a lookup key; if the hashes match the full key pointer is dereferenced and a full key comparison is performed to ensure it is the correct key. The version list is then traversed to find the appropriate version to read. The last read time on the item may be used in an example timestamp order concurrency control approach: it represents the last read time of the most recently written version, and indicates that no later writer of a new version A can commit ahead of a reader of an earlier version B in timestamp order.

In accordance with example techniques discussed herein, items in the version list may be fixed size and include: (a) the transaction id (TID) of the creating transaction; (b) the version offset used to reference the payload from the version manager; and (c) an "aborted" bit used to signify that this version is garbage and the transaction that had created it aborted—this may be used as a fast track for the garbage collection process (as further discussed below).

In accordance with example techniques discussed herein, both the hash table bucket lists and version lists are maintained using a latch-free updating protocol. For example, new entries may be prepended to lists using a compare-and-swap (CAS) operation. A challenging aspect of managing the list is deleting items (or version) that are no longer needed from arbitrary positions in the list. For this example, it is not required to use a completely general latch-free list that works in this manner. Rather, the example technique may advantageously always delete from the end of the list using a CAS. This works in this example since the earliest versions (the versions that become stale and are eventually garbage collected) are naturally positioned at the end of the list. This latch-free removal design may advantageously simplify implementations and naturally mitigate many corner case bugs prevalent in latch-free programming.

To provide pointer stability in the latch-free lists, an example epoch mechanism may be utilized to ensure that freed memory (e.g., a record version) is not reused until active threads can no longer dereference a pointer to that memory location (as discussed further below).

In accordance with example techniques discussed herein, the MVCC may conservatively maintain versions that can be seen by uncommitted transactions by keeping all updated versions back to and including those visible to the OAT. Any updated versions older than that cannot be seen by active transactions and can be discarded from the example hash table once they are also known to have been applied at the DC. In addition, versions visible only to the OAT may be dropped from the MVCC hash table when there are no later versions. Versions needed but not present in the MVCC table can then be read from the DC. As discussed further below, the TC proxy may concisely report progress of installing versions at the DC to the TC.

In accordance with example techniques discussed herein, the primary job of the TC includes providing fast access to versions. For example, the TC may serve requests for versions from two locations. The first is directly from in-memory recovery log buffers (e.g., buffers 214, 216). The second is a "read cache" (212) used to hold hot versions that may not have been written recently enough to remain in the recovery log buffers.

In accordance with example techniques discussed herein, the TC 202 approves and mediates all updates, which allows it to cache and index the versions that are updated through it. To make this efficient, the TC 202 makes dual-use of both its recovery log buffers and its MVCC metadata table. When a transaction attempts an update, it first seeks approval by MVCC 206. This permission, if given, results in the new version being stored in a recovery log buffer within the Version Manager (e.g., the buffers 214, 216 of version manager 208). Afterward, an entry for the version is created in the MVCC hash table 218 that includes an offset 220 to the version and associates it with the updating transaction (e.g., transaction ID 222). Later reads for that version that are approved by the MVCC 204 can quickly find the data in memory. Thus, in addition to concurrency control, the MVCC 204 serves as a version index, and the in-memory recovery buffers 214, 216 together with read cache 212 fill the role of a cache.

In accordance with example techniques discussed herein, the MVCC 206 uses a latch-free hash table 218 to manage version data. In accordance with example techniques discussed herein, MVCC items store offsets (e.g., version offset 220) into the version manager 208 for version access.

In accordance with example techniques discussed herein, each updated version stored at the TC 202 serves both as an MVCC version and as a redo log record for the transaction. The TC 202 uses pure redo logging and does not include before images in these log records. Versions are written immediately to the recovery log buffer, which means that updates are not applied at the DC 204 until it is known to be committed, since there is no way to undo the update (in this example), which is ensured by the TC Proxy 322.

Recovery log buffers are written to stable storage to ensure transaction durability in the usual way. However, the buffers are also retained in main memory to function as a main memory cache for the versions. In accordance with example techniques discussed herein, buffers are recycled eventually in a lazy manner via a log structured cleaning process that results in the relevant updates being sent by the TC Proxy 322 to the DC 204 (304). The version manager 308 initiates this process by lending or sending stable buffers 326 to the TC Proxy 322 (depending on whether the DC 304 is local or remote).

Preexisting versions in the DC 304 and versions whose metadata has been removed from the MVCC table 218 may need to be read from the DC 304. These versions are placed in a read cache 328 maintained by the version manager 308, and metadata entries are added to the MVCC table 218 for them. The example cache 328 may include latch-free, log-structured buffers that are populated and cleaned in first-in-first-out (FIFO) order. As a further example, a second-chance cleaning policy that approximates least-recently-used, may be implemented by copying versions from the head of the log to the tail if the version has been referenced since the last cleaning pass.

Somewhat similar to the LLAMA cache/storage subsystem, posting versions to either recovery log buffer or read cache buffer may be performed in a fully latch-free fashion. While the buffer space reservation involves coordination, copying of data can advantageously proceed in a thread safe manner without coordination. For example, the scalability of buffer space reservation may advantageously be improved by using a commutative atomic-add operation in lieu of a compare-and-swap operations, as discussed further below.

One example focus of the TC proxy 322 is to receive stable recovery log buffers from the TC 302 and to efficiently apply the versions within them to the DC 304 while obeying the write-ahead-logging protocol. For example, the TC Proxy 322 runs co-located with the DC 304. It enforces a well-defined contract that separates the TC 302 and the DC 304 sufficiently to allow the DC 304 to run locally with the TC 302 or on a remote machine.

In accordance with example techniques discussed herein, once a recovery log buffer is stable, it is sent directly to the TC Proxy 322 without further manipulation; the recovery log buffer itself may act as an update batch. For this example, it is only at the TC Proxy 322 that the operations are unbundled and submitted to the DC 304 as appropriate.

When the DC 304 is local, it avoids copying the recovery log buffer by borrowing a reference to it from the Version Manager 308. In the case that the DC 304 is remote, the networking subsystem similarly holds a reference to the buffer, but only until the remote TC Proxy 322 has acknowledged its receipt.

In some example DBMS designs, updates may be sent to the DC as they are generated, and if a transaction aborts, undo operations are sent to the DC to compensate for the earlier updates. In those example DBMS designs, TC operations may be latency-bound since it issues writes directly to the DC. Further, the updates may be sent prior to their being stable on the recovery log. Indeed, the updates may be sent prior to their being on the recovery log at all. In those example DBMS designs, an end-of-stable-log control operation may inform the DC when operations should be made stable to enforce the write-ahead log protocol.

However, in accordance with example techniques discussed herein, all updates are on the stable log 216 at the time that they are sent to the TC Proxy 322. It is thus safe for the TC Proxy 322 to apply any committed operation to the DC 304 without delay. However, end-of-stable-log may serve another useful purpose that may still be worthwhile: the DC 304 can use it to determine when it has seen all operations up to some sequence number (e.g., a log sequence number (LSN)). This permits it, for example, to re-organize and optimize its storage layout to simplify idempotence checking.

Advantageous performance may depend upon processing log records as close to a single time as possible. Unlike some other example designs, the pure redo design discussed herein involves only durably committed operations being submitted to the DC 304. Ideally, the TC Proxy 322 would only encounter committed records when it processes a recovery log buffer. Then, all operations could be applied as they were encountered. When the scan of the buffer completed, the buffer could be marked as clean and reused.

To make that "ideal" scenario "almost true", update processing of buffers may be delayed, as shown in the example of FIG. 3. As shown in FIG. 3, the TC Proxy 322 queues multiple buffers (all stable), but it immediately scans arriving buffers for commit records and updates its transaction table 340. Only after some delay is a subsequent scan performed to apply operations. By the time the scan is performed to apply operations, almost all operations in the buffer will have a stable commit record, identified by earlier commit scans of later buffers.

In the example of FIG. 3, the TC Proxy 322 receives full, stable recovery log buffers from the TC 302. An eager pass updates transaction statuses; a lazy pass applies committed operations to the DC 304. Delaying application to the DC 304 minimizes the number of operations that are relocated into a side buffer 342.

In accordance with example techniques discussed herein, commit records within a buffer may be linked together to minimize the cost of the commit scan phase. This enables skipping over the intervening operation log records, which may typically be the substantial majority (e.g., 90%) of the log records. In accordance with example techniques discussed herein, each commit record may include the return message that is to be sent at the end of the transaction. Thus, the commit log records may act as a durable queue of responses to commit requests, saving the TC from a need for a separate mechanism to store commit messages while it waits for a recovery log buffer containing the messages to be made stable. These commit messages are sent to users executing the transactions during the commit scan when the TC Proxy 322 is local to the DC 302. In the remote case, the commit scan may be performed just before sending the buffer to the TC Proxy 322; the TC Proxy 322 maintains a "shadow" transaction table to track commit progress which is updated as usual when it receives the buffer. The TC 302 may also support a non-durable commit to permit application programs to improve their multi-threaded performance.

Sometime after being scanned for commit records, each log buffer is scanned again to apply operations at the DC 304. All operations of transactions known to be committed are applied. Operations of transactions known to be aborted are discarded. Operations of transactions whose outcomes are not known are relocated into a side buffer 342. The result is that at the end of the operation scan, the entire recovery log buffer is cleaned and can be reused. For example, the side buffer strategy discussed above may work well when very few operations have undecided outcomes. The side buffer 342 space requirements for storing the undecided transaction operations may be very modest. These operations are applied to the DC 304 once they are determined to be committed, and discarded when they are determined to be aborted.

In accordance with example techniques discussed herein, over time, version metadata is garbage collected from the MVCC 206. The MVCC 206 uses the transaction table to track the oldest active transaction's timestamp (OAT) and only discards metadata for versions that are not visible to all ongoing and future transactions, with a possible exception of those visible to the OAT (as discussed above). This prevents the MVCC 206 from removing metadata needed to correctly perform concurrency control for the active transactions.

However, if the MVCC 206 were allowed to drop metadata about versions that have not been applied at the DC 304, such actions may result in the TC 302 reading incorrect versions. For example, if a read is performed on a key for which the MVCC 206 has no metadata, it forwards the read to the DC 304. If the TC 302 wrote a newer version for the key that the MVCC 206 has "forgotten", then when the read is issued to the DC 304, a version that is too new could be returned.

To prevent this, MVCC 206 metadata garbage collection may be aware of the progress of recovery log application to the DC 304. For example, the TC Proxy 322 may provide a concise two-integer summary to the TC for this purpose (e.g., as discussed further below). By delaying the removal of metadata from the MVCC 206 until operations are applied at the DC 304, the TC 302 may ensure that it always tracks the read and write timestamps of every version except the one for each key that is older than all other versions and is safe to be read from the DC by all transactions moving forward.

For example, the TC Proxy 322 could use a single LSN to track the earliest unapplied version in the log to report progress to the TC 302. Unfortunately, this may allow long running transactions to stall MVCC 206 garbage collection. To solve this, the TC Proxy 322 may use a T-LSN and O-LSN that are maintained in the two separate passes the TC Proxy 322 performs. For example, the O-LSN may track the prefix of the log that has been applied at the DC 304 excluding operations belonging to transactions with a commit record LSN greater than the T-LSN. For this example, no transaction can hold back the O-LSN or T-LSN. An MVCC 206 version may be safely disposed of (e.g., garbage collected) at the DC if its LSN is less than or equal to the O-LSN and its transaction's commit record is less than or equal to the T-LSN. For example, the T-LSN and O-LSN may be used to track which versions have been applied at the DC and thus, they are installed before these LSNs can be advanced. In other words, these LSNs indicate what has already been applied at the DC.

In accordance with example techniques discussed herein, buffer management may be implemented using fetch and increment (FAI) operations instead of compare-and-swap (CAS) operations when allocating space in a buffer. In this context, the "fetch and increment (FAI)" operation refers to an indivisible executable instruction that returns the value of a memory location and atomically increments it.

For example, a one word OFFSET may be maintained, indicating where the next storage within a buffer is to be allocated. For this example, one may assume a word size of 32 bits; however, one skilled in the art of computing will understand that a "word" (in a computing environment) may involve any number of bits (e.g., 16 bits, 60 bits, etc.), depending on the context of use. Furthermore, one skilled in the art of computing will appreciate that OFFSET may be implemented as a variable entity other than a "one word" entity.

For example, OFFSET may be initialized to zero when the buffer is empty. When allocating space, an FAI instruction may be executed to add the SIZE of the allocation to the OFFSET. The requestor of space then subtracts his SIZE from the offset value returned to him to determine the start of his allocated space. Not only does FAI provide better performance than CAS, but in most cases, there are no losers. Multiple FAIs can succeed, and each will return a different result (and hence a different region of the buffer) to the space requestor.

In accordance with example techniques discussed herein, it may also be desirable to track the number of active users of the buffer. For example, this may be accomplished by including a USERS field as a word-sized prefix to the OFFSET field (e.g., in the context of the "one word" OFFSET). For example (assuming a 32-bit "word"), both these fields may be incremented by using as the "increment" a value of 232+SIZE so that an allocation request both reserves space in the buffer and increases the number of users as recorded in the USERS field. When a user completes writing of data into the buffer space that it has reserved, it may decrement the USERS field using an FAI to indicate that it is no longer an active writer. One skilled in the art of computing will understand that values other than 232 may be added to SIZE, to accomplish the addition of 1 in the proper bit position (2(word size) in this example) of the USERS field. (In this context, "xy" indicates raising "x" to a power indicated as "y").

In accordance with example techniques discussed herein, this may be cleanly terminated when the buffer fills and the buffer may be "sealed" so that others will see that it should no longer be used—and thus shift their attention to the next buffer. Further, when the buffer is filled, and the USER field is zero (indicating that there are no threads writing data into the buffer), it may be written to secondary storage.

For example, it may be determined whether a buffer can be sealed by whether the OFFSET produced by an FAI is larger than the buffer extent and the USER field is zero. When that happens, the thread that caused this may set a SEAL flag for the buffer using a CAS. If the CAS succeeds, the thread may schedule the buffer write. The SEAL flag can conveniently be represented by a bit in either the USERS or the OFFSET part of the double word.

Generally, lock-free data structures may pose challenges for memory reclamation. For example, when an item is unlinked from a lock-free structure, some threads may still be accessing the item. In accordance with example techniques discussed herein, to make this "safe", the TC 302 may use an epoch-based mechanism to provide pointer stability; it may post unlinked items to a garbage list where the unlinked items remain until no thread can reference them again. In accordance with example techniques discussed herein, a latch free epoch manager may be implemented using FAI instructions (operations) in lieu of CAS instructions (operations).

For example, the TC's epoch protection may be implemented using a monotonically increasing global epoch (e.g., an unsigned 64-bit integer), a set of thread-local epoch variables (e.g., aligned on separate cache lines), and a garbage list where each item is held until it is safe to reuse its memory.

In accordance with example techniques discussed herein, whenever a thread starts a TC operation (e.g., read, write, commit, etc.) it copies a snapshot of the global epoch into its slot in the thread-local epoch set. After completing the TC operation the thread sets its thread-local epoch to ∞ (or some value representing a "non-normal" value, for comparison against "normal" values for the thread-local epoch values—or some predefined, epoch-meaningful value representing that the thread has completed the TC operation). For this example, each thread-local epoch serves as an indicator to reclamation operations "when" the thread entered the TC and what it might have observed.

In accordance with example techniques discussed herein, when an item is unlinked from one of the TC's internal data structures, a snapshot of the global epoch is taken and is enqueued onto the garbage list along with a pointer to the unlinked item. In accordance with example techniques discussed herein, each time an item is added to the garbage list, an old item is removed and returned to the memory allocator. The garbage list is a fixed-size ring, and thus, when a new item is inserted at the head of the ring, the old item is first removed and deallocated (if it is safe to do so).

For the example discussed above using "∞" values, to determine if it is "safe" to deallocate an item, the epoch stored with the item reference may be compared with the minimum epoch found in the thread-local epoch set. If the item's epoch is smaller, then no thread has a reference to the item (i.e., for this example, the item must have been unlinked before any of the threads in the thread-local set entered the TC).

Recomputing the minimum epoch from the thread-local epoch set for each item to be deallocated may be more frequent than is needed. Instead, the minimum thread-local epoch may be recomputed whenever the global epoch is incremented or if items in the list cannot be reclaimed because of low thread-local epochs.

Finally, the global epoch may be incremented periodically whenever the garbage list has accumulated a significant number of new items that need to be returned to the allocator. For example, this may be accomplished via an atomic FAI. For example, each time the fixed-size garbage list has overwritten one-fourth of its capacity the global epoch may be incremented and the minimum thread-local epoch may be recomputed and cached.

Overall, the example epoch protection discussed herein may involve only a small fraction of the total cost of each TC operation (e.g., less than 0.1% of wall time), even though it is on the fast path, likely due to three factors. First, there are no locked, atomic, contended, or uncached operations on the fast path. Threads entering and exiting the TC 302 need only consult the (slowly changing) global epoch and update a single word in an exclusively owned cacheline. Second, it takes advantage of the fact that TC operations are short and non-blocking to protect all of the TC's data structures with a single epoch enter/exit call pair per TC operation. This also makes programming within the TC easier, as all TC operations can safely hold and use references to any item in any data structure for the entire duration of the operation. Finally, all of the heavy work and cache coherence overhead of determining the minimum thread-local epoch is amortized across hundreds-of-thousands of unlink operations.

Whether it is done by scheduling threads according to data partitions or managing them in some other way, sensible and careful thread management may provide high performance using modern multi-core processors. For example, understanding the "geometry" of the cores may be weighed as well.

Despite an example DBMS kernel's lock (latch)-freedom, peak performance may not be obtained by blindly running across more cores. For example, work may be partitioned as the system scales beyond a single CPU socket. At the same time, a goal of building a general-purpose and easy-to-use system may prevent a designer from mandating any kind of partitioning between transactions; the designer may want the best performance possible even with workloads that do not partition cleanly by data.

In accordance with example techniques discussed herein, instead of dividing work in a data-dependent way, an example DBMS kernel may scale by splitting TC and TC Proxy/DC operations onto separate sockets when load exceeds what can be handled within a single socket. This allows it to leverage more cores and reduces cache pressure on both modules at the cost of increasing cache coherence traffic between them. It also makes advantageous use of the processor interconnects topology by attempting to prevent communication between processor pairs with no direct connection.

For example, at full load, the DC 304 may include a thread pool of up to 16 additional threads pinned to a single socket; the precise number of threads may adapt to attempt to ensure that the DC 304 applies operations as quickly as they are logged by the TC 302. For example, to the extent possible, TC 302 transaction processing may occur on hardware threads from adjacent sockets first, only spilling onto core that are two "hops" from the DC 304 when necessary.

As an example, a DBMS kernel may use a specialized asynchronous programming pattern to give it tight control over scheduling, to avoid thread context switch overheads, and to avoid the wasted stack space of threads. The pattern may be optimized to avoid expensive heap allocation of context state in the common case.

For example, this asynchronous pattern may involve the use of a "continuation" whenever an asynchronous event (e.g., an I/O) may make immediate and synchronous successful completion of a request impossible. For example, the continuations may typically involve only the re-execution of the request. However, each system level that involves re-execution will add its continuation to the set that constitutes the full continuation. Further, continuations should be on the heap when needed, as the return path will have folded up the stack allocations.

Such an example DBMS kernel, unlike a naïve use of asynchronous continuation posting, may store its continuations on the stack, not the heap. When the execution of an operation can be done synchronously, e.g., when needed data is in the cache, all heap allocation is avoided. Only when the asynchronous path is involved, e.g., the operation involves performing an I/O operation to bring needed data into the cache, are the continuations copied from the heap to the stack. This simple technique has an advantageously substantial impact on system performance, meaning that when, e.g., data is all in memory, that the heap allocation overhead is completely avoided.

Experimental results have indicated that an example DBMS kernel, using example techniques discussed herein, provides performance that is competitive with modern, monolithic main memory databases on realistic workloads. For this example DBMS kernel, TC uses a BWTREE-based DC.

As a general-purpose transactional engine, the TC makes few assumptions about its workload. Initial experimental results discussed herein explore the impact of multi-core and read-write mix on TC performance. An example experimental machine setup is described in Table 1, shown below. Each of its four CPUs reside in separate NUMA nodes, which are organized as a ring.

TABLE 1

| | |
|---|---|
| OS | Windows ® Sever 2012 |
| CPUs | 4 x Intel ® Xeon ® E5-4650L |
| | 32 total cores |
| | 64 total hardware threads |
| Memory | 192 GB DDR3-1600 SDRAM |
| Storage | 320 GB Flash SSD |
| | Effective read/write: 430/440 MB/s |
| | Effective read/write IOPS: 91,000/41,000 |

For the example experimental results discussed herein, workloads similar to the YCSB (YAHOO! Cloud Serving Benchmark) benchmarks were utilized. For example, the DC database was preloaded with 50 million 100-byte values. For example, client threads read and updated values with keys chosen randomly using a Zipfian distribution with skew chosen such that 20% of the keys receive 80% of the accesses. For example, transactions were created by grouping operations into sets of four. For example, recovery logging and DC updates shared a single commodity SSD (solid state drive).

Figure 4:
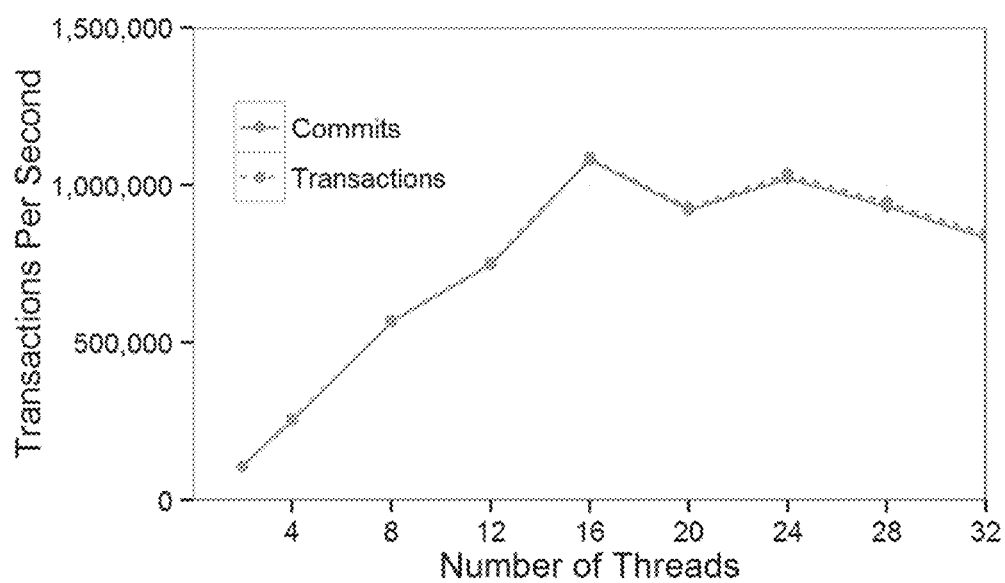
FIG. 4 illustrates example experimental data results measuring performance of an example transaction component.

FIG. 4 shows the example DBMS kernel's experimental results performance as the TC was scaled across multiple cores. Overall, 84% of the operations issued were independently and randomly chosen to be read operations; this resulted in 50% of transactions being read-only with the other half issuing one or more writes. Using 16 threads (a single socket) the example DBMS kernel performed 1.1 million transactions per second (4.4 million total operations per second) with an insignificant abort rate.

The example of FIG. 4 indicates an increase in performance as the example experimental TC expands to execute transactions across more hardware threads. For the example of FIG. 4, the DC uses up to 16 additional hardware threads (not included in the count on the axis). For this example, performance scaled across two sockets but leveled off as more NUMA groups were involved. For this example, beyond 16 threads performance was limited primarily by TC Proxy+DC performance.

As discussed herein, the example TC provides transactional support for typical key-value store CRUD operations (e.g., to create (C), read (R), update (U), or delete (D) a record). The example techniques discussed herein provide 100 times the performance of previous TCs for similar DBMS kernels, even while providing full transactional durability. Part (but not all) of this performance is due to the use of an example data component, which is based on the BW-TREE and LLAMA that together provide an atomic record store.

Thus, example techniques discussed herein may aid in realizing stateful transactional resource managers. An example architectural framework as discussed herein may enable such resource managers to be built with reusable components, each component providing useful functionality in and of itself. Example latch-free and log structured implementation approaches discussed herein enable the construction of these components with very high performance. This combination of architectural flexibility and advantageous performance may provide very desirable DBMS products.

II. Example Operating Environment

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

Figure 5A:
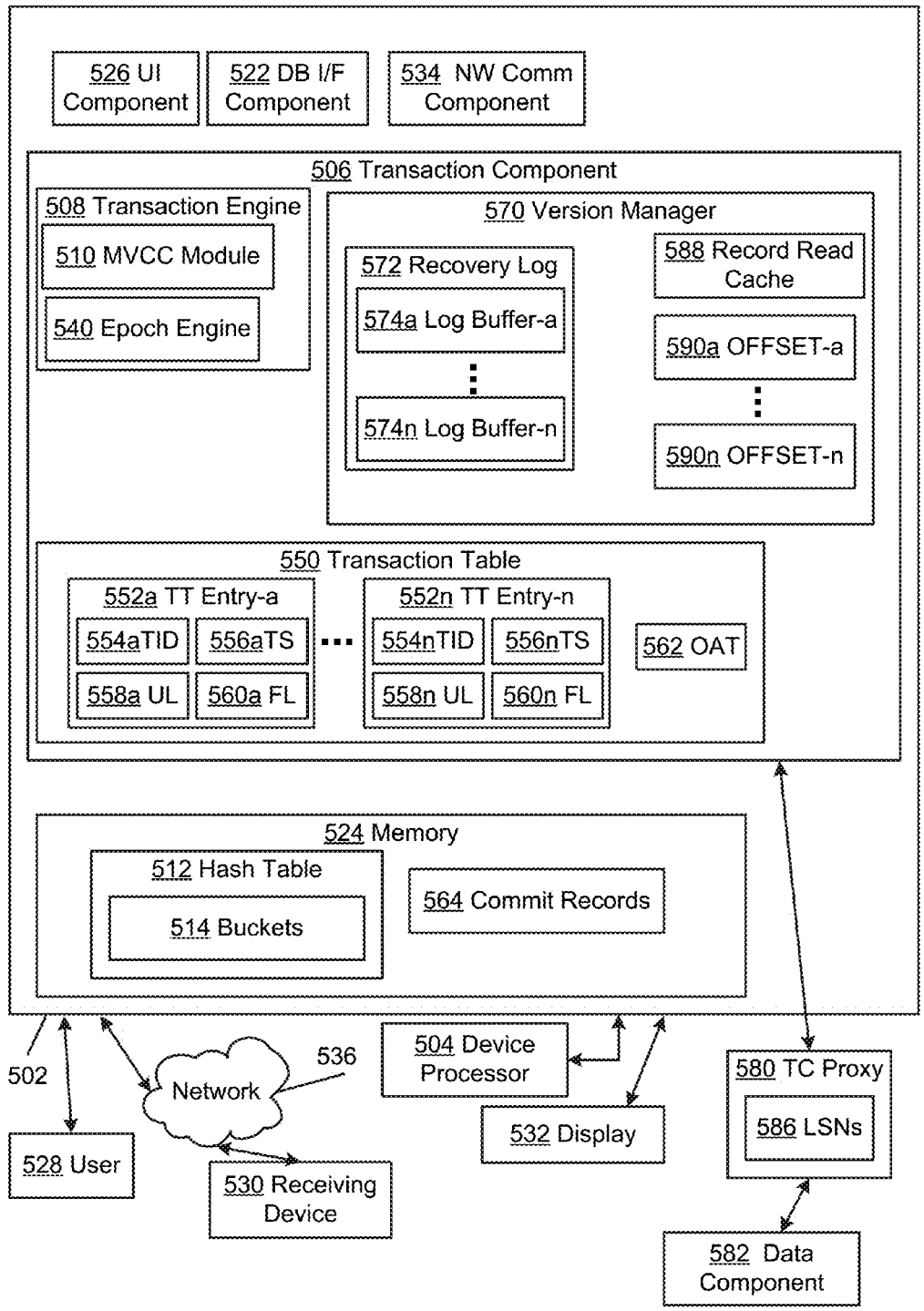
FIGS. 5A-5B are a block diagram of an example system for data modifications using blind update operations.
Figure 5B:
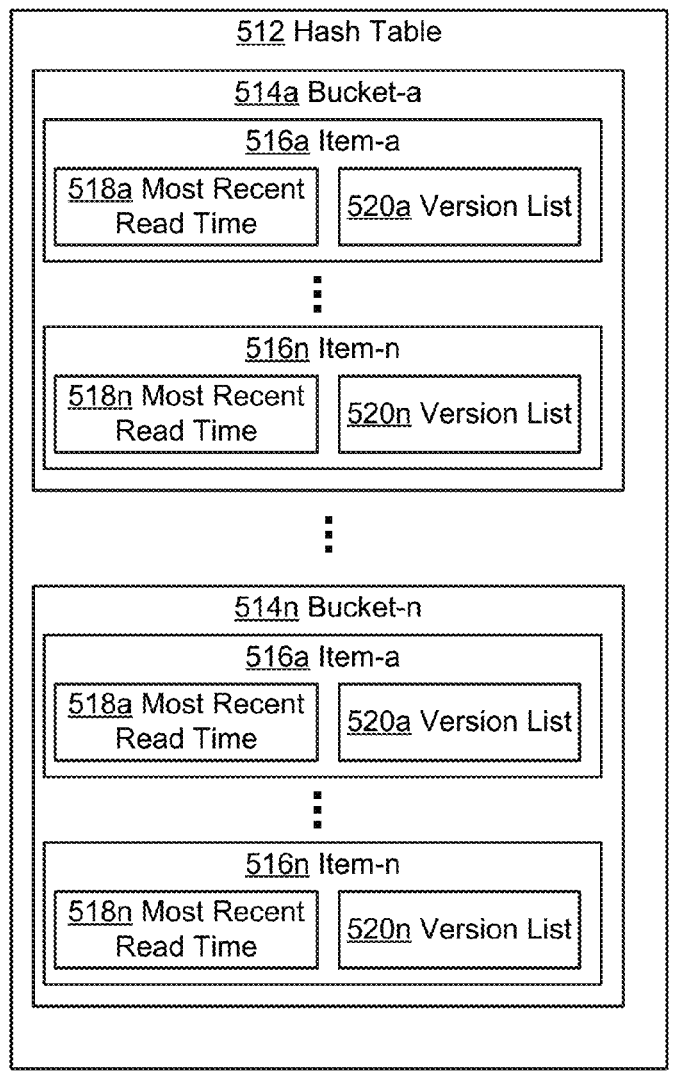
Figure 5B:
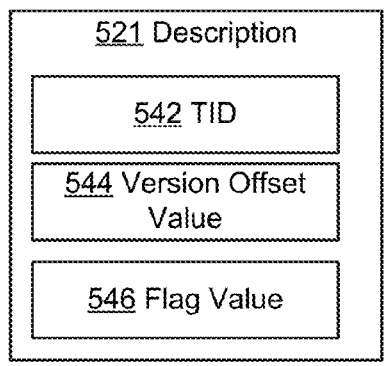

As further discussed herein, FIGS. 5A-5B are a block diagram of a generalized system 500 for achieving high performance transaction processing. The generalized system 500 as shown is merely intended to illustrate various example functionality and/or logic that may be included in example techniques as discussed herein, and is not intended to be limiting in terms of implementations in various hardware and/or software configurations. One skilled in the art of computing will appreciate that system 500 may be realized in hardware implementations, software implementations, or combinations thereof. As shown in FIGS. 5A and 5B, a system 500A may include a device 502 that includes at least one processor 504. The device 502 may include a transaction component 506 that may include a transaction engine 508 that includes a multi-version concurrency control (MVCC) module 510 that accesses a latch-free hash table 512 that includes respective hash table entries that include respective buckets 514 of respective bucket items 516a, ..., 516n that represent respective records, the respective bucket items 516a, ..., 516n each including a value 518a, ..., 518n indicating a temporal most recent read time of the each item and a version list 520a, ..., 520n of one or more descriptions 521 that describe one or more respective versions of the respective records, the MVCC module 510 performing timestamp order concurrency control, using the latch-free hash table 512, the temporal most recent read time 5186a, ..., 518n of the each item including a timestamp value representing the temporal last time the each item was read. MVCC) module 510 may use a recovery log 572 as a source of the one or more respective versions of the respective records.

For example, the temporal most recent read time of the each item may include a timestamp value representing the temporal last time the each item was read. For example, the respective buckets may store respective lists of the respective bucket items that represent respective records, wherein the respective lists of the respective bucket items are maintained using a latch-free updating protocol, based on prepending new bucket items to the respective lists of the respective bucket items using a compare and swap (CAS) operation, and deleting bucket items from the respective lists of the respective bucket items using a CAS operation to remove last items in the respective lists of the respective bucket items, from the respective lists of the respective bucket items.

For example, the version list of one or more descriptions that describe one or more respective versions of the respective records may be maintained using a latch-free updating protocol, based on prepending new descriptions to the version list using a compare and swap (CAS) operation, and deleting a description from the version list using a CAS operation to remove a last description in the version list.

According to an example embodiment, the transaction component 506, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a computing system. A processor may thus include one or more processors executing instructions in parallel and/or in a distributed manner. Although the device processor 504 is depicted as external to the transaction component 506 in FIG. 5A, one skilled in the art of computing will appreciate that the device processor 504 may be implemented as a single component, and/or as distributed units which may be located internally or externally to the transaction component 506, and/or any of its elements.

For example, the system 500 may include one or more processors 504. For example, the system 500 may include at least one tangible computer-readable storage medium storing instructions executable by the one or more processors 504, the executable instructions configured to cause at least one processor (or at least one computing device) to perform operations associated with various example components included in the system 500, as discussed herein. For example, the one or more processors 504 may be included in at least one processing apparatus. One skilled in the art of computing will understand that there are many configurations of processors and processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the transaction component 506 may be implemented in association with one or more user devices. For example, the transaction component 506 may communicate with a server, as discussed further below.

For example, one or more databases may be accessed via a database interface component 522. One skilled in the art of computing will appreciate that there are many techniques for storing information discussed herein, such as various types of database configurations (e.g., relational databases, hierarchical databases, distributed databases) and non-database configurations.

According to an example embodiment, the transaction component 506 may include a memory 524 that may store objects such as intermediate results. In this context, a "memory" may include a single memory device or multiple memory devices configured to store data and/or instructions. Further, the memory 524 may span multiple distributed storage devices. Further, the memory 524 may be distributed among a plurality of processors.

According to an example embodiment, a user interface component 526 may manage communications between a user 528 and the transaction component 506. The user 528 may be associated with a receiving device 530 that may be associated with a display 532 and other input/output devices. For example, the display 532 may be configured to communicate with the receiving device 530, via internal device bus communications, or via at least one network connection.

According to example embodiments, the display 532 may be implemented as a flat screen display, a print form of display, a two-dimensional display, a three-dimensional display, a static display, a moving display, sensory displays such as tactile output, audio output, and any other form of output for communicating with a user (e.g., the user 528).

According to an example embodiment, the transaction component 506 may include a network communication component 534 that may manage network communication between the transaction component 506 and other entities that may communicate with the transaction component 506 via at least one network 536. For example, the network 536 may include at least one of the Internet, at least one wireless network, or at least one wired network. For example, the network 536 may include a cellular network, a radio network, or any type of network that may support transmission of data for the transaction component 506. For example, the network communication component 534 may manage network communications between the transaction component 506 and the receiving device 530. For example, the network communication component 534 may manage network communication between the user interface component 526 and the receiving device 530.

For example, an epoch engine 540 may manage reuse of freed memory locations by denying permission to reuse respective freed memory locations until active threads are unable to dereference pointers to the respective freed memory locations.

For example, each of the one or more descriptions 521 that describe one or more respective versions of the respective records may include a transaction identifier (TID) 542 that identifies a creating transaction associated with the respective version of the respective record, a version offset value 544 indicating a referencing offset of a copy of the respective version of the respective record that is stored in a recovery log at a location in the recovery log that corresponds to the version offset value, and a flag value 546 indicating whether the creating transaction has aborted.

For example, the transaction component 506 includes a transaction table 550 that includes respective entries 552a, . . . , 552n that represent respective transactions. For example, the respective entries 552a, . . . , 552n may each include a transaction identifier (TID) 554a, . . . , 554n, a timestamp value 556a, . . . , 556n indicating a start time of the respective transaction, a list 558a, . . . , 558n representing updates made by the transaction, and a flag value 560a, . . . , 560n indicating whether the respective transaction is active, committed, or aborted. For example, the transaction table includes an entry 562 representing an oldest active transaction that is periodically determined by the transaction engine 508, as one of the respective transactions that is active and is associated with an oldest timestamp.

For example, the transaction engine 508 initiates respective commit record write operations for respective commit operations for respective read-only transactions, to store commit records 564 for the respective read-only transactions. For example, the transaction engine 508 initiates the respective commit record write operations for the respective commit operations for the respective read-only transactions, as a result of respective determinations of a commit stability status of a most recently read version that has been read so far by each of the respective read-only transactions.

For example, the transaction component 506 includes a version manager 570 that includes a recovery log 572 that stores, in recovery log buffers 574a, . . . , 574n, pure redo records and record entries representing copies of versions of respective records that are associated with a key-value store. In this context, "pure redo" records refers to redo records with no undo records, as discussed above.

For example, the recovery log stores, in the recovery log buffers, pure redo records associated with respective transactions, and record entries representing copies of versions of respective records that are associated with a key-value store in lieu of storing transaction undo records.

For example, the transaction engine 508 may approve a transaction update of a current record, initiate storage of a copy of an updated version of the current record in a recovery log buffer 574a, . . . , 574n, in the recovery log 572, and initiate generation of a new entry in the MVCC latch-free hash table 512 that includes an offset value indicating a position of the updated version of the current record in the recovery log buffer 574a, . . . , 574n, and an indication of a transaction responsible for the transaction update of the current record.

For example, the version manager 570 sends log buffers 574a, . . . , 574n to a transaction component proxy 580 that receives the log buffers 574a, . . . , 574n and posts committed transactions to stable storage for records associated with the committed transactions. For example, the transaction component proxy 580 may be located remotely from the transaction component 506, substantially close to a location of a data component 532 associated with the stable storage, or locally to the transaction component 506. For example, the transaction component proxy 580 posts the committed transactions to stable storage for records associated with the committed transactions, the stable storage managed by the data component 582 that includes the data component of a key-value store.

For example, the transaction component proxy 580 maintains a tracking of progress of recovery application to the data component, and provides a summary of the tracked progress to the transaction component 506.

For example, the transaction component proxy 580 posts the committed transactions to stable storage for records associated with the committed transactions, the stable storage managed by the data component 582 that includes the data component of a key-value store.

For example, the transaction component proxy performs a first scan of each received log buffer 574a, ..., 574n to determine committed transactions received from the transaction component. For example, the transaction component proxy performs a second scan of the each received log buffer to apply operations of the committed transactions at the data component, for the committed transactions determined in the first scan.

For example, the transaction component proxy 580 stores information associated with respective versions, for respective versions associated with respective transactions that are determined as not yet durably committed. For example, the transaction component proxy 580 tracks progress in apply operations to the data component 582 using a pair of log sequence numbers (LSNs) 586.

For example, the version manager 570 maintains a record read cache 588 for storing copies of preexisting record versions that are read from a data component 582, wherein the record read cache 588 includes latch-free, log-structured buffers that are populated and cleaned in first-in-first-out (FIFO) order.

For example, the transaction component 506 includes a version manager 570 that includes a recovery log 572 structured as a plurality of latch-free recovery log buffers 574a, ..., 574n using dynamic allocation of storage for newly arriving recovery log buffer entries. For example, the version manager 570 maintains an offset variable value 590a, ..., 590n indicating a next available location for newly requested storage allocation within a particular recovery log buffer 574a, ..., 574n, the offset variable value 590a, ..., 590n updated via an atomic fetch and increment (FAI) operation to add the size of a requested allocation to the offset variable value 590a, ..., 590n. In accordance with example techniques discussed herein, there is only one "active" recovery log buffer at any time. Thus, there is only one offset that is being updated. Further, only one buffer at a time will have more than zero active writers. For example, the offset variable value 590a, ..., 590n further indicates a current number of active users of the particular recovery log buffer 574a, ..., 574n.

One skilled in the art of computing will appreciate that many different techniques may be used for achieving high performance transaction processing, without departing from the spirit of the discussion herein.

III. Flowchart Description

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

Figure 6A:
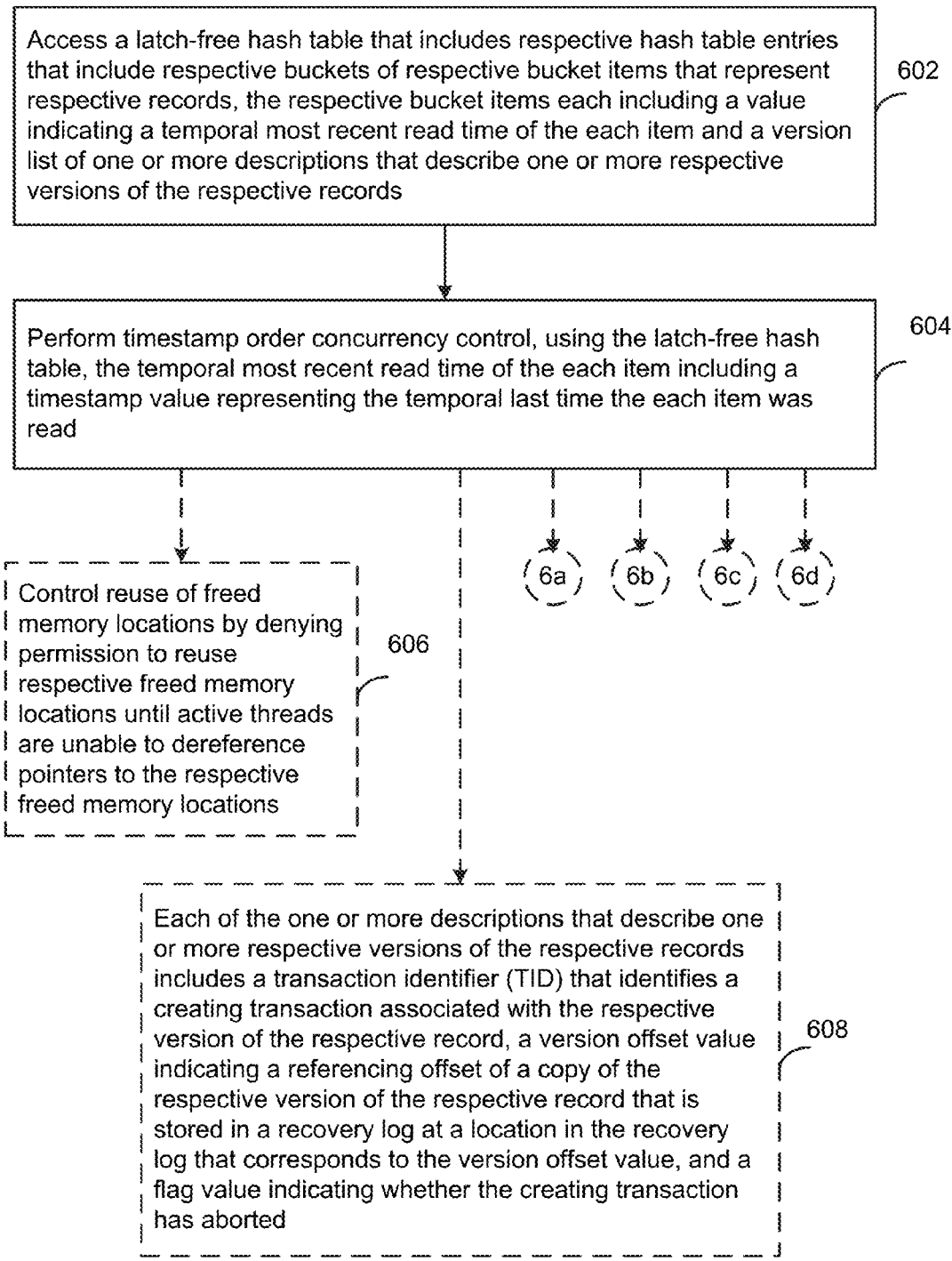
FIGS. 6A-6E are a flowchart illustrating example operations of the system of FIGS. 5A-5B.

FIGS. 6A-6E are a flowchart illustrating example operations of the system of FIGS. 5A-5B, according to example embodiments. As shown in the example of FIG. 6A, a latch-free hash table that includes respective hash table entries that include respective buckets of respective bucket items that represent respective records may be accessed, the respective bucket items each including a value indicating a temporal most recent read time of the each item and a version list of one or more descriptions that describe one or more respective versions of the respective records (602). Timestamp order concurrency control may be performed, using the latch-free hash table, the temporal most recent read time of the each item including a timestamp value representing the temporal last time the each item was read (604). For example, reuse of freed memory locations is managed by denying permission to reuse respective freed memory locations until active threads are unable to dereference pointers to the respective freed memory locations (606).

For example, each of the one or more descriptions that describe one or more respective versions of the respective records includes a transaction identifier (TID) that identifies a creating transaction associated with the respective version of the respective record, a version offset value indicating a referencing offset of a copy of the respective version of the respective record that is stored in a recovery log at a location in the recovery log that corresponds to the version offset value, and a flag value indicating whether the creating transaction has aborted (608).

Figure 6B:
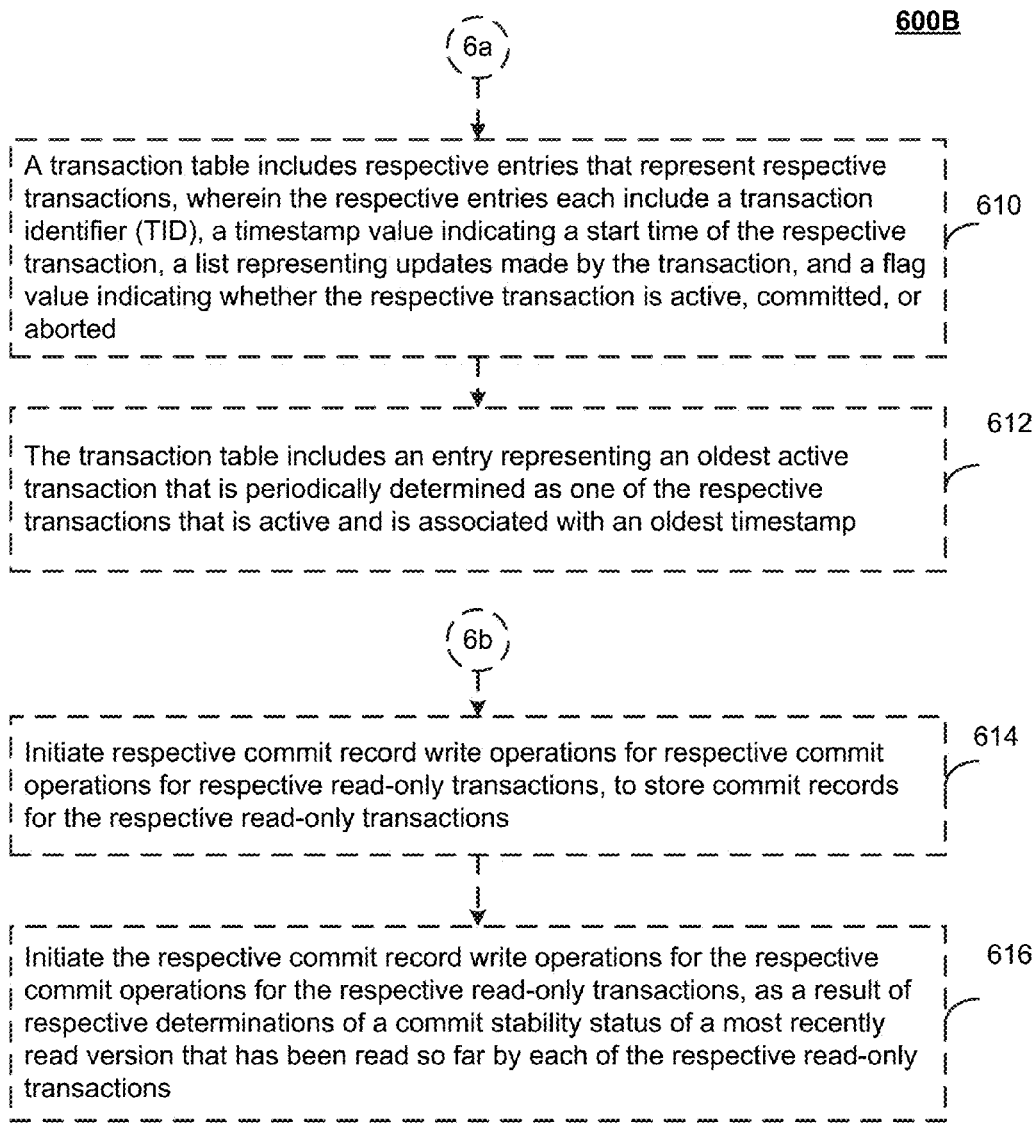

For example, a transaction table includes respective entries that represent respective transactions (610), in the example of FIG. 6B. For example, the respective entries each include a transaction identifier (TID), a timestamp value indicating a start time of the respective transaction, a list representing updates made by the transaction, and a flag value indicating whether the respective transaction is active, committed, or aborted. For example, the transaction table includes an entry representing an oldest active transaction that is periodically determined by the transaction engine, as one of the respective transactions that is active and is associated with an oldest timestamp (612).

For example, respective commit record write operations are initiated for respective commit operations for respective read-only transactions, to store commit records for the respective read-only transactions (614). For example, the respective commit record write operations are initiated for the respective commit operations for the respective read-only transactions, as a result of respective determinations of a commit stability status of a most recently read version that has been read so far by each of the respective read-only transactions (616).

Figure 6C:
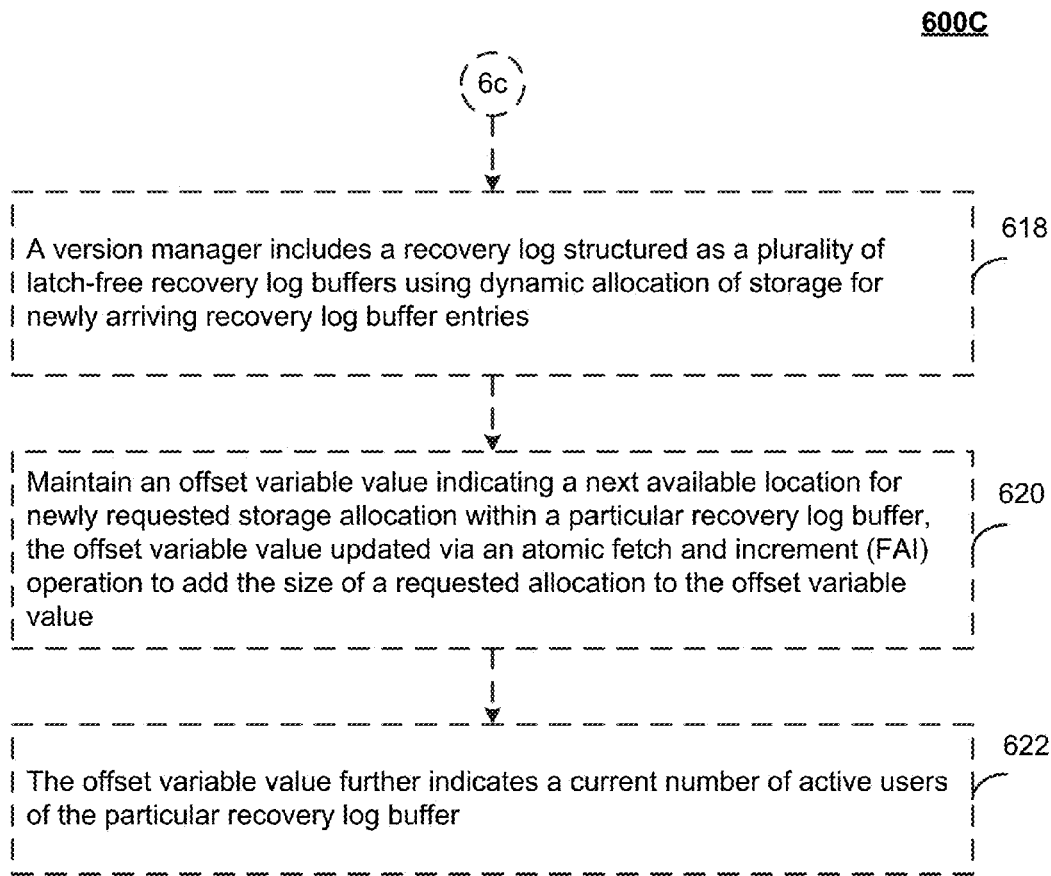

For example, a version manager includes a recovery log structured as a plurality of latch-free recovery log buffers using dynamic allocation of storage for newly arriving recovery log buffer entries (618), in the example of FIG. 6C. For example, an offset variable value is maintained that indicates a next available location for newly requested storage allocation within a particular recovery log buffer, the offset variable value updated via an atomic fetch and increment (FAI) operation to add the size of a requested allocation to the offset variable value (620). For example, the offset variable value further indicates a current number of active users of the particular recovery log buffer (622).

Figure 6D:
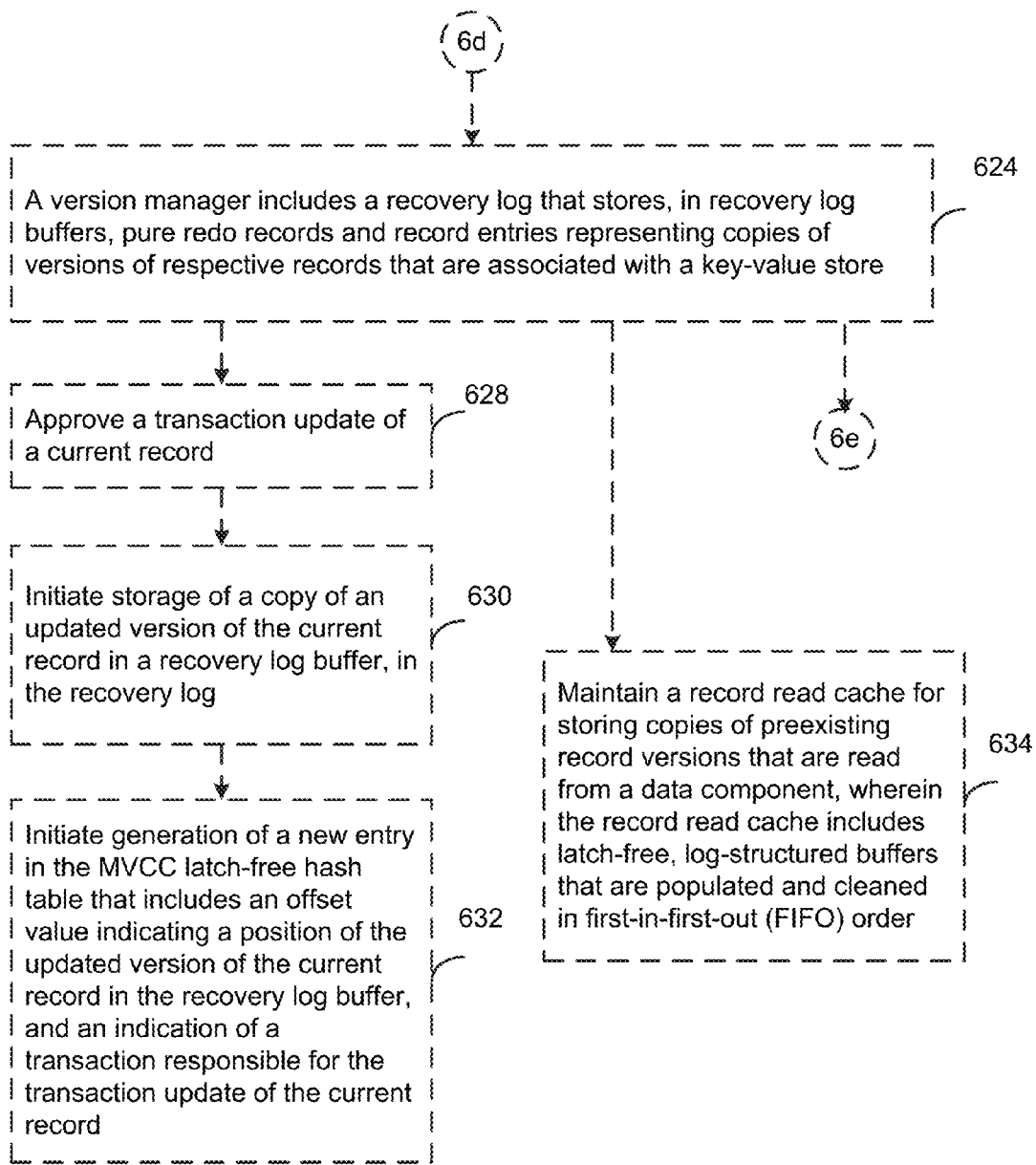

For example, a version manager includes a recovery log that stores, in recovery log buffers, pure redo records and record entries representing copies of versions of respective records that are associated with a key-value store (624), in the example of FIG. 6D. For example, a transaction update of a current record is approved (628), storage of a copy of an updated version of the current record is initiated in a recovery log buffer, in the recovery log (630), and a new entry in the MVCC latch-free hash table is generated that includes an offset value indicating a position of the updated version of the current record in the recovery log buffer, and an indication of a transaction responsible for the transaction update of the current record (632).

For example, a record read cache is maintained for storing copies of preexisting record versions that are read from a data component, wherein the record read cache includes latch-free, log-structured buffers that are populated and cleaned in first-in-first-out (FIFO) order (634).

Figure 6E:
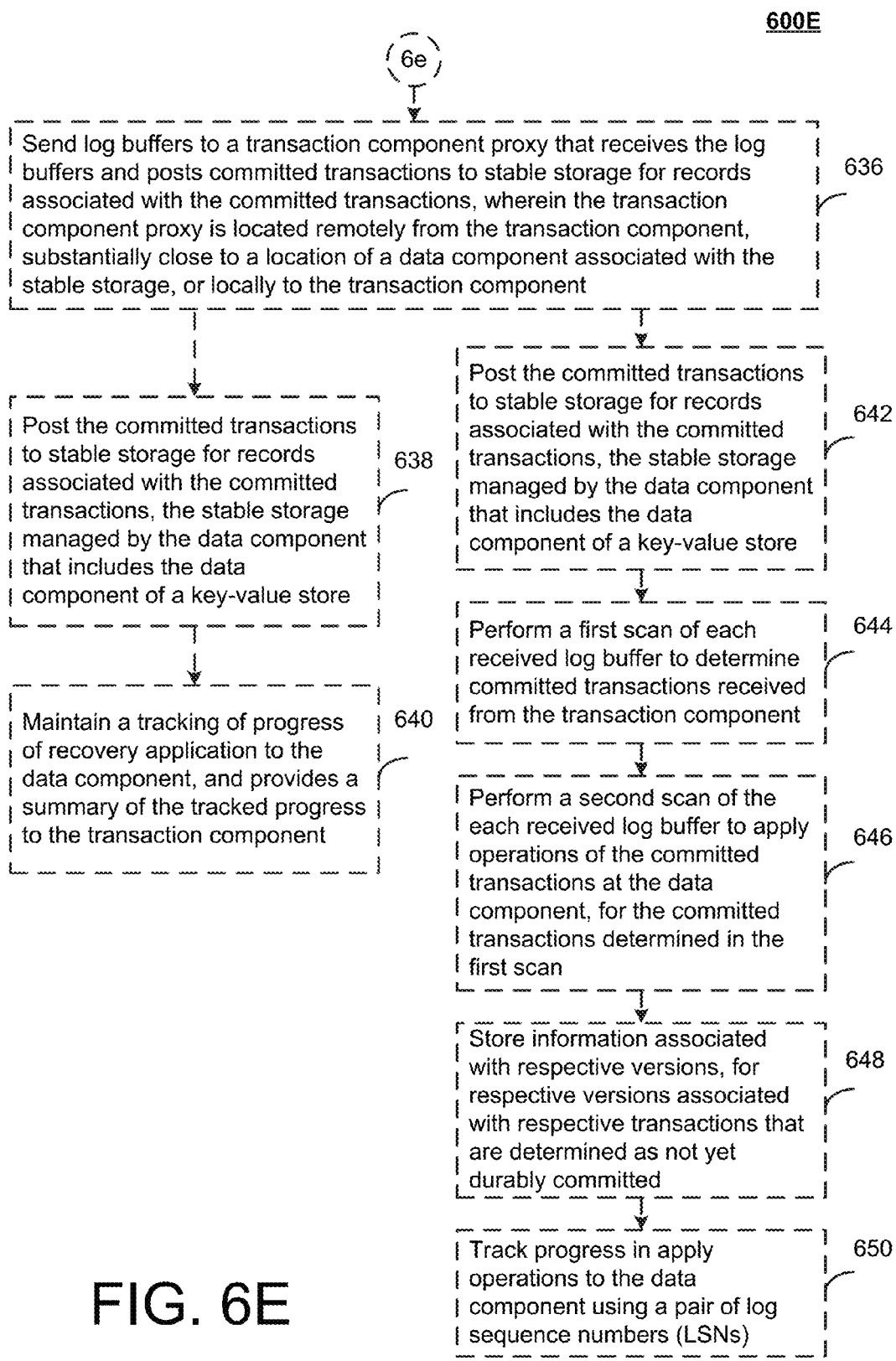

For example, log buffers are sent to a transaction component proxy that receives the log buffers and posts committed transactions to stable storage for records associated with the committed transactions, wherein the transaction component proxy is located remotely from the transaction component, substantially close to a location of a data component associated with the stable storage, or locally to the transaction component (636), in the example of FIG. 6E. For example, the committed transactions are posted to stable storage for records associated with the committed transactions (638).

For example, a tracking is maintained of progress of recovery application to the data component, and a summary of the tracked progress is provided (640). For example, the committed transactions are posted to stable storage for records associated with the committed transactions (642).

For example, a first scan of each received log buffer is performed to determine committed transactions received (644). For example, a second scan of the each received log buffer is performed to apply operations of the committed transactions at the data component, for the committed transactions determined in the first scan (646).

For example, information associated with respective versions is stored, for respective versions associated with respective transactions that are determined as not yet durably committed (648). For example, at some point, once a transaction is known to be committed, if any of its updates were stored in this "side buffer", those operations will be applied as well. For example, progress in apply operations to the data component is tracked using a pair of log sequence numbers (LSNs) (650).

Figure 7:
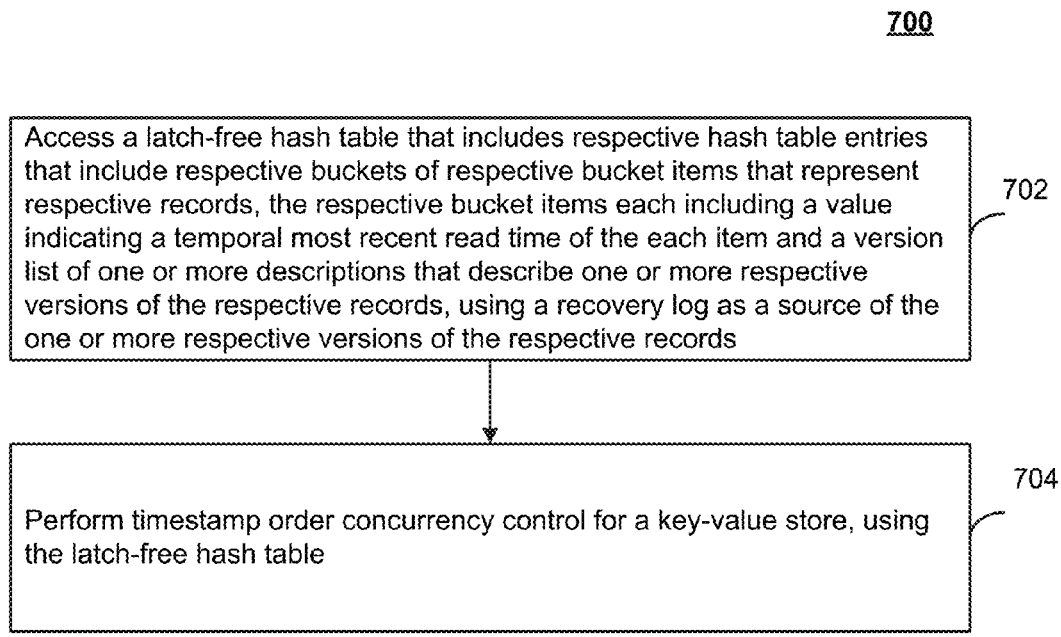
FIG. 7 is a flowchart illustrating example operations of the system of FIGS. 5A-5B.

FIG. 7 is a flowchart illustrating example operations of the system of FIGS. 5A-5B, according to example embodiments. As shown in the example of FIG. 7, a latch-free hash table may be accessed that includes respective hash table entries that include respective buckets of respective bucket items that represent respective records, the respective bucket items each including a value indicating a temporal most recent read time of the each item and a version list of one or more descriptions that describe one or more respective versions of the respective records, using a recovery log as a source of the one or more respective versions of the respective records (702). Timestamp order concurrency control may be performed for a key-value store, using the latch-free hash table (704). Commit records stored in the recovery log are used as a queue for the deferred delivery of transaction outcome messages, after the recovery log buffer becomes durable, in lieu of using a separate queuing mechanism.

Figure 8:
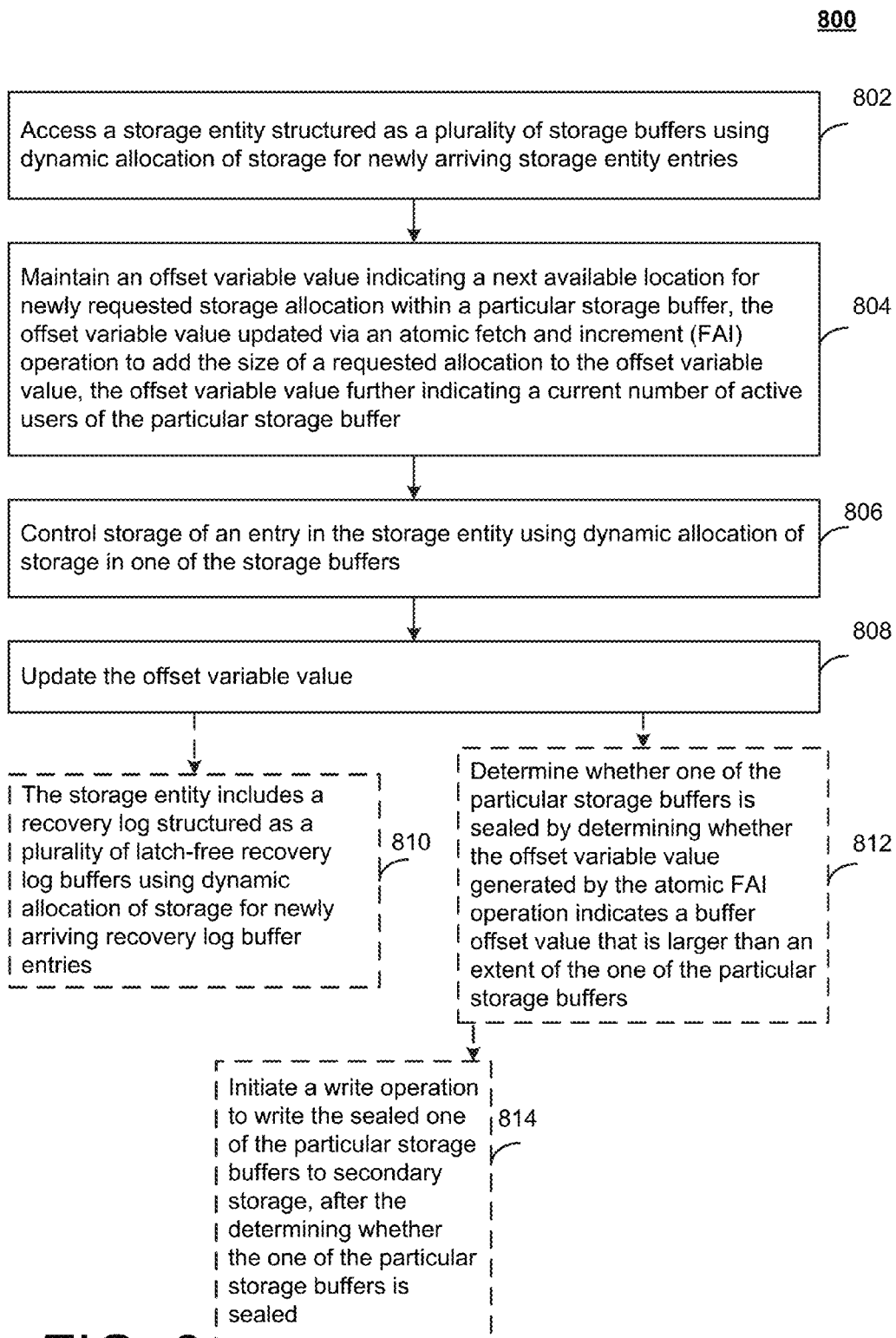
FIG. 8 is a flowchart illustrating example operations of the system of FIGS. 5A-5B.

FIG. 8 is a flowchart illustrating example operations of the system of FIGS. 5A-5B, according to example embodiments. As shown in the example of FIG. 8, a storage entity structured as a plurality of storage buffers using dynamic allocation of storage for newly arriving storage entity entries is accessed (802). An offset variable value indicating a next available location for newly requested storage allocation within a particular storage buffer is maintained (804). The offset variable value is updated via an atomic fetch and increment (FAI) operation to add the size of a requested allocation to the offset variable value, the offset variable value further indicating a current number of active users of the particular storage buffer. Storage of an entry in the storage entity is initiated using dynamic allocation of storage in one of the storage buffers (806). The offset variable value is updated (808).

For example, the storage entity includes a recovery log structured as a plurality of latch-free recovery log buffers using dynamic allocation of storage for newly arriving recovery log buffer entries (810).

For example, it is determined whether one of the particular storage buffers is sealed by determining whether the offset variable value generated by the atomic FAI operation indicates a buffer offset value that is larger than an extent of the one of the particular storage buffers (812).

For example, a write operation is initiated to write the sealed one of the particular storage buffers to secondary storage, after the determining whether the one of the particular storage buffers is sealed (814).

The discussion below is intended to provide further explanation of example techniques that may be used in implementations of the TC examples discussed above. For example, discussion is included of example data component techniques.

Many indexing applications may need to sustain rapid writes with high throughput. For such applications, the read input/output (I/O) that is needed before a write (to lookup the existing value of the key) may be a bottleneck for index insertion throughput. There is a broad category of applications (e.g., inverted index) where the value associated with a key may be updated without knowledge of the existing value (e.g., adding a new document identifier (id) to the posting list for a term). For such applications, the update need not involve a read I/O, but the underlying key-value store may not support such an optimization. In accordance with example techniques discussed herein, a mechanism for "blind" updates (no read needed to perform a write operation) may be used within the framework of a generic key-value store without making any assumptions about the higher level application. Together with the log-structured storage organization of an example key-value store, as discussed herein, key updates may be sustained at a throughput that may approach sequential storage write bandwidth.

In accordance with example techniques discussed herein, a mechanism for "blind" updates (no read needed to perform a write operation) to records included in logical pages associated with example key-value stores, is also discussed. In accordance with example techniques associated with the TC discussed herein, "blind writes" may be supported, even when a version is read prior to updating it. For example, if a version is read and then updated, the version is cached in the TC. A user may know that the update he/she constructs is relevant to the version read because of the MVCC in the TC. When any such update is applied to the DC, it is not necessary to read the prior version at the DC in order to perform the update, as the update may be performed, at the DC, with a blind update.

In this context, a "key-value store" may generally refer to a form of database management system that may store pairs of respective keys (or terms) and values, as well as retrieve values when a respective key is known. For example, a key-value store may include terms (e.g., keys) with respective lists of objects associated with the respective terms. For example, a key-value store may store indexes that include respective lists of document identifiers that are associated with respective terms.

For example, in an inverted index environment (e.g., LUCENE), a common approach is "segmented index". Segment indexes are written one-by-one as documents arrive. Though such writes avoid reads, they may complicate the query serving pathway. For example, queries may scan multiple segment indexes, and hence a user may make a tradeoff between query time and freshness of results.

In this context, an "inverted index" may generally refer to an index data structure storing a mapping from content (e.g., words or numbers) to its locations in a database file, or in a document or a set of documents. For example, an inverted index may be used to enable fast full text searches, at a cost of increased processing when a document is added to the database. For example, an inverted index may include a record level inverted index (e.g., an inverted file index or inverted file) that stores a list of references to documents for each word, or a word level inverted index (e.g., a full inverted index or inverted list) that may additionally store the positions words within a document. For example, in a generic key-value store environment (e.g., the Log-Structured Merge Tree (LSM-tree)), there may be no support for semantic value merge. Hence, a read I/O is involved to perform a write, and this may slow the speed of index insertions.

In accordance with example techniques discussed herein, a slim page stub may be held in memory for an index page that resides on storage (e.g., disk or flash). This page stub stores information that aids in locating the rest of the page on secondary storage (e.g., storing location information indicating locations where the rest of the page resides). For example, it may also store some access method specific information. For example, it may store key boundaries associated with the index page (e.g., minimum and maximum key values of indexes associated with the index page). Thus, for example, when a blind update is performed, the stub may provide information that aids in determining that a particular key belongs with a particular page (or not). For example, if a page is split during processing, the stub has information regarding the boundaries.

In this context, a "page" may refer to an object in storage, which may be accessed via a physical storage address. As used herein, a "page" may be associated with a flexible size, and may represent a page unit of storage that may be distributed over multiple discontiguously stored segments of storage. The storage may include volatile and/or stable storage.

In this context, a "logical page" may include a base page and zero or more delta records indicating updates to the page, thus allowing a page to be written to flash in pieces when it is flushed. Thus, a logical page on flash may correspond to records potentially on different physical device blocks that are linked together, e.g., using file offsets as pointers. Further, a physical block may include records from multiple logical pages. Further, a logical page may refer to locations that store related information.

In accordance with example techniques discussed herein, when a blind update arrives for a key on the page, this may be prepended as a "delta record" to the page (e.g., by linking to the existing page stub). A read I/O may not be needed, as the page stub is sufficient for the update to succeed.

Such delta records may eventually be flushed to storage using "incremental page flushing," wherein unflushed portions of a page are copied to a substantially large flush buffer which may be appended to the end of the "data log" on storage using a single write I/O (e.g., using LLAMA), hence utilizing full storage write bandwidth. In this context, a "flush" operation may refer to transferring a page from main memory (e.g., cache storage) to secondary storage by way of copying the page to an output buffer.

In accordance with example techniques discussed herein, a need to perform read I/O before such a blind update may advantageously be avoided (or substantially avoided) by prepending information describing the update to a page stub existing in memory. In accordance with example techniques discussed herein, incremental flushing of a page storing such key value updates into a large flush buffer that is appended to storage may be performed, for example, using a single write I/O.

Figure 9:
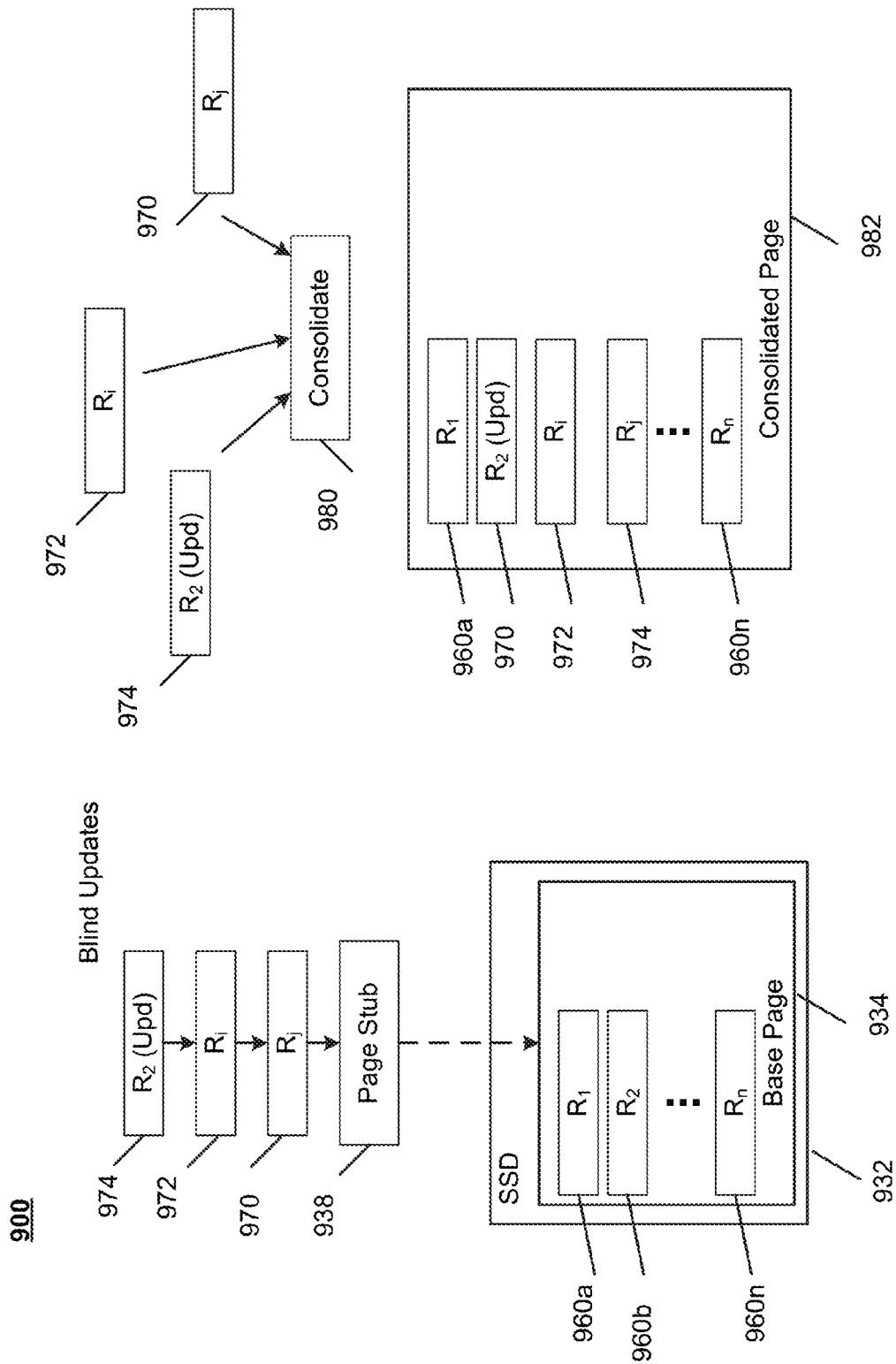
FIG. 9 depicts example update operations.

FIG. 9 depicts example update operations on indexes. As shown in FIG. 9, and in accordance with example techniques discussed herein, blind updates may be performed in association with the solid state device (SSD) 932 that stores the base page 934. As shown in FIG. 9, the base page 934 may include multiple records 960a, 960b, 960c that may be updated. For example, an UPSERT operation may insert a record if it is not already present, and may replace a record with an updated version of the record if it is present (e.g., via "whole record" updates to the base page 934). In accordance with example techniques discussed herein, a page stub 938 may be used for attaching requested blind updates 970, 972, and 974 to the records in the base page 934 (without reading the base page 934), until they may be further processed.

For example, the page stub 938 may be prepended to the base page 934. A first blind update request 970, requesting an addition of a record $R_j$, to the base page 934, may be received for processing. The blind update request 970 may be prepended to the page stub 938, thus updating a current state of the page stub 938 to include the blind update request 970, for the page 934.

As shown in FIG. 9, a second blind update request 972, requesting addition of a record $R_t$, to the logical page that includes the base page 934 and prior update request 970, may be received for processing. The blind update request 972 may be prepended to the page stub 938, thus updating a current state of the page stub 138 to include the blind update request 972 (as well as the blind update request 970), for the base page 934.

As shown in FIG. 9, a third blind update request 974, requesting addition/update of a record $R_2$ (e.g., which may include a replacement of already-existing record $R_2$), with regard to the logical page that includes base page 934 and prior update requests 970 and 972, may be received for processing. The blind update request 974 may be prepended to the page stub 938 and prior update requests 970 and 972, thus updating a current state of the page stub 938 to include the blind update request 974 (as well as the blind update requests 970, 972), for the base page 934.

A consolidate operation 980 may be performed on the blind updates 970, 972, 974 with the base page 934, which may result in at least a portion of the base page 934 being read into memory. The consolidate operation 980 may be performed to consolidate the blind updates 970, 972, 974 with the base page 934 to generate a consolidated page 982 (from the base page 934).

While FIG. 9 shows only a few pages stored in a storage device, one skilled in the art of computing will understand that many pages may be stored in various storage devices, without departing from the spirit of the discussion herein.

For example, BW-TREEs and LLAMA techniques (discussed further below) may be used for inverted index applications, to provide sustained throughput for index inserts/updates. For example, a log-structured store design used with BW-TREEs and LLAMA techniques may utilize full storage throughput for writes. However, index inserts/ updates may involve page reads, and such reads may interfere with delivery of sustained write throughput, particularly on hard disk.

For example, a BW-TREE may provide Structured Query Language (SQL)-like semantics (see, e.g., commonly owned U.S. patent application Ser. No. 13/527,880, entitled "Structuring Storage Based on Latch-Free B-Trees," with inventors David Lomet et al., filed Jun. 20, 2012, and J. Levandoski, et al., "The BW-TREE: A B-tree for New Hardware Platforms," 29th *IEEE International Conference on Data Engineering* (ICDE 2013), Apr. 8-11, 2013). Hence, an insert performs a lookup on the key and returns error if it is already present. An update performs a lookup on the key and returns error if it is not present.

The above source of reads during index updates may interfere with sustained index insert/update throughput for a database application. Such sources of reads during index updates may be avoided (or substantially avoided) as follows: The index may advantageously avoid SQL-like insert/update semantics, instead posting a delta record on the page that describes the incremental update to the key. Thus, an insert/update may not involve reading the whole page.

Blind writes (i.e., updates that do not involve the reading of a prior version) may advantageously include avoidance of reading the prior version, and the possibility of concurrent updates at the transactional component (TC), as discussed further below. Example techniques for handling blind writes and the aggregate objects to which they are applied are discussed below.

In accordance with example techniques discussed herein, an example system that may be referred to herein as LLAMA (Latch-free, Log-structured Access Method Aware), includes a caching and storage subsystem for (at least) recently developed hardware environments (e.g., flash, multi-core), although one skilled in the art of computing will understand that such example techniques are not limited only to recently developed hardware.

For example, LLAMA may support an application programming interface (API) for arbitrarily selected page-oriented access methods that provides both cache and storage management, optimizing processor caches and secondary storage. For example, caching (CL) and storage (SL) layers may use a common mapping table that separates a page's logical and physical location. For example, the cache layer (CL) may support data updates and management updates (e.g., for index re-organization) via latch-free compare-and-swap atomic state changes on its mapping table.

For example, the storage layer (SL) may use the same mapping table to handle the page location changes produced by log structuring on every page flush. For example, a latch-free BW-TREE implementation (e.g., an implementation using a BW-TREE, as an example of an ordered B-tree style index) may be used. In this context, "latch-free" may refer to allowing concurrent access to pages by multiple threads.

Example techniques discussed herein may provide mapping tables that may virtualize both the location and the size of pages. For example, such virtualization may be utilized for both main memory designs and stable storage designs (e.g., log structured storage designs), as discussed further herein.

Example techniques discussed herein may separate an access method layer from cache/storage management. As an example, techniques discussed herein may be used to enforce a write-ahead log protocol. For example, before flushing a page, a conventional database kernel may check a page log sequence number (LSN) to determine whether there are updates that are not yet stable in the transactional log. For example, LLAMA cache management may exploit example delta updates to "swap out" a partial page. For example, it can drop from the cache the part of the page already present on secondary storage (which does not include recent delta updates). For example, the access method layer may be regularly flushing for transactional log checkpointing. Thus, the cache manager will find sufficient candidate (possibly partial) pages to satisfy any buffer size constraint.

Example techniques discussed herein may provide a framework that enables a substantial number of access methods (i.e., not just a single instance) to exploit these techniques by implementing a subsystem layer that provides them. Further, a log structured store may be implemented for writing data to secondary storage that provides advantageous efficiency. Hence, an access method may focus on the main memory aspects of its index, and example techniques discussed herein may provide the framework for achieving performance metrics similar to performance metrics of the BW-TREE.

For example, a technique such as LLAMA, through its API, may provide latch-free page updating, which is accomplished in main memory via a compare and swap (CAS) atomic operation on the mapping table.

For example, in managing the cache, a technique such as LLAMA may reclaim main memory by dropping only previously flushed portions of pages from memory, thus not involving any input/output (I/O) operations, even when swapping out "dirty" pages. Thus, a technique such as LLAMA may be able to control its buffer cache memory size without input from its access method user.

For example, for effective management of secondary storage, a technique such as LLAMA may utilize log-structuring. For example, a technique such as LLAMA may improve performance compared with conventional log structuring by using partial page flushes and pages with substantially no empty space—i.e., substantially 100% storage utilization. These may reduce the number of input/output operations (I/Os) and amount of storage consumed per page when a page is flushed, and hence may reduce the write amplification that may be experienced when log-structuring is used. Further, all storage related operations may be completely latch-free.

For example, a technique such as LLAMA may provide (at least) a limited form of system transaction. In this sense, system transactions are not user level transactions, but rather, exploiting the log-structured store, provide atomicity purely for the "private use" of the access method (e.g., for index structure modifications (SMOs)). For example, this may enable indexes to adapt as they grow while concurrent updating continues.

For example, the BW-TREE structure may include a type of latch-free B-tree structure. For example, updates to BW-TREE nodes may be performed based on prepending update deltas to a prior page state. Thus, the BW-TREE may be latch-free, as it may allow concurrent access to pages by multiple threads. Because such delta updating preserves the prior state of a page, it may provide improved processor cache performance as well.

Figure 10:
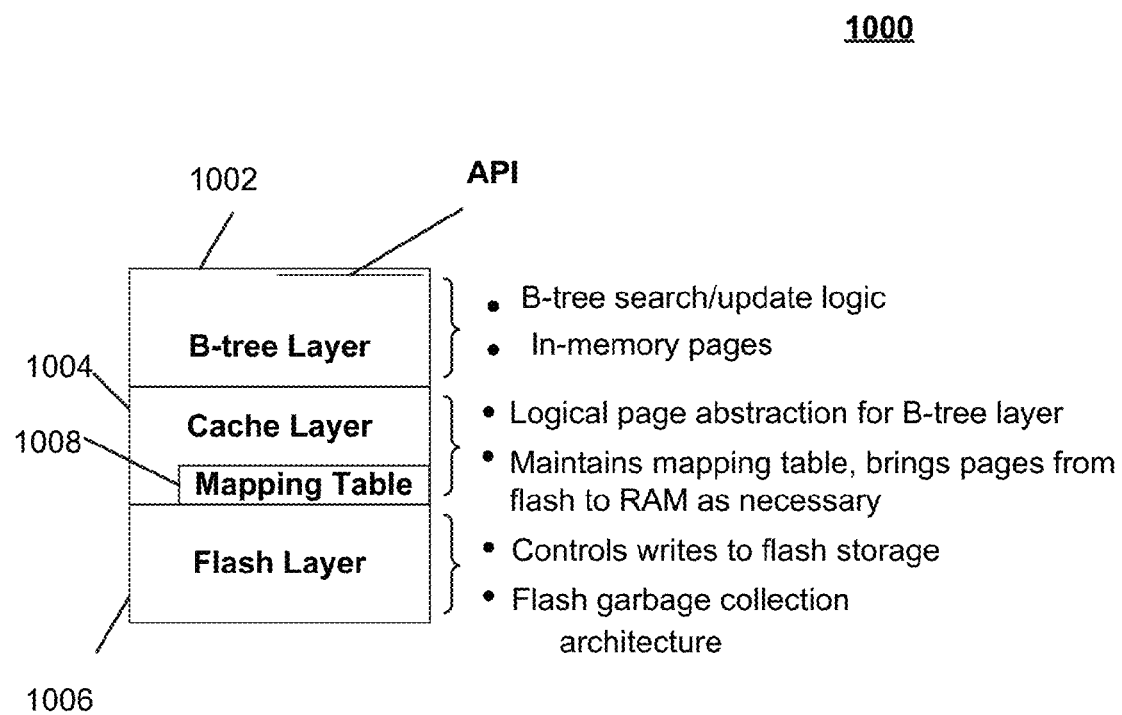
FIG. 10 is a block diagram of an example B-tree atomic record store architecture.

FIG. 10 is a block diagram 1000 of an example B-tree atomic record store architecture (e.g., an example BW-TREE architecture). An access method layer, or a B-tree Layer 1002, is the top layer, as shown in FIG. 10. The B-tree Layer 1002 interacts with a Cache Layer 1004, which is the middle layer. An example cache manager may be built on top of a Storage Layer 1006, which may support an example log structured flash store. According to example embodiments discussed herein, a log structured store may manage both flash and disk storage. An example mapping table 1008 may be included in the cache layer 1004.

Example techniques using BW-TREEs may further provide page splitting techniques that are also latch-free, and that may employ B-link tree style side pointers. Splits (and other structure modification operations) may be atomic both within main memory and when made stable. For example, atomic record stores may be implemented based on a BW-TREE architecture.

One skilled in the art of computing will appreciate that there may be many ways to achieve the high performance transaction processing discussed herein, without departing from the spirit of the discussion herein.

At the LLAMA layer (see, e.g., commonly owned U.S. patent application Ser. No. 13/924,567, entitled "Latch-Free, Log-Structured Storage for Multiple Access Methods," with inventors David Lomet et al., filed Jun. 22, 2013, and Levandoski et al., "LLAMA: A Cache/Storage Subsystem for Modern Hardware," *Proceedings of the VLDB Endowment*, Vol. 6, No. 10 (39th International Conference on Very Large Databases, Aug. 26, 2013), the page is the abstraction that is manipulated. To support blind writes, LLAMA may enable pages to be updated regardless of whether they are in the cache or in stable storage.

In accordance with example techniques discussed herein, an example update interface may support (at least) a delta update (UPDATE-D) and a replacement update (UPDATE-R) (e.g., when the entire page is available in cache).

In accordance with example techniques discussed herein, LLAMA may advantageously support partial pages, including partial page swap-outs.

Figure 11:
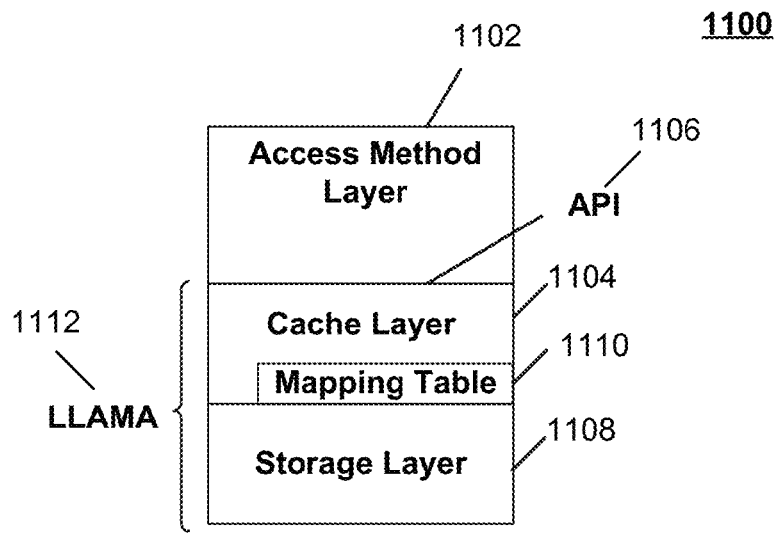
FIG. 11 illustrates an example architectural layering for access methods for cache/storage layers.

FIG. 11 illustrates an example architectural layering for access methods for cache/storage layers. An access method layer 1102 is the top layer, as shown in FIG. 11. The access method layer 1102 interacts with a Cache Layer 1104, which is the middle layer. An application programming interface (API) 1106 may be used for activities between the access method layer 1102 and the Cache Layer 1104. An example storage layer 1108 may interact with a mapping table 1110, which may be shared between the cache layer 1104 and the storage layer 1108. For example, LLAMA 1112 includes the cache layer 1104 and the storage layer 1108. For example, a storage layer may support a log structured flash store. In accordance with example techniques discussed herein, a log structured store may manage both flash and disk storage. For example, this design may be suitable as a standalone or DEUTERONOMY style atomic record store (ARS).

Figure 12:
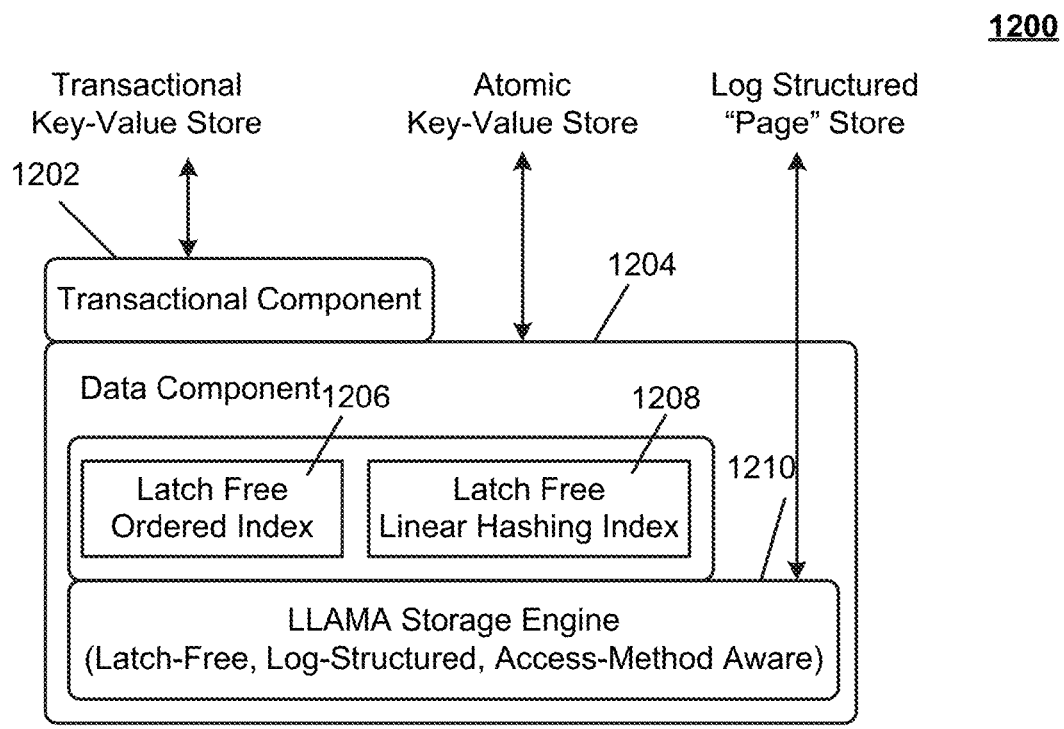
FIG. 12 is a block diagram of an example architecture for latch-free, log-structured storage for multiple access methods.

For example, a technique such as LLAMA may support a page abstraction, supporting access method implementations for cache/storage layers. Further, a transactional component (e.g., a DEUTERONOMY-style transactional component) may be added on top. FIG. 12 is a block diagram of an example architecture for latch-free, log-structured storage for multiple access methods. As shown in FIG. 12, a transactional component 1202 may support a transactional key-value store, and may operate with a data component 1204 that may include an atomic key-value store. As shown in FIG. 12, the data component 1204 may include a latch-free ordered index 1206 and/or a latch free linear hashing index 1208. As shown in FIG. 12, the data component 1204 may further include an example latch-free, log-structured, access-method aware (LLAMA) storage engine 1210 (e.g., LLAMA 1112 of FIG. 11).

The example API 1106 may be "data opaque," meaning that the example LLAMA implementation does not "see" (e.g., does not examine, or analyze, or depend on) what the access method (e.g., of the access method layer 1102) is putting into pages or delta records, and acts independently of what is provided in the pages or delta records by the access method. Thus, example LLAMA implementations may act in response to specific operations where the access method has selected the page upon which to operate, and the operation that LLAMA performs is not dependent on the data arguments that are provided.

Figure 13:
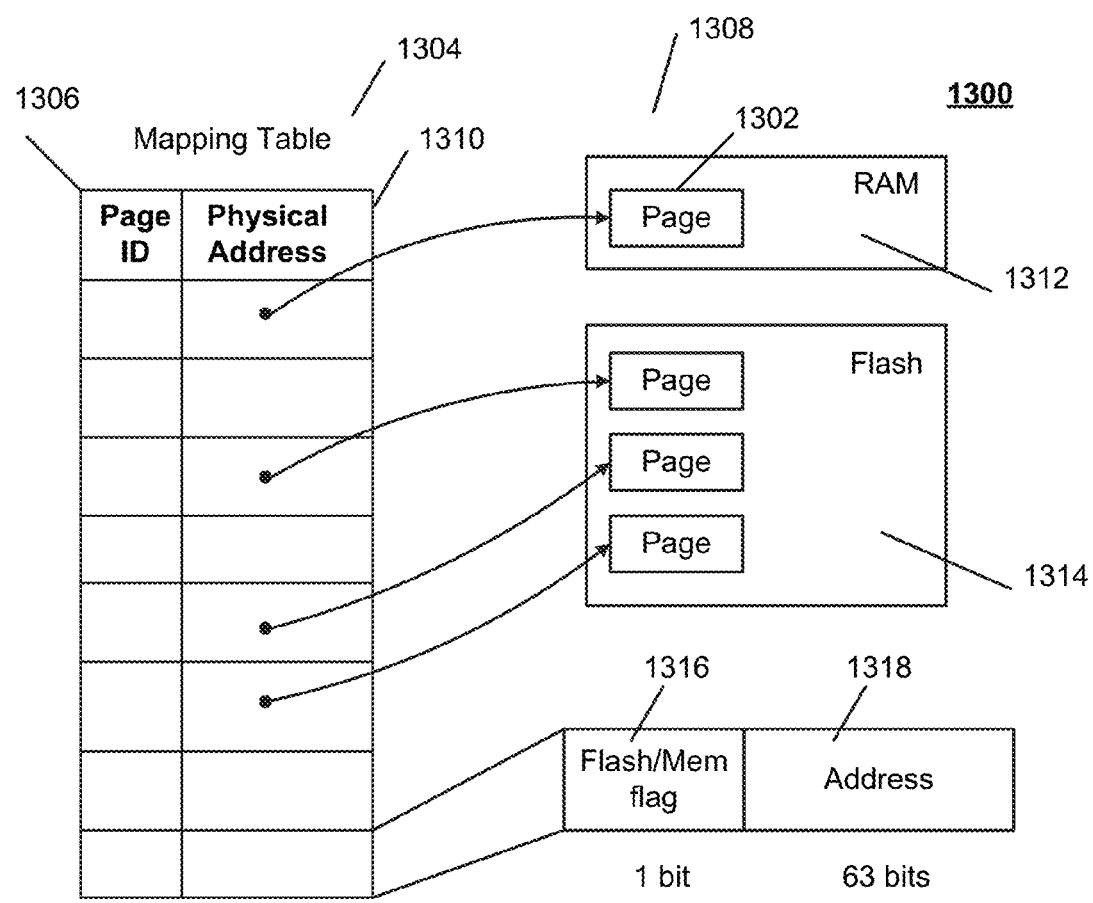
FIG. 13 illustrates an example mapping table.

As shown in FIG. 13, a page 1302 may be accessed via a mapping table 1304 that maps page identifiers (PIDs) 1306 to states 1308 (e.g., via a "physical address" 1310 stored in the mapping table 1304), either in main memory cache 1312 or on secondary storage 1314. For example, the main memory cache 1312 may include random access memory (RAM). For example, the secondary storage 1314 may include flash memory. For example, pages 1302 may be read from secondary storage 1314 into a main memory cache 1312 on demand, they can be flushed to secondary storage 1314, and they may be updated to change page state while in the cache 1312. For example, substantially all page state changes (both data state and management state) may be provided as atomic operations, in accordance with example techniques discussed herein. As shown in FIG. 13, an example physical address 1310 may include a flash/memory flag 1316 (e.g., for 1 bit, as shown in the example) indicating whether the physical address is associated with flash or memory (e.g., cache) storage, with an address field 1318 for (at least) the address itself (e.g., for 63 bits, as shown in the example). One skilled in the art of computing will appreciate that there are many ways of representing a "physical address" (e.g., other than a 64-bit representation), without departing from the spirit of the discussion herein.

In accordance with example techniques discussed herein, LLAMA, through its API, may provide latch-free page updating via a compare and swap (CAS) atomic operation on the mapping table 1304 (e.g., in lieu of a conventional latch that guards a page from concurrent access by blocking threads). For example, the CAS strategy may advantageously increase processor utilization and improve multi-core scaling.

In accordance with example techniques discussed herein, in managing the cache, LLAMA may reclaim main memory by dropping only previously flushed portions of pages from memory, thus not using any I/O, even when swapping out "dirty" pages. Thus, an example architecture such as LLAMA may control its buffer cache memory size without a need to examine data stored in pages by its access method user (e.g., as an example architecture such as LLAMA is unaware of transactions and write-ahead logging).

An example architecture such as LLAMA may use log-structuring to manage secondary storage (e.g., providing the advantages of avoiding random writes, reducing the number of writes via large multi-page buffers, and wear leveling involved with flash memory). Further, an example architecture such as LLAMA may advantageously improve performance (e.g., as compared with conventional log structuring) with partial page flushes and pages with substantially no empty space—i.e., substantially 100% utilization. For example, these may reduce the number of I/Os and storage consumed per page when a page is flushed, and hence may reduce the write amplification that may otherwise be encountered when log-structuring is used. Further, substantially all storage related operations may be completely latch-free.

Additionally, an example architecture such as LLAMA may support (at least) a limited form of system transaction (see, e.g., D. Lomet et al., "Unbundling Transaction Services in the Cloud," *Conference on Innovative Data Systems Research* (CIDR), 2009, with regard to system transactions). For example, system transactions may not be user transactions, but rather may provide atomicity purely for the "private use" of the access method (e.g., for index structure modifications (SMOs)—see, e.g., C. Mohan et al., "ARIES/IM: An Efficient and High Concurrency Index Management Method Using Write-Ahead Logging," *In Proceedings of the 1992 ACM SIGMOD International Conference on Management of Data* (SIGMOD '92), 1992, pp. 371-380). For example, a property that system transactions recorded separately from the transaction log may be effective is an example of an advantageous insight of the DEUTERONOMY approach to decomposing a database kernel.

In designing an example system such as LLAMA, a design goal may include a goal to be as "general purpose" as possible, which may sometimes lead to a goal to "be as low level" as possible. However, for an example system such as LLAMA to be "general purpose," it may be desirable to operate effectively while knowing as little as possible about what an access method does in using its facilities. Thus, operations of an example system such as LLAMA may be "primitive," targeted at cache management and the updating of pages. For example, an example system such as LLAMA may include some additional facilities to support a primitive transaction mechanism that may be advantageously included for SMOs (e.g., page splits and merges).

In accordance with example techniques discussed herein, an example system such as LLAMA may include nothing in the interface regarding log sequence numbers (LSNs), write-ahead logging or checkpoints for transaction logs. In accordance with example techniques discussed herein, an example system such as LLAMA may include no idempotence test for user operations. Further, in accordance with example techniques discussed herein, an example system such as LLAMA may include no transactional recovery (e.g., which may be handled by an access method using an example system such as LLAMA, in accordance with example techniques discussed herein).

An example access method may change state in response to user operations. For example, a user may want to create (C), read (R), update (U), or delete (D) a record (e.g., CRUD operations). In accordance with example techniques discussed herein, an example system such as LLAMA may not directly support these operations. Rather, the example access method may implement them as updates to the states of LLAMA pages.

For example, there may also be structure changes that are part of example access method operations. For example, a BW-TREE page split may involve posting a split delta to an original page O so that searchers know that a new page now contains data for a sub range of the keys in O. For example, these too may be handled as updates to a LLAMA page O.

In accordance with example techniques discussed herein, an example system such as LLAMA may support two forms of update, e.g., a delta update, and a replacement update. For example, an access method may choose to exploit these forms of updates in accordance with a user's wishes. For example, a BW-TREE may make a series of delta updates and at some point decide to "consolidate" and optimize the page by applying the delta updates to a base page. For example, the BW-TREE may then use a replacement update to generate the new base page.

In accordance with example techniques discussed herein, an example system such as LLAMA may retain information regarding the physical location of a page in secondary storage, throughout update operations and replacement operations as discussed herein, so that the system 100 has the secondary storage page location information for re-reading the page should it be swapped out of the main memory cache and for garbage collection, as further discussed herein. Thus, the system 300 may remember previous page locations and stable page state information.

For example, a delta update may be indicated as Update-D(PID, in-ptr, out-ptr, data). For example, the delta update may prepend a delta describing a change to the prior state of the page. For example, for the BW-TREE, the "data" parameter to Update-D may include at least <lsn, key, data> where the lsn enables idempotence. For example, the "in-ptr" points to the prior state of the page, and the "out-ptr" points to the new state of the page.

For example, a replacement update may be indicated as Update-R(PID, in-ptr, out-ptr, data). For example, a replacement update may result in an entirely new state for the page. The prior state, preserved when using an Update-D, may be replaced by the "data" parameter. Thus, the "data" parameter contains the entire state of the page with deltas "folded in."

For example, a "read" may be indicated as Read(PID, out-ptr). For example, a read may return, via "out-ptr," the address in main memory for the page. If the page is not in main memory, then the mapping table entry may contain a secondary storage address. For example, in that case, the page may be read into main memory and the mapping table may be updated with the new main memory address.

In addition to supporting data operations, example systems discussed herein (e.g., LLAMA) may provide operations to manage the existence, location, and persistence of pages. To adjust to the amount of data stored, the access method may add or subtract pages from its managed collections. To provide state persistence, an access method may from time to time flush pages to secondary storage. To manage this persistence, pages may be annotated appropriately (e.g., with log sequence numbers (lsns)). For example, a page manager may be configured to control flush operations, allocate operations, and free operations on pages.

For example, a flush operation may be indicated as Flush(PID, in-ptr, out-ptr, annotation). For example, a Flush may copy a page state into the log structured store (LSS) I/O buffer. Flush may be somewhat similar to Update-D in its impact on main memory, as it prepends a delta (with an annotation) to the prior state. This delta may be tagged as a "flush." In accordance with example techniques discussed herein, an example system such as LLAMA may store the LSS secondary storage address where the page is located (called the flash offset) and the caller "annotation" in the flush delta. For example, a Flush may not ensure a user that the I/O buffer is stable when it returns.

For example, a buffer manager may be configured to control updates to a log-structured secondary storage buffer via latch-free update operations. Thus, for example, multiple threads may simultaneously update the log-structured secondary storage buffer via latch-free operations.

For example, a "make stable" operation may be indicated as Mk_Stable(LSS address). For example, a Mk_Stable operation may ensure that pages flushed to the LSS buffer, up to the LSS address argument, are stable on secondary storage. When Mk_Stable returns, the LSS address provided and all lower LSS addresses are ensured to be stable on secondary storage.

For example, a "high-stable" operation may be indicated as Hi_Stable(out-LSS address). For example, a Hi_Stable operation may return the highest LSS address that is currently stable on secondary storage.

For example, a page manager may be configured to initiate a flush operation of a first page in cache layer storage to a location in secondary storage, based on initiating a copy of a page state of the first page into a secondary storage buffer, and initiating a prepending of a flush delta record to the page state, the flush delta record including a secondary storage address indicating a storage location of the first page in secondary storage and an annotation associated with a caller.

For example, a buffer manager may be configured to initiate a stability operation for determining that pages flushed to a secondary storage buffer, having lower addresses, up to a first secondary storage address argument, are stable in secondary storage.

For example, an "allocate" operation may be indicated as Allocate(out-PID). For example, an Allocate operation may return the PID of a new page allocated in the mapping table. All such pages may be remembered persistently, so Allocate may be included as part of a system transaction (as discussed further below), which may automatically flush its included operations.

For example, a "free" operation may be indicated as Free(PID). For example, a Free operation may make a mapping table entry identified by the PID available for reuse. In main memory, the PID may be placed on the pending free list for PIDs for a current epoch (as discussed further below). Again, because active pages may need to be remembered, Free may be included as a part of a system transaction.

In accordance with example techniques discussed herein, example LLAMA system transactions may be used to provide relative durability and atomicity (all or nothing) for structure modifications (e.g., SMOs). For example, an LSS and its page oriented records may be used as "log records." For example, all operations within a transaction may be automatically flushed to an in-memory LSS I/O buffer, in addition to changing page state in the cache. For example, each LSS entry may include the state of a page, for an example LSS that is strictly a "page" store.

In main memory, all such operations within a transaction may be held in isolation until transaction commit, as discussed further below. For example, at commit, all page changes in the transaction may be flushed atomically to the LSS buffer. For example, on abort, all changes may be discarded. For example, a system transaction manager may be configured to commit transactions and abort transactions.

For example, system transactions may be initiated and terminated via LLAMA supported operations. For example, a "transaction begin" operation may be indicated as TBegin (out-TID). For example, a transaction identified by a transaction ID (TID) may be initiated. This may involve entering it into an active transaction table (ATT) maintained by the example LLAMA cache layer (CL) manager.

For example, a "transaction commit" operation may be indicated as TCommit(TID). For example, the transaction may be removed from the active transaction table and the transaction may be committed. For example, page state changes in the transaction may be installed in the mapping table and flushed to the LSS buffer.

For example, a "transaction abort" operation may be indicated as TAbort(TID). For example, the transaction may be removed from the active transaction table, changed pages may be reset to "transaction begin" in the cache, and no changes are flushed.

In accordance with example techniques discussed herein, in addition to Allocate and Free, Update-D operations may be permitted within a transaction to change page states. For example, Update-R might not be used, as it may complicate transaction undo, as discussed further below.

In accordance with example techniques discussed herein, transactional operations may all have input parameters: TID and annotation. For example, TID may be added to the deltas in the cache, and an annotation may be added to each page updated in the transaction (e.g., as if it were being flushed). When installed in the flush buffer and committed, all updated pages in the cache may have flush deltas prepended describing their location (e.g., as if they were flushed independently of a transaction).

The BW-TREE (see, e.g., J. Levandoski, et al., "The Bw-Tree: A B-tree for New Hardware Platforms," *29th IEEE International Conference on Data Engineering* (ICDE 2013), Apr. 8-11, 2013) may provide an example key-value store that may enable user transactions to be supported (e.g., for the transactional component 202). For example, it may manage LSNs, enforce the write-ahead log (WAL) protocol, and respond to checkpointing requests as expected by a DEUTERONOMY data component (DC) (see, e.g., J. Levandoski et al., "Deuteronomy: Transaction Support for Cloud Data," *Conference on Innovative Data Systems Research* (CIDR) (January 2011), pp. 123-133 and D. Lomet et al., "Unbundling Transaction Services in the Cloud," *Conference on Innovative Data Systems Research* (CIDR), 2009). A discussion herein includes addressing how it may accomplish that when using an example system such as LLAMA.

"Data" content to the Update-D and Update-R LLAMA operations may include keys, LSNs, and the "data part" of a key value store. For example, a BW-TREE may thus, via these operations, implement a key value store, provide idempotence via LSNs, perform incremental updates via Update-D, perform its page consolidations via Update-R, and access pages for read or write using the LLAMA Read or Flush operation. For example, the system may include a record manager that may be configured to control updates based on update delta record operations and replacement update operations.

For example, an access method may store LSNs in the data it provides to LLAMA via update operations. Further, the Flush operation annotation parameter, stored in a flush delta, may provide additional information to describe page contents. For example, these may permit the BW-TREE to enforce write-ahead logging (WAL). For example, a Stabilize operation (e.g., Mk-Stable) after flushing a page may make updates stable for transaction log checkpointing.

For example, Allocate and Free operations may permit an example BW-TREE implementation to grow and shrink its tree. For example, BeginTrans (e.g., TBegin) and Commit/Abort (e.g., TCommit/TAbort) may enable the atomicity expected when performing structure modifications operations (SMOs).

For example, Update operations (e.g., Update-D/Update-R) may not be limited to "user level" data. For example, a BW-TREE may use Update-D to post its "merge" and "split" deltas when implementing SMOs, as discussed further below, with regard to system transactions.

Figure 14A:
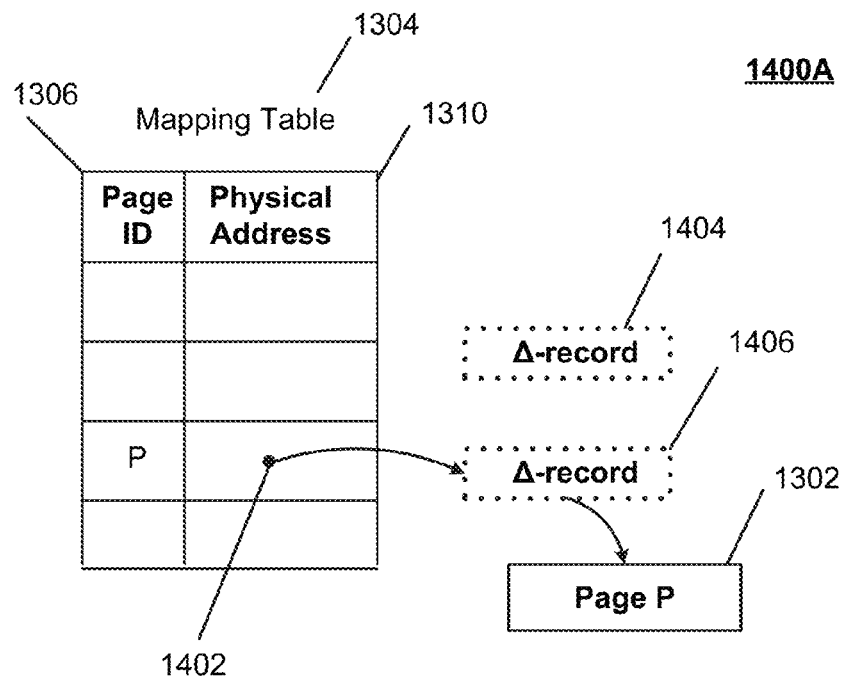
FIGS. 14A-14B illustrate example delta updates on an example mapping table.
Figure 14B:
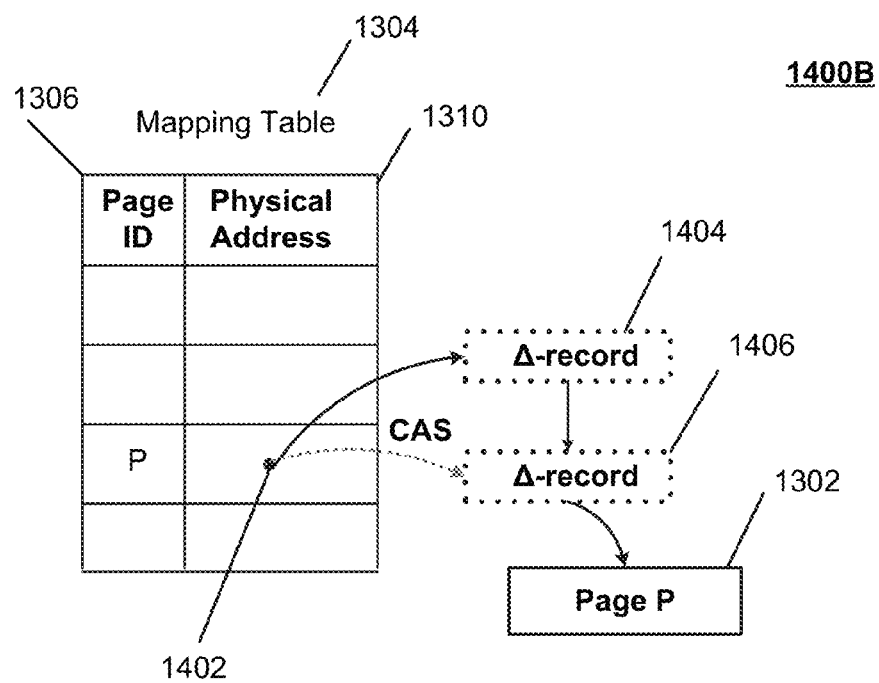

In accordance with example techniques discussed herein, with respect to cache layer data operations, page updating may be accomplished by installing a new page state pointer 1402 in the mapping table 1304 using a compare and swap operation (CAS), whether a delta update, as shown in FIG. 14A, or a replacement update. For example, a replacement update (e.g., Update-R(PID, in-ptr, out-ptr, data)) may include both the desired new state and the location of the prior state of the page in LSS. For example, a new update delta 1404 (e.g., Update-D(PID, in-ptr, out-ptr, data)) points to the prior state 1406 of the page 1302, which already includes this LSS location.

For example, such a latch-free approach may avoid the delays introduced by latching, but it may incur a penalty of its own, as do "optimistic" concurrency control methods, i.e., the CAS may fail and the update will then be re-attempted. For example, it may be left to an example LLAMA user to retry its operation as appropriate, as an example LLAMA implementation may indicate when a failure occurs.

In accordance with example techniques discussed herein, while no operation may block when the data is in cache (e.g., 1312), reading a page from secondary storage may involve waiting for the page to appear in the cache. The mapping table (e.g., the mapping table 1304) will point to the LSS page, even for cached pages, as discussed above, enabling pages to be moved between cache and LSS for effective cache management.

In accordance with example techniques discussed herein, when a page is flushed, an example LLAMA implementation may ensure that what is represented in the cache (e.g., 1312) matches what is in LSS (e.g., 1314). Thus, the flush delta may include both PID and LSS offset in the flush delta, and may include that delta in the LSS buffer and in the cache (e.g., 1312) by prepending it to the page 1302.

In accordance with example techniques discussed herein, because an example LLAMA implementation may support delta updating, page state may include non-contiguous pieces. Combining this feature with flushing activity may result in an in-cache page having part of its state in LSS (having been flushed earlier), while recent updates may be present only in the cache. When this occurs, it may be possible to reduce the storage cost of the next flush.

Thus, an example LLAMA implementation may flush such a page by writing a delta that includes only the changes since the prior flush. For example, multiple update deltas in the cache may all be made contiguous for flushing by writing a contiguous form of the deltas (which may be referred to herein as a "C-delta"), with a pointer to the remainder of the page in LSS. Thus, the entire page may be accessible in LSS, but in possibly several pieces.

In accordance with example techniques discussed herein, the Flush operation may observe a cached page state that may have several parts that have been flushed over time in this manner, resulting in a cached page in which the separate pieces and their LSS addresses are represented. In accordance with example techniques discussed herein, at any time, Flush may bring these pieces together in LSS storage by writing the contents of the discontiguous page pieces contiguously (and redundantly). For example, a user may be willing to leave the pieces separate when LSS uses flash storage, while desiring contiguity when LSS uses disk storage, due to the differing read access and storage costs.

In accordance with example techniques discussed herein, when a page is flushed, it may be desirable for a system to know, prior to the flush, what state of the page is being flushed. For example, this may be easily ascertained using latches, as a system may simply latch the page, and perform the flush. However, in a latch-free approach, the system may have substantial difficulty in ordering page flushes correctly. For example, this may pose issues in enforcement of a write-ahead log protocol, or when the flush occurs as part of a structure modification. For example, it may be desirable for inappropriate flushes to fail when they perform their CAS. Thus, in accordance with example techniques discussed herein, the pointer to the page state to be flushed in the CAS may be used, which may then only capture that particular state and may fail if the state has been updated before the flush completes. However, this may raise other issues.

In research, difficulties have been encountered in determining the kind of strong invariant that may be advantageous when performing cache management and flushing pages to LSS. For example, an invariant may include properties such as:

A page that is flushed successfully to LSS is immediately seen in the cache as having been flushed, and the flushed state of the page will be in the LSS I/O buffer ahead of the flushes of all later states. A page whose flush has failed will not appear as flushed in the cache, and it will be clear when viewing LSS that the flush did not succeed.

For example, two alternative approaches may include:
a. Success of the flush may be ensured by first performing the CAS. Once the CAS succeeds, the page may be posted to the LSS. For example, if that is done, a race condition may undermine trustworthy LSS recovery. For example, a page may subsequently be flushed that depends upon the earlier flush, where this "later" flush succeeds in writing to LSS before a system crash, while the "earlier" flush is too slow to complete and does not appear in the stable LSS. This situation may compromise a form of causality.
b. The page state of the page that is desired to be flushed may be captured, and written to the LSS buffer. Then the CAS may be attempted, and the CAS may fail. Thus, a page is written to LSS with no indication for distinguishing whether the flush succeeded or failed should the system crash. For example, there may be multiple such pages written to LSS at various times. For example, a later state of the page may be written that appears earlier in the LSS than the failed CAS. As indicated above, it began later but obtained its buffer slot before the earlier flush.

For example, the dilemma discussed above may be resolved, as discussed below. For example, if the CAS is performed early enough, then it may be determined whether the flush will be successful or not, prior to copying the state of the page to the log buffer. Thus, an example flush procedure may be performed as follows:

Step 1: Identify the state of the page that is intended to be flushed.

Step 2: Seize space in the LSS buffer into which to write the state.

Step 3: Perform the CAS to determine whether the flush will succeed. The LSS offset in the flush delta will be obtained in order to do this (as provided in step 2 above).

Step 4: If step 3 succeeds, write the state to be saved into the LSS. While this is being written into the LSS, example LLAMA techniques discussed herein may prevent the buffer from being written to LSS secondary storage.

Step 5: If step 3 fails, write an indication indicating "Failed Flush" into the reserved space in the buffer. This may consume storage but resolves ambiguity as to which flushes have succeeded or failed.

The result of this example procedure is that the LSS, during recovery, might not observe pages that are the result of CAS's that have failed. For example, this also preserves the property that any page that appears later in the LSS (in terms of its position in the "log") will be a later state of the page than all earlier instances of the page in the LSS log.

In accordance with example techniques discussed herein, it may be desirable for an example LLAMA implementation to manage the cache and swap out data so as to meet its memory constraints. For example, the example LLAMA implementation may be aware of delta updates, replacement updates, and flushes, and may recognize each of these. However, the example LLAMA implementation will know nothing about the contents of the pages, if it is to be general purpose. Thus, the example LLAMA implementation is unaware whether the access method layer is supporting transactions by maintaining LSN's in the pages. Thus, an issue that may be posed includes a potential question regarding how an example LLAMA implementation may provide cache space management (including evicting pages) when it may not see LSN's and enforce the write-ahead log protocol.

For example, any data that has already been flushed may be dropped from the cache. For example, systems in which pages are updated in place may be prevented from swapping out (dropping from the cache) any recently updated and "dirty" page. However, because of delta updates, an example LLAMA implementation may determine which parts of pages have already been flushed. For example, each such part may be described with a flush delta, and those flushed parts may be "swapped out" of the cache.

In "swapping out" parts of pages, it may be disadvantageous to simply deallocate the storage and reuse it, as that may leave dangling references to the swapped out parts. Thus, in accordance with example techniques discussed herein, a delta may be used that describes what parts of a page have been swapped out.

For example, for a fully swapped out page, its main memory address in the mapping table 1304 may be replaced with an LSS pointer from the page's most recent flush delta.

Figure 15:
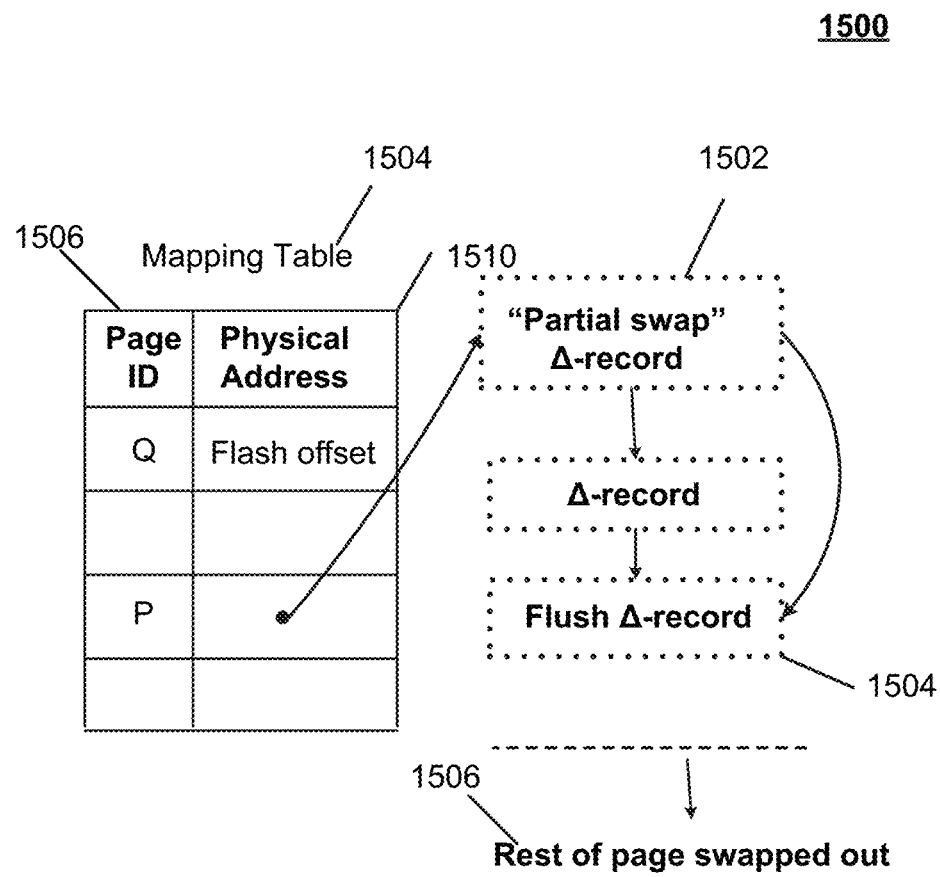
FIG. 15 depicts an example partial page swap out and an example partial swap delta.

FIG. 15 depicts an example partial page swap out and an example partial swap delta. For example, for partially swapped out pages, a CAS may be used to insert a "partial swap" delta record 1502. For example, this delta record 1502 may indicate that the page has been partially swapped out (e.g., so the page contents in the cache cannot be used to satisfy the usual page READ operation), and may point to a flush delta record 1504 that indicates location information in the LSS for locating the missing part of the page 1506. For example, once the "partial swap" delta 1502 has been installed with a CAS, the memory for the part of the page being dropped may be freed using an example epoch mechanism.

For example, a page manager may be configured to initiate a swap operation of a portion of a first page in cache layer storage to a location in secondary storage, based on initiating a prepending of a partial swap delta record to a page state associated with the first page, the partial swap delta record including a secondary storage address indicating a storage location of a flush delta record that indicates a location in secondary storage of a missing part of the first page.

For example, the page manager may be further configured to initiate a free operation for cache layer storage associated with the portion of the first page, using an epoch mechanism.

In accordance with example techniques discussed herein, this approach may advantageously provide several useful features for users. For example, such an example LLAMA implementation's cache layer 1104 may reclaim memory (e.g., 1312) without knowledge regarding the actual content of pages. For example, dropping flushed pages and flushed parts of pages may involve no I/O operation. For example, bringing a partially flushed page back into main memory may involve fewer LSS reads than would be the case for a fully flushed page with multiple parts in LSS.

Figure 16A:
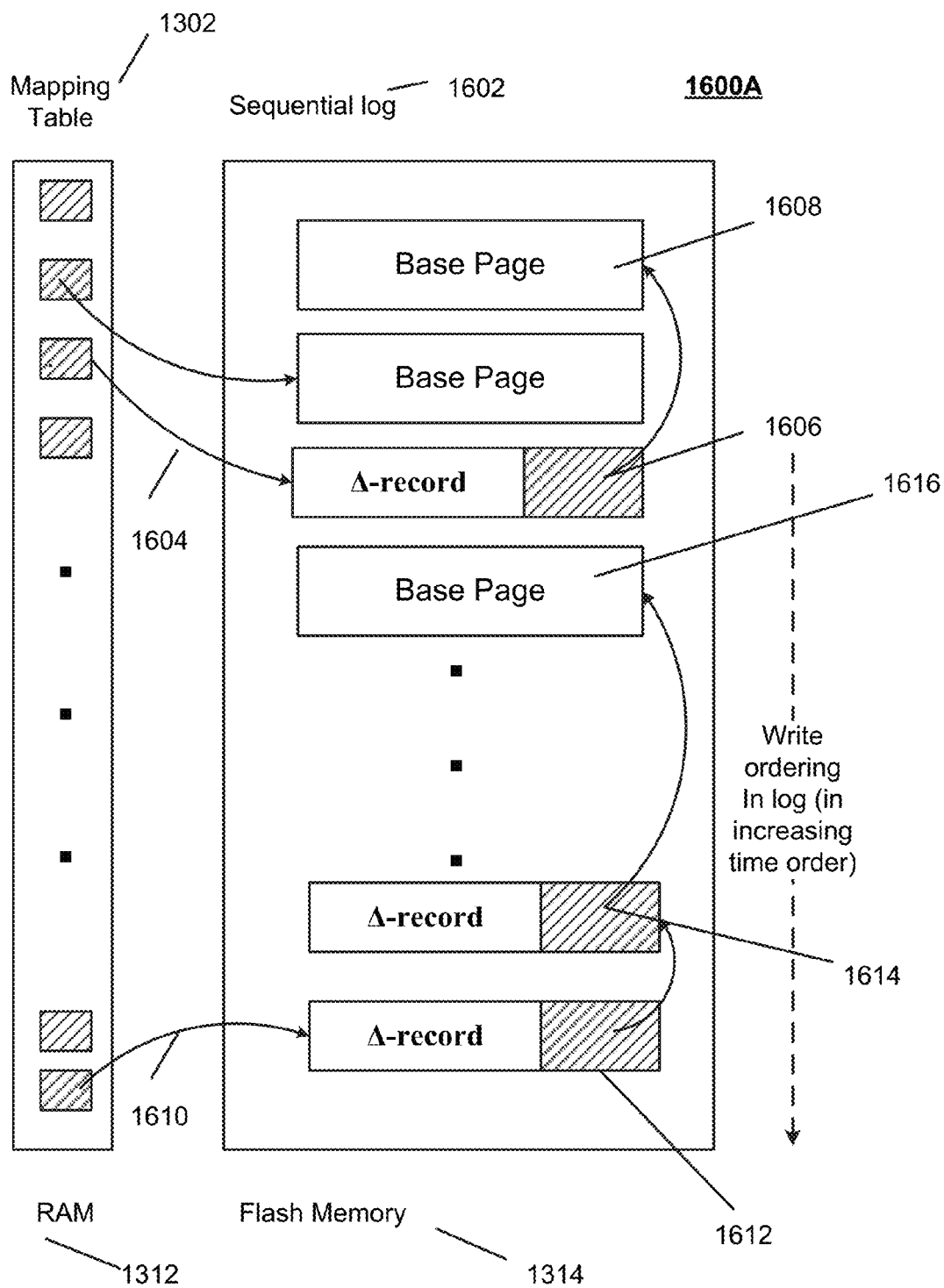
FIGS. 16A-16C illustrate an example log-structured storage organization on flash storage.

As discussed herein, a "logical page" may include a base page and zero or more delta records indicating updates to the page, thus allowing a page to be written to flash in pieces when it is flushed. Thus, a logical page on flash may correspond to records potentially on different physical device blocks that are linked together using file offsets as pointers. Further, a physical block may include records from multiple logical pages. FIG. 16A illustrates an example log-structured storage organization 1600A on flash 1314.

For example, a logical page may be read from flash 1314 into memory (e.g., RAM 1312) by starting from the head of the chain on flash (whose offset in a sequential log 1602 may be obtained from the mapping table 1304) and following the linked records. For example, an offset 1604 may be obtained from the mapping table 1304, for accessing a delta record 1606, to obtain a current state, and a base page 1608, for reading the corresponding "logical page" from flash 1314 into memory 1312.

For example, an offset 1610 may be obtained from the mapping table 1304, for accessing a delta record 1612, to obtain the delta and link, to access a second delta record 1614, and subsequently a base page 1616, for reading the corresponding "logical page" from flash 1314 into memory 1312.

For example, the flush process may advantageously consolidate multiple delta records of the same logical page into a contiguous C-delta on flash when they are flushed together. Moreover, a logical page may be consolidated on flash when it is flushed after being consolidated in memory, which may advantageously improve page read performance.

Figure 16B:
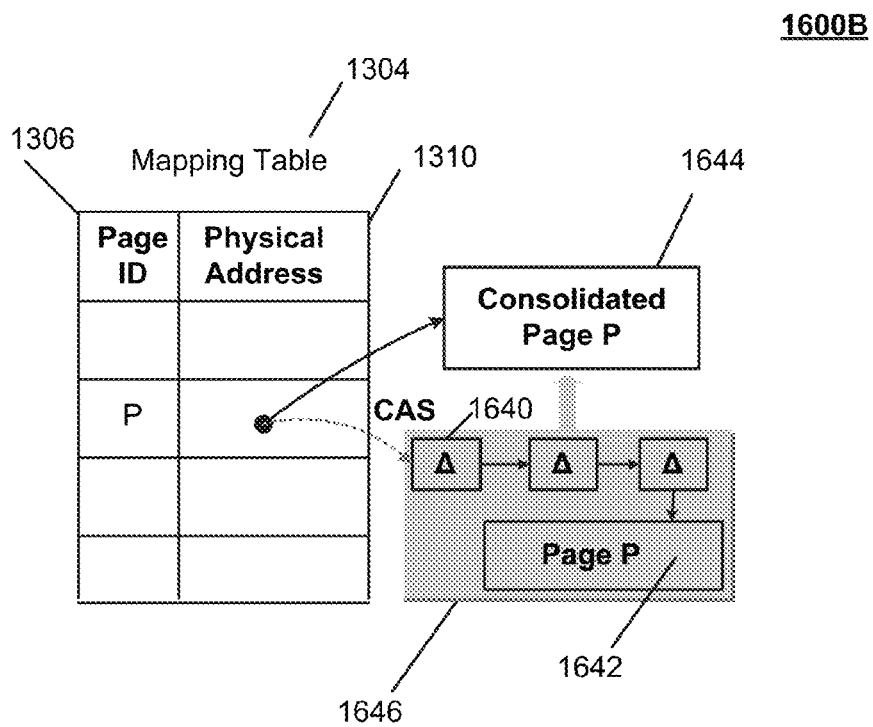

FIG. 16B depicts the example mapping table 1304, indicating a replacement of a prior state 1640 of a page 1642 with the new state 1644 of the page 1642, based on replacing a physical address of first storage object 1646 (e.g., which includes the base page 1642 with a plurality of previously prepended delta records, in FIG. 16B) with a physical address of the new state 1644 of the page 1642 (e.g., resulting from a consolidation of the page 1642 with the previously prepended delta records).

Figure 16C:
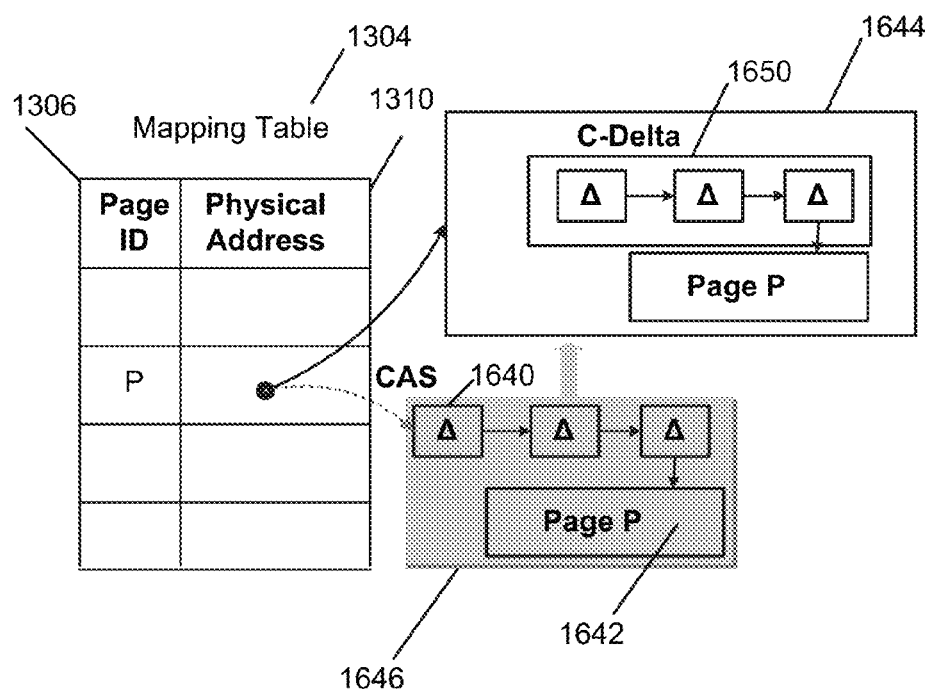

For example, as shown in FIG. 16C, replacing the prior state 1640 of the page 1642 with the new state 1644 of the page 1642 may include consolidating the plurality of delta records into a contiguous C-delta 1650, which may then be flushed, together with the base page 1642.

For example, replacing the prior state 1640 of the page 1642 with the new state 1644 of the page 1642 may include generating a modified version of the current page 1642, or determining another page for replacing the current page 1642, and replacing a physical address of the current page 1642 with a physical address of the new state 1644 of the page 1642 (e.g., the modified version or the other page for replacement), via an atomic compare and swap operation on the mapping table 1304.

For example, as a distinction between the features of FIG. 16B and FIG. 16C, when writing a page to secondary storage, LLAMA may perform the consolidation illustrated in FIG. 16C, but it depends upon the access method, executing an Update-R, to perform the consolidation of FIG. 16B.

In accordance with example techniques discussed herein, an example LLAMA implementation may be entirely latch-free. Further, dedicated threads might not be used to flush an I/O buffer, as this may complicate keeping thread workload balanced. Thus, all threads may participate in managing this buffer. For example, conventional approaches have utilized latches. However, such conventional techniques might only latch while allocating space in the buffer, releasing the latch prior to data transfers, which may then proceed in parallel.

In accordance with example techniques discussed herein, an example LLAMA implementation may avoid conventional latches for buffer space allocation, instead using a CAS for atomicity, as done elsewhere in the example systems discussed herein. For example, this involves defining the state on which the CAS executes. For example, the constant part of buffer state may include its address (Base) and size (Bsize). For example, the current high water mark of storage used in the buffer may be tracked with an Offset relative to the Base. For example, each request for the use of the buffer may begin with an effort to reserve space Size for a page flush.

In accordance with example techniques discussed herein, to reserve space in the buffer, a thread may acquire the current Offset and compute Offset+Size. For example, if Offset+Size≤Bsize then the request may be stored in the buffer. For example, the thread may issue a CAS with current Offset as the comparison value, and Offset+Size as the new value. If the CAS succeeds, Offset may be set to the new value, the space may be reserved, and the buffer writer may transfer data to the buffer.

In accordance with example techniques discussed herein, updates may proceed even when the entire page is not in cache. However, there may be times when an update needs the version of the page that has been read to remain unchanged between the read and a subsequent update. For example, a user may wish to determine whether the page state has changed since it was previously "looked at." (i.e., observed).

For example, in a "non-blind" update, the value of the mapping table pointer (which identifies the page state previously read) may accompany the update, certifying that the state has not changed since it was read. Since a READ operation for a page involves the presence of the page in the cache, this may ensure that the update will be made to an in-cache full page.

Blind updates may also involve a page state, to ensure that possibly conflicting operations have not intervened. For these operations, an operation P-READ (partial page read) may be used that reads whatever is currently in the page cache for the state, without triggering the read of the full page should the full page not be present. Then the address returned may be used in updates as before, only without a need for the full page to be in cache. If the mapping table only stores a flash offset, then a P-READ may read into cache the first part of the page referenced in flash, without a need to bring in the entire page.

Thus, an access method having such a PREAD operation may suffice for LLAMA to support blind updates from the access method.

For example, a "page stub" may be provided by using a flush delta with a particular annotation, together with its reference to the remainder of the page state in cache and a flash offset (stable storage location) for a location where the page has been placed in stable storage. For example, a stub may be "created" when the cache manager then swaps out the page via a "partial swap" up to the last flush delta. However, in accordance with example techniques discussed herein, the flush delta may be left in place instead of replacing the mapping table address with a flash offset. The remaining flush delta may retain this flash offset plus the annotation for users of LLAMA (e.g. the BW-TREE). An access method may read a page stub (or more of the page, if present in the cache) with a PREAD to determine what it may do with the page.

As discussed above, the BW-TREE may be used as an indexed record manager built to execute on top of LLAMA as its page-oriented cache manager. At this layer, a record manager supports typical CRUD (create, read, update, delete) operations as a minimum. The CRUD operations may involve knowledge of the prior state of the record store, which may involve cache operations at LLAMA that may involve reading the entire page to acquire that knowledge.

To support "blind" style record operations, additional operations may be utilized. For example, an UPSERT operation uses a new record version to replace an existing record if it exists, or to create (insert) the record if it does not yet exist. Thus, it combines the C of CRUD with the U (Create and Update). Within the LLAMA example discussed above, an UPSERT may perform a P-READ instead of an ordinary read, and then proceed with its update (e.g., using an UPDATE-D).

For example, an example BLIND-D operation, or blind delete (the D in CRUD) may be used, in addition to a "normal" delete that checks whether a version is present before deleting, and hence involving a page READ. This operation may involve only performing a P-READ. Such a BLIND-D operation may have various, different definitions. For example, it may delete a prior version when the page is eventually read and rationalized, and may be a no-op if there is no prior version.

As another example, it may linger as a delete request, "discharged" only when a subsequent version is added for the record.

In either event, the effect of the BLIND-D may not be fully realized until the page is entirely in memory via a READ.

For example, an application may support a blind incremental update of a record, of the UPSERT form. Incremental record changes (as opposed to the complete replacement update model for record updates discussed above) may involve "intra record" semantics that are not conventionally known by a record oriented access method such as the BW-TREE.

Incremental record updates (UPDATE-I), which produce changes but not replacements of records, may use the same LLAMA operations as blind writes, i.e. PREADs instead of READs. Thus, they may be treated similarly to UPSERTs. However, the BW-TREE is not able, by itself, to understand how to consolidate these updates into a record version. Discussed below are two example techniques for handling this "consolidation"

As a first example, an application using the BW-TREE may issue a record read (READ) (the R in CRUD). For example, the BW-TREE may gather the pieces of the updated record together via concatenation of the pieces it has received. Subsequent to this read, the application presents a consolidated record as a "normal" update that replaces the prior, pieced together record with a record that has been consolidated by the application. No additional functionality (aside from UPDATE-I) may be involved.

As a second example, an application may provide to the BW-TREE a procedure that understands how to consolidate a record in concatenated pieces format, into an application understood consolidated format. There are a variety of ways that this procedure might be provided, once in information retained about the "table" being supported by the BW-TREE, or by providing a call-back point that the BW-TREE can call to perform this function, e.g. prior to delivering the record as part of a READ, or during the page consolidation process done by the BW-TREE as it incorporates delta updates into a consolidated page.

In accordance with example techniques discussed herein, both of these variants may be supported.

Discussed below are example techniques for replacing the record pieces that are the result of UPDATE-I with the version that has been consolidated, by either example technique discussed above.

Thus, it may be desirable to store the consolidated record in the BW-TREE, replacing the UPDATE-I increments that were provided before.

For example, a CONSOLIDATE-I operation may work on a record when it has been solely updated by prior UPDATE-I operations. Such a CONSOLIDATE-I operation, may identify prior UPDATE-I's that are to be replaced, and then post this consolidated version into the BW-TREE. It may be assumed that each UPDATE-I has an LSN that is used for idempotence. When consolidation occurred, it is known which of the UPDATE-I's went into the consolidated version that was produced. Thus, the consolidated record can retain these LSNs when it is used in an update delta for the page. This enables future operations, both future consolidates and future BW-TREE operations to provide idempotence.

The BW-TREE knows how to consolidate a page, and may use an UPDATE-R LLAMA operation to replace the current form of the page with the new form. During this process, the BW-TREE may remove from the page all UPDATE-I's that are captured in the CONSOLIDATE-I operation, replacing them with the consolidated record. Any UPDATE-I operations that are not captured with the consolidated record may remain as unconsolidated entries for the record (e.g., to be consolidated later). The BW-TREE does not need to understand the details of the consolidation to accomplish this. It need know only about the LSN information captured in the consolidated record.

One skilled in the art of computing will appreciate that many other types of techniques may be used for achieving high performance transaction processing, without departing from the spirit of the discussion herein.

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

Figure 17:
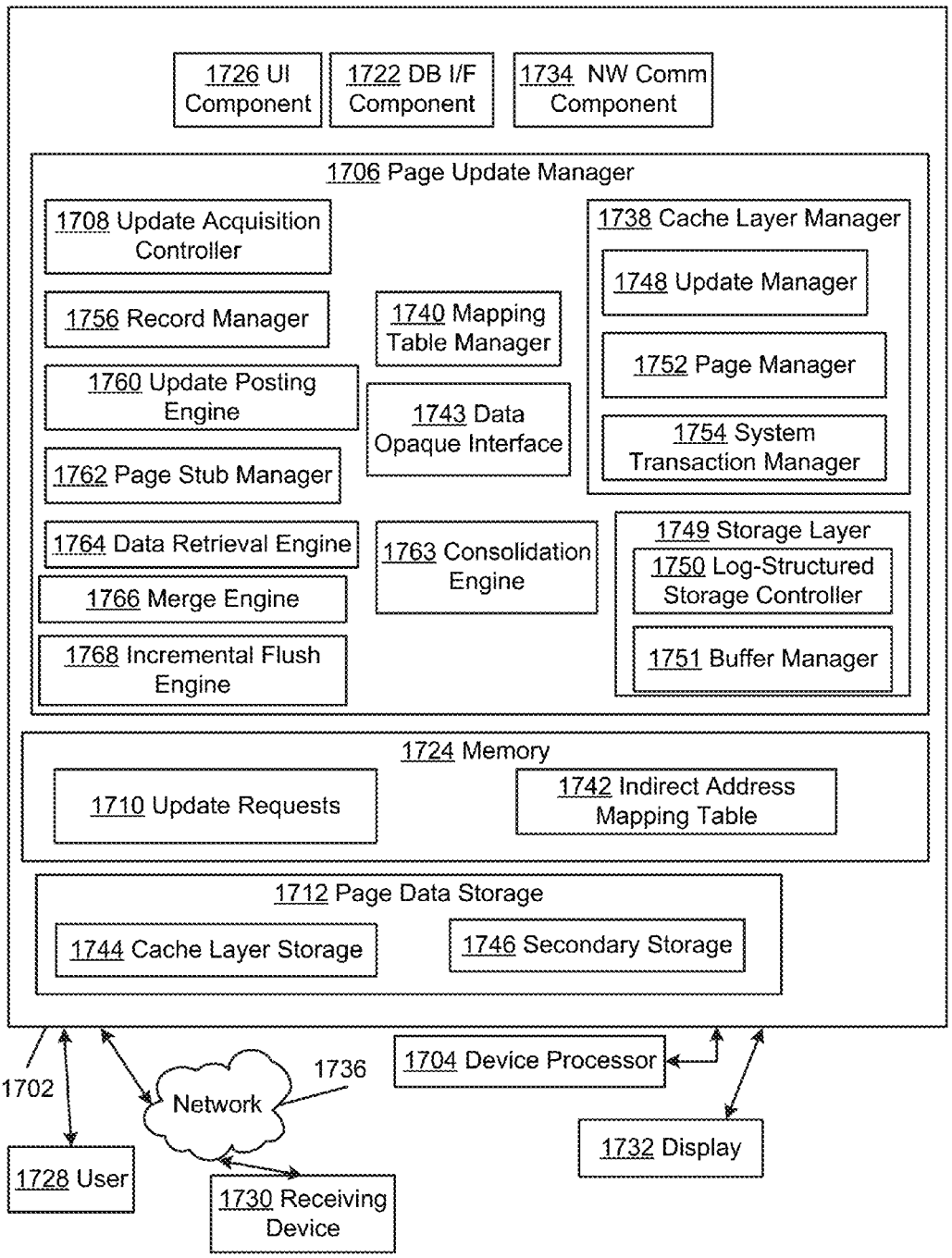
FIG. 17 is a block diagram of an example system for data modifications using blind update operations.

As further discussed herein, FIG. 17 is a block diagram of a generalized system 1700 for achieving high performance transaction processing. The generalized system 1700 as shown is merely intended to illustrate various example functionality and/or logic that may be included in example techniques as discussed herein, and is not intended to be limiting in terms of implementations in various hardware and/or software configurations. One skilled in the art of computing will appreciate that system 1700 may be realized in hardware implementations, software implementations, or combinations thereof. As shown in FIG. 17, a system 1700 may include a device 1702 that includes at least one processor 1704. The device 1702 may include a page update manager 1706 that may include an update acquisition controller 1708 that obtains a plurality of update requests 1710 that specify updates for a logical page associated with a key-value store.

For example, page data storage 1712 may include any type of page data storage, including (at least) volatile storage such as main memory, and more stable storage (e.g., more non-volatile storage) such as "secondary storage," which may include flash storage, as well as other types of disk drives, etc. One skilled in the art of computing will appreciate that there are many types of page data storage that may be used with techniques discussed herein, without departing from the spirit of the discussion herein.

According to an example embodiment, the page update manager 1706, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a computing system. A processor may thus include one or more processors executing instructions in parallel and/or in a distributed manner. Although the device processor 1704 is depicted as external to the page update manager 1706 in FIG. 17, one skilled in the art of computing will appreciate that the device processor 1704 may be implemented as a single component, and/or as distributed units which may be located internally or externally to the page update manager 1706, and/or any of its elements.

For example, the system 1700 may include one or more processors 1704. For example, the system 1700 may include at least one tangible computer-readable storage medium storing instructions executable by the one or more processors 1704, the executable instructions configured to cause at least one processor to perform operations associated with various example components included in the system 1700, as discussed herein. For example, the one or more processors 1704 may be included in at least one processing apparatus. One skilled in the art of computing will understand that there are many configurations of processors and processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the page update manager 1706 may be implemented in association with one or more user devices. For example, the page update manager 1706 may communicate with a server, as discussed further below.

For example, one or more databases may be accessed via a database interface component 1722. One skilled in the art of computing will appreciate that there are many techniques for storing information discussed herein, such as various types of database configurations (e.g., relational databases, hierarchical databases, distributed databases) and non-database configurations.

According to an example embodiment, the page update manager 1706 may include a memory 1724 that may store objects such as intermediate results. In this context, a "memory" may include a single memory device or multiple memory devices configured to store data and/or instructions. Further, the memory 1724 may span multiple distributed storage devices. Further, the memory 1724 may be distributed among a plurality of processors.

According to an example embodiment, a user interface component 1726 may manage communications between a user 1728 and the page update manager 1706. The user 1728 may be associated with a receiving device 1730 that may be associated with a display 1732 and other input/output devices. For example, the display 1732 may be configured to communicate with the receiving device 1730, via internal device bus communications, or via at least one network connection.

According to example embodiments, the display 1732 may be implemented as a flat screen display, a print form of display, a two-dimensional display, a three-dimensional display, a static display, a moving display, sensory displays such as tactile output, audio output, and any other form of output for communicating with a user (e.g., the user 1728).

According to an example embodiment, the page update manager 1706 may include a network communication component 1734 that may manage network communication between the page update manager 1706 and other entities that may communicate with the page update manager 1706 via at least one network 1736. For example, the network 1736 may include at least one of the Internet, at least one wireless network, or at least one wired network. For example, the network 1736 may include a cellular network, a radio network, or any type of network that may support transmission of data for the page update manager 1706. For example, the network communication component 1734 may manage network communications between the page update manager 1706 and the receiving device 1730. For example, the network communication component 1734 may manage network communication between the user interface component 1726 and the receiving device 1730.

For example, a cache layer manager 1738 may include a mapping table manager 1740 that may be configured to initiate table operations on an indirect address mapping table 1742, the table operations including initiating atomic compare and swap (CAS) operations on entries in the indirect address mapping table 1742, to replace prior states of pages that are associated with the page data storage 1712, with new states of the pages.

For example, using such atomic operations may provide full multi-threading capability—i.e., any thread may access any data, thus, advantageously providing speed capabilities in processing.

For example, the mapping table manager 1740 may be configured to initiate the table operations on the indirect address mapping table 1742 associated with a data opaque interface 1743, wherein the indirect address mapping table 1742 is used in common for management of data storage that includes cache layer storage 1744 and secondary storage 1746.

For example, the indirect address mapping table 1742 separates logical locations of pages from corresponding physical locations of the pages, wherein users of the page data storage store page identifier values in lieu of physical location address values for the pages, elsewhere in data structures referencing the page data storage.

For example, an update manager 1748 may be configured to control data updates and management updates using latch-free compare and swap operations on entries in the indirect address mapping table 1742 to effect atomic state changes on the indirect address mapping table 1742.

For example, a storage layer 1749 may include a log-structured storage layer manager 1750 that may be configured to control page location changes associated with log structuring resulting from page flushes, using latch-free compare and swap operations on entries in the indirect address mapping table 1742.

For example, a buffer manager 1751 may be configured to control updates to a log-structured secondary storage buffer via latch-free update operations. Thus, for example, multiple threads may simultaneously update the log-structured secondary storage buffer via latch-free operations.

For example, the buffer manager 1751 may be configured to initiate a stability operation for determining that pages flushed to the log-structured secondary storage buffer, having lower addresses, up to a first secondary storage address argument, are stable in the log-structured secondary storage.

For example, a page manager 1752 may be configured to control flush operations, allocate operations, and free operations on pages. For example, the page manager 1752 may be configured to initiate a flush operation of a first page in cache layer storage to a location in secondary storage, based on initiating a copy of a page state of the first page into a secondary storage buffer, initiating a prepending of a flush delta record to the page state, the flush delta record including a secondary storage address indicating a storage location of the first page in secondary storage and an annotation associated with a caller, and initiating an update to the page state based on installing an address of the flush delta record in a mapping table, via a compare and swap (CAS) operation.

For example, the page manager 1752 may be configured to initiate a swap operation of a portion of a first page in cache layer storage to a location in secondary storage, based on initiating a prepending of a partial swap delta record to a page state associated with the first page, the partial swap delta record including a main memory address indicating a storage location of a flush delta record that indicates a location in secondary storage of a missing part of the first page.

For example, a system transaction manager 1754 may be configured to commit transactions and abort transactions.

For example, a record manager 1756 may be configured to control updates based on update delta record operations and replacement update operations.

For example, the page manager 1752 may be configured to flush a page state to secondary storage based on installing a pointer to a flush delta record in a mapping table, via a compare and swap (CAS) operation, the flush delta record prepended to an existing page state that is replaced in the mapping table via the CAS operation.

For example, the page manager 1752 may be configured to determine whether the CAS operation succeeds, and to initiate a write operation to write the existing page state to a secondary storage flush buffer, if it is determined that the CAS operation succeeds.

For example, the page manager 1752 may be configured to initiate a void operation to storage space previously allocated for the existing page, if it is determined that the CAS operation fails.

An update posting engine 1760 may post the updates using the obtained update requests, without accessing the logical page via a read operation.

For example, a page stub manager 1762 may initiate a prepending of a page stub to a current state of the logical page via a page stub delta record representing the page stub, the page stub including an indication of an address of a current state of the logical page and metadata specifying attributes of the logical page, the prepending of the page stub to the current state initiated by installing an address of the page stub delta record representing the page stub in a mapping table, via an atomic operation. For example, the page stub may include values of key boundaries associated with the logical page.

For example, the update acquisition module 1708 may obtain a plurality of update requests 1710 that specify record updates to the logical page.

For example, the update posting engine 1760 may post the obtained record updates using the obtained plurality of update requests 1710, without accessing the logical page via a read operation.

For example, the update posting engine 1760 may post the obtained record updates by prepending a plurality of respective delta records to the page stub. The respective delta records may include record update information that specifies the respective updates to the logical page that are specified in the respective plurality of update requests.

For example, a consolidation engine 1763 may consolidate the obtained record updates via a predefined consolidation function, using the plurality of respective delta records that are prepended to the page stub.

For example, the update acquisition module 1708 may obtain a plurality of update requests 1710 that specify incremental updates to a record in the logical page.

For example, the update posting engine 1760 may incrementally post the obtained specified incremental updates using the obtained update requests 1710, without accessing the logical page via a read operation.

For example, the update posting engine 1760 may incrementally post the obtained specified incremental updates by incrementally prepending a plurality of respective delta records to the page stub, wherein the plurality of respective delta records include key update information that specifies the respective updates to the record.

For example, a data retrieval engine 1764 may initiate a lookup of a key in the key-value store, to obtain a representation of at least a portion of the logical page, in a current state of the logical page, via a read operation from storage into memory.

For example, a merge engine 1766 may merge the obtained specified incremental updates via a predefined merge function, using the plurality of respective delta records that are prepended to the page stub. For example, the predefined merge function includes a user-defined merge function.

For example, an incremental flush engine 1768 may incrementally flush contents of the logical page, with the plurality of respective delta records that are prepended to the page stub, to a flush buffer storage area that is appended to storage using a single write operation.

For example, the key-value store includes keys that represent terms associated with respective documents, and respective values that represent respective document identifiers.

For example, the logical page is stored on secondary storage.

One skilled in the art of computing will appreciate that many different techniques may be used for achieving high performance transaction processing, without departing from the spirit of the discussion herein.

IV. Aspects of Certain Embodiments

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

A system includes at least one processor, and a transaction component that includes a computer-readable storage medium that stores executable instructions that are executable by the at least one processor. The executable instructions include a transaction engine that includes a multi-version concurrency control (MVCC) module that accesses a latch-free hash table that includes respective hash table entries that include respective buckets of respective bucket items that represent respective records, the respective bucket items each including a value indicating a temporal most recent read time of the each item and a version list of one or more descriptions that describe one or more respective versions of the respective records, using a recovery log as a source of the one or more respective versions of the respective records the MVCC module performing timestamp order concurrency control, using the latch-free hash table, the temporal most recent read time of the each item including a timestamp value representing the temporal last time the each item was read.

The system as in the preceding paragraph, further including an epoch engine that controls reuse of freed memory locations by denying permission to reuse respective freed memory locations until active threads are unable to dereference pointers to the respective freed memory locations.

Each of the one or more descriptions that describe one or more respective versions of the respective records includes a transaction identifier (TID) that identifies a creating transaction associated with the respective version of the respective record, a version offset value indicating a referencing offset of a copy of the respective version of the respective record that is stored in a recovery log at a location in the recovery log that corresponds to the version offset value, and a flag value indicating whether the creating transaction has aborted.

The transaction component includes a transaction table that includes respective entries that represent respective transactions, wherein the respective entries each include a transaction identifier (TID), a timestamp value indicating a start time of the respective transaction, a list representing updates made by the transaction, and a flag value indicating whether the respective transaction is active, committed, or aborted.

The transaction table includes an entry representing an oldest active transaction that is periodically determined by the transaction engine, as one of the respective transactions that is active and is associated with an oldest timestamp.

The transaction engine initiates respective commit record write operations for respective commit operations for respective read-only transactions, to store commit records for the respective read-only transactions.

The transaction engine initiates the respective commit record write operations for the respective commit operations for the respective read-only transactions, as a result of respective determinations of a commit stability status of a most recently read version that has been read so far by each of the respective read-only transactions.

The transaction component includes a version manager that includes a recovery log that stores, in recovery log buffers, pure redo records and record entries representing copies of versions of respective records that are associated with a key-value store.

The transaction engine approves a transaction update of a current record, initiates storage of a copy of an updated version of the current record in a recovery log buffer, in the recovery log, and initiates generation of a new entry in the MVCC latch-free hash table that includes an offset value indicating a position of the updated version of the current record in the recovery log buffer, and an indication of a transaction responsible for the transaction update of the current record.

The version manager sends log buffers to a transaction component proxy that receives the log buffers and posts committed transactions to stable storage for records associated with the committed transactions, wherein the transaction component proxy is located remotely from the transaction component, substantially close to a location of a data component associated with the stable storage, or locally to the transaction component.

The transaction component proxy posts the committed transactions to stable storage for records associated with the committed transactions, the stable storage managed by the data component that includes the data component of a key-value store, wherein the transaction component proxy maintains a tracking of progress of recovery application to the data component, and provides a summary of the tracked progress to the transaction component.

The transaction component proxy posts the committed transactions to stable storage for records associated with the committed transactions, the stable storage managed by the data component that includes the data component of a key-value store, wherein the transaction component proxy performs a first scan of each received log buffer to determine committed transactions received from the transaction component, and the transaction component proxy performs a second scan of the each received log buffer to apply operations of the committed transactions at the data component, for the committed transactions determined in the first scan, wherein the transaction component proxy stores information associated with respective versions, for respective versions associated with respective transactions that are determined as not yet durably committed, wherein the transaction component proxy tracks progress in apply operations to the data component using a pair of log sequence numbers (LSNs).

The version manager maintains a record read cache for storing copies of preexisting record versions that are read from a data component, wherein the record read cache includes latch-free, log-structured buffers that are populated and cleaned in first-in-first-out (FIFO) order.

The transaction component includes a version manager that includes a recovery log structured as a plurality of latch-free recovery log buffers using dynamic allocation of storage for newly arriving recovery log buffer entries, wherein the version manager maintains an offset variable value indicating a next available location for newly requested storage allocation within a particular recovery log buffer, the offset variable value updated via an atomic fetch and increment (FAI) operation to add the size of a requested allocation to the offset variable value, and the offset variable value further indicates a current number of active users of the particular recovery log buffer.

A method includes accessing a latch-free hash table that includes respective hash table entries that include respective buckets of respective bucket items that represent respective records, the respective bucket items each including a value indicating a temporal most recent read time of the each item and a version list of one or more descriptions that describe one or more respective versions of the respective records, using a recovery log as a source of the one or more respective versions of the respective records; and performing timestamp order concurrency control for a key-value store, using the latch-free hash table.

The method as in the preceding paragraph, wherein commit records stored in the recovery log are used as a queue for the deferred delivery of transaction outcome messages, after the recovery log buffer becomes durable, in lieu of using a separate queuing mechanism.

A computer program product includes a computer-readable storage medium storing executable instructions that when executed by at least one processor cause at least one computing device to access a storage entity structured as a plurality of storage buffers using dynamic allocation of storage for newly arriving storage entity entries and maintain an offset variable value indicating a next available location for newly requested storage allocation within a particular storage buffer, the offset variable value updated via an atomic fetch and increment (FAI) operation to add the size of a requested allocation to the offset variable value, the offset variable value further indicating a current number of active users of the particular storage buffer. The executable instructions when executed by the processor cause at least one computing device to control storage of an entry in the storage entity using dynamic allocation of storage in one of the storage buffers, and update the offset variable value.

The computer program product as in the preceding paragraph, wherein the storage entity includes a recovery log structured as a plurality of latch-free recovery log buffers using dynamic allocation of storage for newly arriving recovery log buffer entries.

The executable instructions, when executed by the at least one processor, cause the at least one computing device to determine whether one of the particular storage buffers is sealed by determining whether the offset variable value generated by the atomic FAI operation indicates a buffer offset value that is larger than an extent of the one of the particular storage buffers.

The executable instructions, when executed by the at least one processor, cause the at least one computing device to initiate a write operation to write the sealed one of the particular storage buffers to secondary storage, after the determining whether the one of the particular storage buffers is sealed.

One skilled in the art of computing will understand that there may be many ways of achieving high performance transaction processing, without departing from the spirit of the discussion herein.

Customer privacy and confidentiality have been ongoing considerations in computing environments for many years. Thus, example techniques for high performance transaction processing may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
one or more processors; and
one or more computer-readable hardware storage media having stored thereon computer-executable instructions that are executable by the one or more processors to cause the system to be configured with an architecture for providing high performance data transactions in a database management system, the architecture comprising:
a recovery log that acts, in part, as a deferred delivery queue for a transaction outcome message and the recovery log stores a version of a record wherein the recovery log stores redo records and record entries representing copies of versions of respective records that are associated with a key-value store;
a latch-free hash table comprising an offset value that indicates a storage location of the version of the record stored in the recovery log and a most recent read time value indicating a temporal most recent read time of the version of the record;
a multi-version concurrency control (MVCC) module that performs timestamp order concurrency control using the temporal most recent read time of the record as determined by the most recent read time value from the latch-free hash table to identify the offset value that indicates the storage location of the version of the record stored in the recovery log; and
a version manager that sends a log buffer to a transaction component proxy that receives the log buffer and posts committed transactions to stable storage for records associated with the committed transactions.

2. The system of claim 1, the architecture further comprising:
an epoch engine that controls reuse of freed memory locations by denying permission to reuse respective freed memory locations until active threads are unable to dereference pointers to the respective freed memory locations.

3. The system of claim 1, the architecture further comprising:
a transaction component that includes a transaction table that includes respective entries that represent respective transactions, wherein the respective entries each include:
a transaction identifier (TID),
a timestamp value indicating a start time of the respective transaction,
a list representing updates made by the transaction, and
a flag value indicating whether the respective transaction is active, committed, or aborted.

4. The system of claim 3, wherein:
the transaction table includes an entry representing an oldest active transaction that is periodically determined by the transaction component, as one of the respective transactions that is active and is associated with an oldest timestamp, wherein the entry representing the oldest active transaction is used for controlling garbage collection of versions in the latch-free hash table.

5. The system of claim 3, wherein:
the transaction component controls respective commit record write operations for respective commit operations for respective read-only transactions, to store commit records for the respective read-only transactions.

6. The system of claim 5, wherein:
the transaction component initiates the respective commit record write operations for the respective commit operations for the respective read-only transactions, as a result of respective determinations of a commit stability status of a most recently read version that has been read so far by each of the respective read-only transactions.

7. The system of claim 1, wherein:
the transaction component approves a transaction update of a current record, initiates storage of a copy of an updated version of the current record in a recovery log, and initiates generation of a new entry in the latch-free hash table that includes an offset value indicating a position of the updated version of the current record in the recovery log, and an indication of a transaction responsible for the transaction update of the current record.

8. The system of claim 1, wherein:
the transaction component proxy is located remotely from the version manager, substantially close to a location of a data component associated with the stable storage, or locally to the version manager.

9. The system of claim 8, wherein:
the transaction component proxy posts the committed transactions to stable storage for records associated with the committed transactions, maintains a tracking of progress of recovery application to the data component, and provides a summary of the tracked progress to the transaction component.

10. The system of claim 8, wherein:
the transaction component proxy posts the committed transactions to stable storage for records associated with the committed transactions, wherein
the transaction component proxy performs a first scan of the received log buffer to determine committed transactions received from the transaction component, and
the transaction component proxy performs a second scan of the received log buffer to apply operations of the committed transactions at the data component, for the committed transactions determined in the first scan, wherein
the transaction component proxy stores information associated with respective versions, for respective versions associated with respective transactions that are determined as not yet durably committed, wherein
the transaction component proxy tracks progress in apply operations to the data component using a pair of log sequence numbers (LSNs).

11. The system of claim 1, wherein:
a version manager maintains a record read cache for storing copies of preexisting record versions that are read from a data component, wherein the record read cache includes latch-free, log-structured buffers that are populated and cleaned in first-in-first-out (FIFO) order.

12. The system of claim 1, wherein:
a transaction component that includes a version manager that includes the recovery log structured as a plurality of latch-free recovery log buffers using dynamic allocation of storage for newly arriving recovery log buffer entries, wherein:
the version manager maintains the offset variable value indicating a next available location for newly requested storage allocation within a particular recovery log buffer, the offset variable value updated via an atomic fetch and increment operation to add a size of a requested allocation to the offset variable value, and
the offset variable value further indicates a current number of active users of the particular recovery log buffer.

13. The system of claim 1, wherein:
the latch-free hash table includes respective hash table entries that include respective buckets of respective bucket items that represent respective records, the respective bucket items including a value indicating a temporal most recent read time of the respective bucket item and a version list of one or more descriptions that describe one or more respective versions of the respective records.

14. The system of claim 13, wherein:
the one or more descriptions that describe one or more respective versions of the respective records includes:
a transaction identifier (TID) that identifies a creating transaction associated with the respective version of the respective record, and
a version offset value indicating a referencing offset of a copy of the respective version of the respective record that is stored in a recovery log at a location in the recovery log that corresponds to the version offset value.

15. A computer-implemented method performed by one or more processors executing computer executable instructions for the computer-implemented method, the computer-implemented method comprising:
approving a transaction update of a record;
storing a copy of an updated version of the record in a recovery log that acts, in part, as a queue for the deferred delivery of the transaction update to a data component in lieu of using a separate queue wherein the recovery log stores redo records and record entries representing copies of versions of respective records that are associated with a key-value store;
creating a new entry in a latch-free hash table, the new entry comprising an offset value that corresponds to the updated version of the record and a most recent read time value indicating a temporal most recent read time of the updated version of the record;
performing timestamp order concurrency control using a multi-version concurrency control (MVCC) module wherein the temporal most recent read time of the record as determined by the most recent read time value from the latch-free hash table to identify the offset value that indicates the storage location of the version of the record stored in the recovery log; and
sending a log buffer to a transaction component proxy that receives the log buffer and posts committed transactions to stable storage for records associated with the committed transactions.

16. A computer program product comprising a computer-readable storage medium storing executable instructions that when executed by at least one processor cause at least one computing device to:
approve a transaction update of a respective record;
storing a copy of an updated version of the record in a recovery log that acts, in part, as a queue for the deferred delivery of the transaction update to a data component in lieu of using a separate queue wherein the recovery log stores redo records and record entries representing copies of versions of respective records that are associated with a key-value store;
create a new entry in a latch-free hash table comprising an offset value that indicates a storage location of a version of a record in a recovery log and a most recent read time value indicating a temporal most recent read time of the updated version of the respective record;
perform timestamp order concurrency control using a multi-version concurrency control (MVCC) module wherein the temporal most recent read time of the record as determined by the most recent read time value from the latch-free hash table to identify the offset value that indicates the storage location of the version of the record stored in the recovery log; and
send a log buffer to a transaction component proxy that receives the log buffer and posts committed transactions to stable storage for records associated with the committed transactions.

17. The computer program product of claim 16, wherein:
the offset value is updated via an atomic fetch and increment operation to add a size of a requested allocation to the offset value, the offset value further indicating a current number of active users of the recovery log.

18. The computer program product of claim 16, further comprising executable instructions, when executed by the at least one processor, cause the at least one computing device to:
store a copy of an updated version of the respective record in a recovery log comprising one or more in-memory storage buffers; and
determine whether one of the in-memory storage buffers is sealed by determining whether the offset value generated by an atomic fetch and increment operation indicates a buffer offset value that is larger than an extent of the one of the storage buffers and there are no active writers for the one or the storage buffers.

* * * * *